(12) United States Patent
Hatano

(10) Patent No.: US 8,654,360 B2
(45) Date of Patent: Feb. 18, 2014

(54) MANAGEMENT APPARATUS, METHOD, AND STORAGE MEDIUM FOR MANAGING JOB LOGS

(75) Inventor: Manami Hatano, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 571 days.

(21) Appl. No.: 12/703,076

(22) Filed: Feb. 9, 2010

(65) Prior Publication Data

US 2010/0225945 A1     Sep. 9, 2010

(30) Foreign Application Priority Data

Mar. 9, 2009  (JP) ................................. 2009-055725

(51) Int. Cl.
*G06F 3/12* (2006.01)

(52) U.S. Cl.
USPC ......... 358/1.13; 358/1.15; 709/223; 709/224; 709/225

(58) Field of Classification Search
USPC .................. 358/1.13, 1.15; 709/223, 224, 225
See application file for complete search history.

(56) References Cited

U.S. PATENT DOCUMENTS

| | | | | |
|---|---|---|---|---|
| 8,314,952 B2 * | 11/2012 | Ohta | ............................. | 358/1.14 |
| 2003/0204590 A1 * | 10/2003 | Torii | ............................. | 709/224 |
| 2007/0115495 A1 * | 5/2007 | Ebitani | ........................ | 358/1.14 |
| 2008/0212131 A1 * | 9/2008 | Osada | .......................... | 358/1.15 |
| 2008/0228937 A1 | 9/2008 | Araumi | | |

FOREIGN PATENT DOCUMENTS

| | | |
|---|---|---|
| JP | 2006-293833 | 10/2006 |
| JP | 2007-079901 | 3/2007 |
| JP | 2008-071085 A | 3/2008 |
| JP | 2008-259105 A | 10/2008 |

* cited by examiner

*Primary Examiner* — Jacky X Zheng

(74) *Attorney, Agent, or Firm* — Fitzpatrick, Cella, Harper & Scinto

(57) ABSTRACT

A management apparatus has a determination unit which determines, from a plurality of logs included in the log information, a plurality of similar logs based on information included in the logs. The management apparatus also has a difference log generation unit which generates, from the information included in each log, a difference log having information in a smaller amount than in an original log for the plurality of logs determined to be similar by the determination unit. The log management unit manages, as logs based on one print request together, the plurality of logs determined to be similar by the determination unit, and manages, as the difference log generated by the difference log generation unit, some of the plurality of logs determined to be similar by the determination unit.

11 Claims, 41 Drawing Sheets

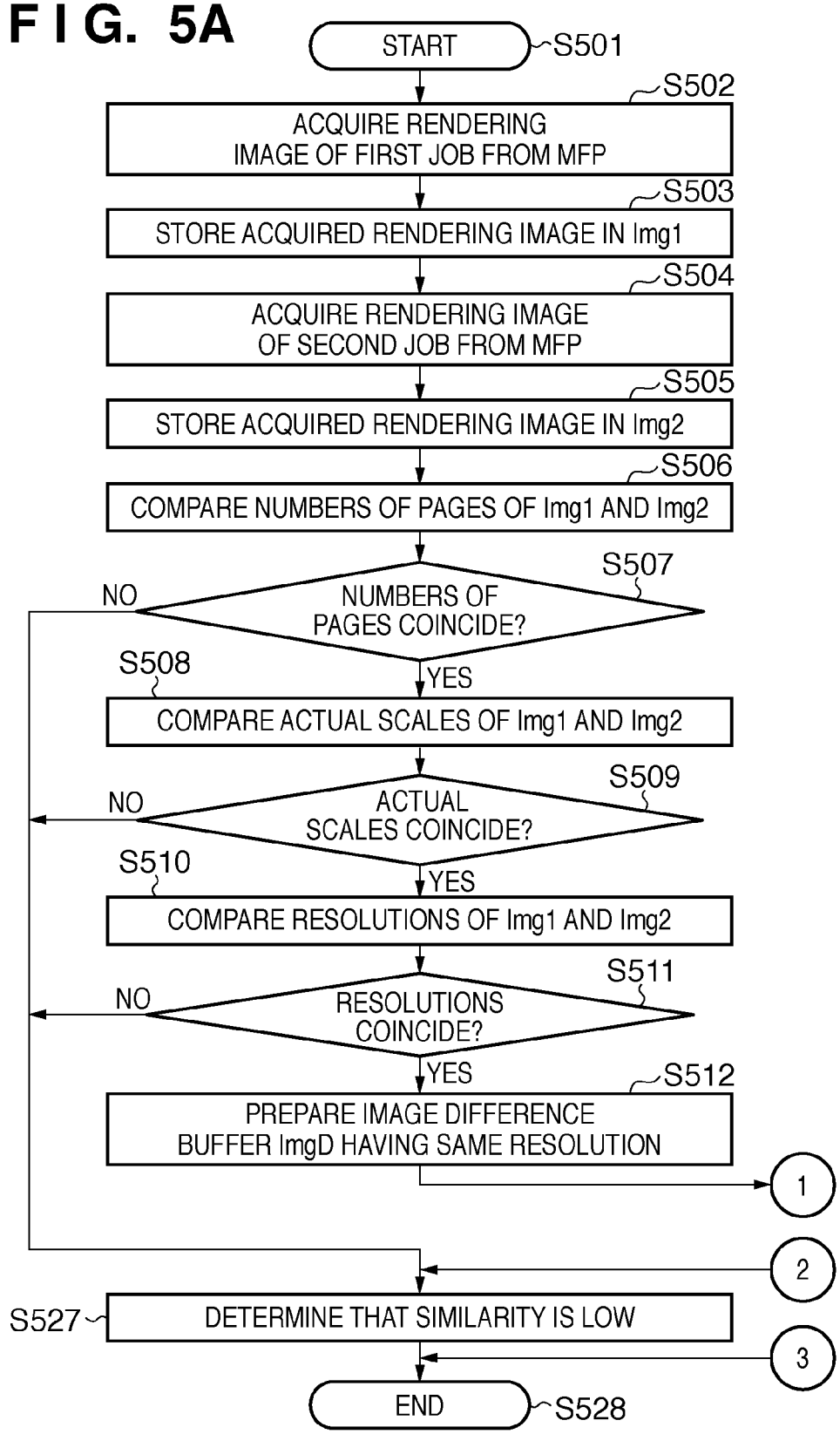

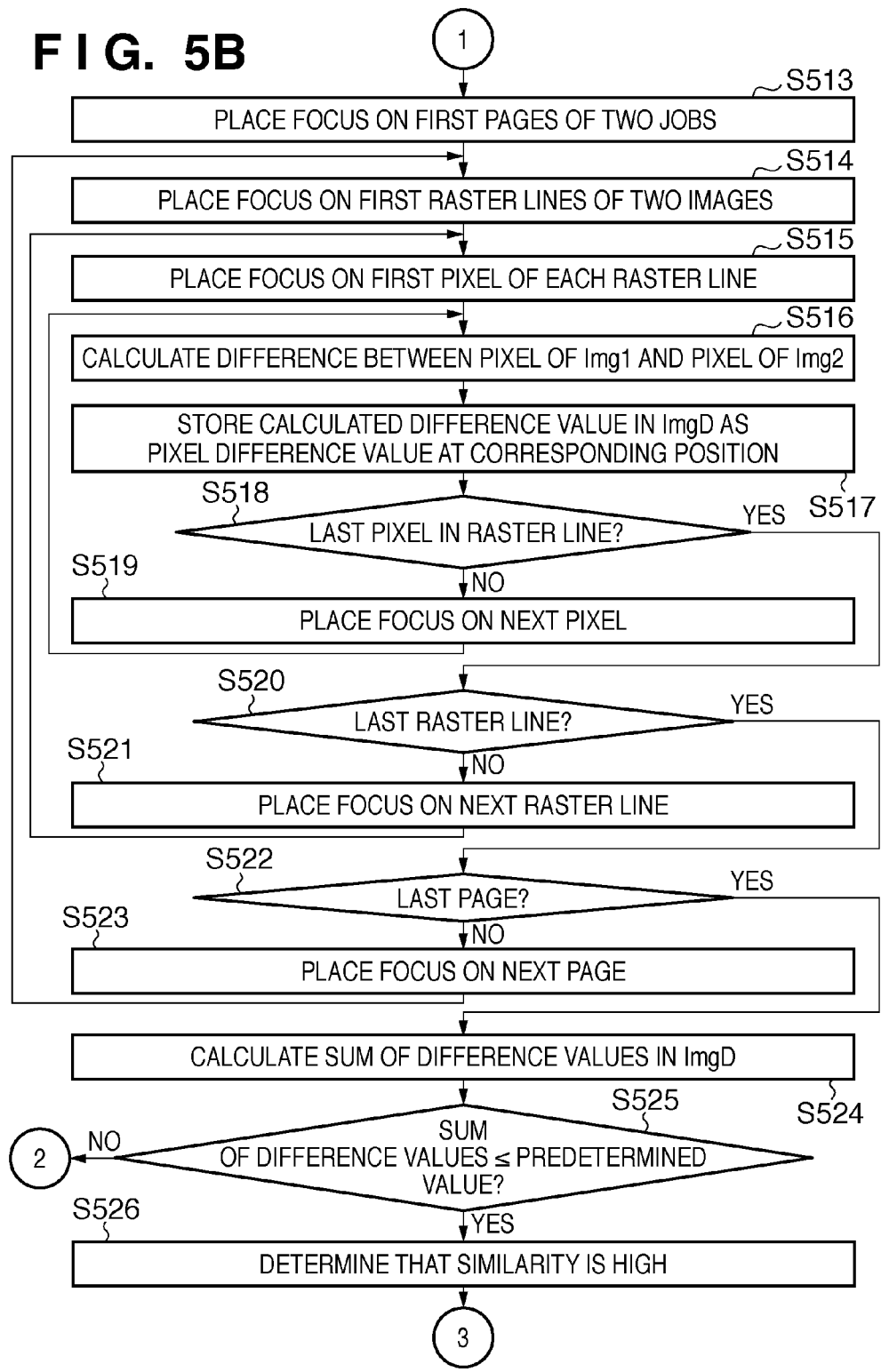

FIG. 6

DISTANCE FUNCTION $$S = \frac{\sum_{i=0}^{i_{max}} \sum_{y=0}^{y_{max}} \sum_{x=0}^{x_{max}} \{|d_R(i,x,y)| + |d_G(i,x,y)| + |d_B(i,x,y)|\}}{i_{max} \cdot x_{max} \cdot y_{max}}$$

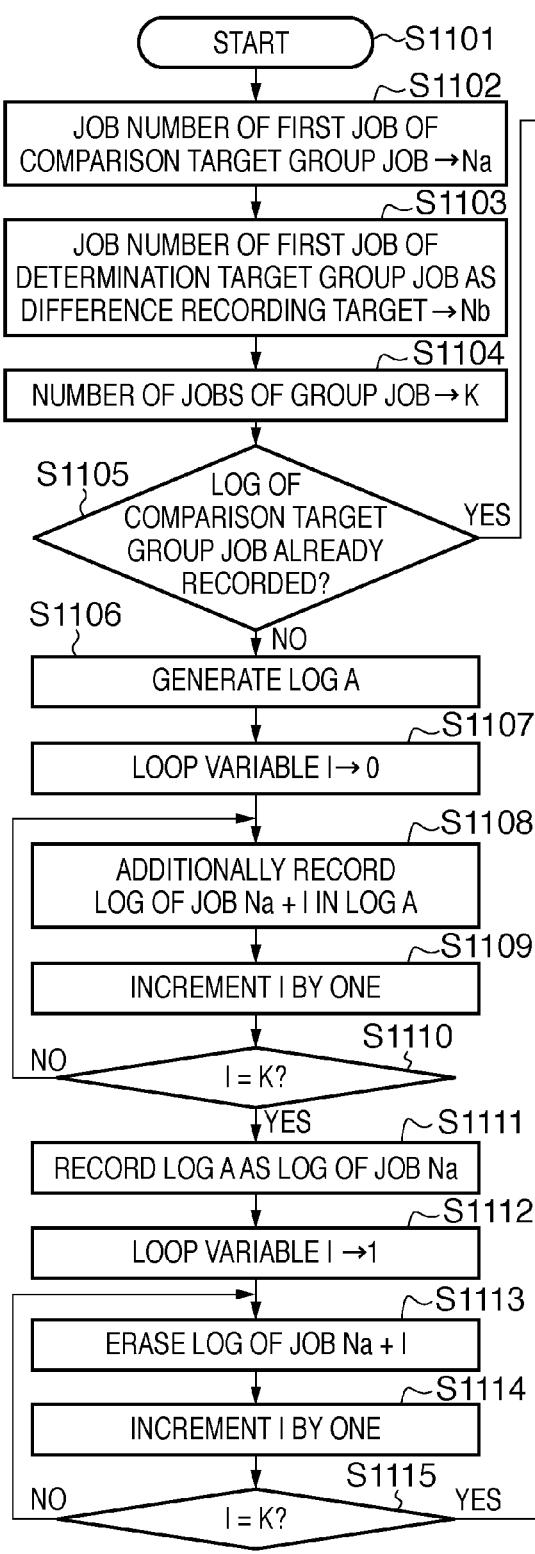
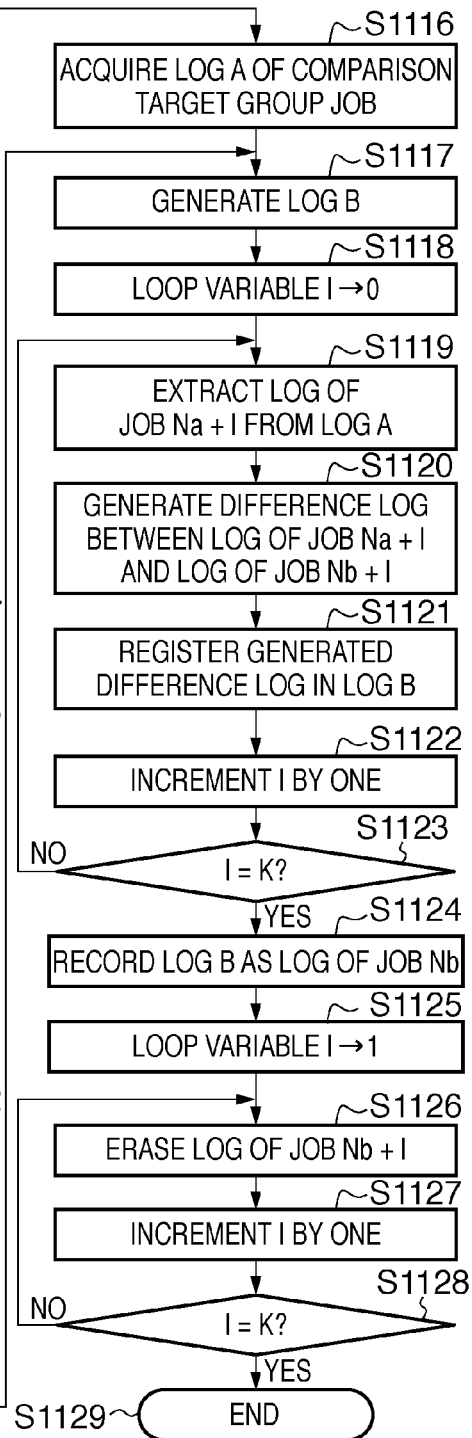
FIG. 12

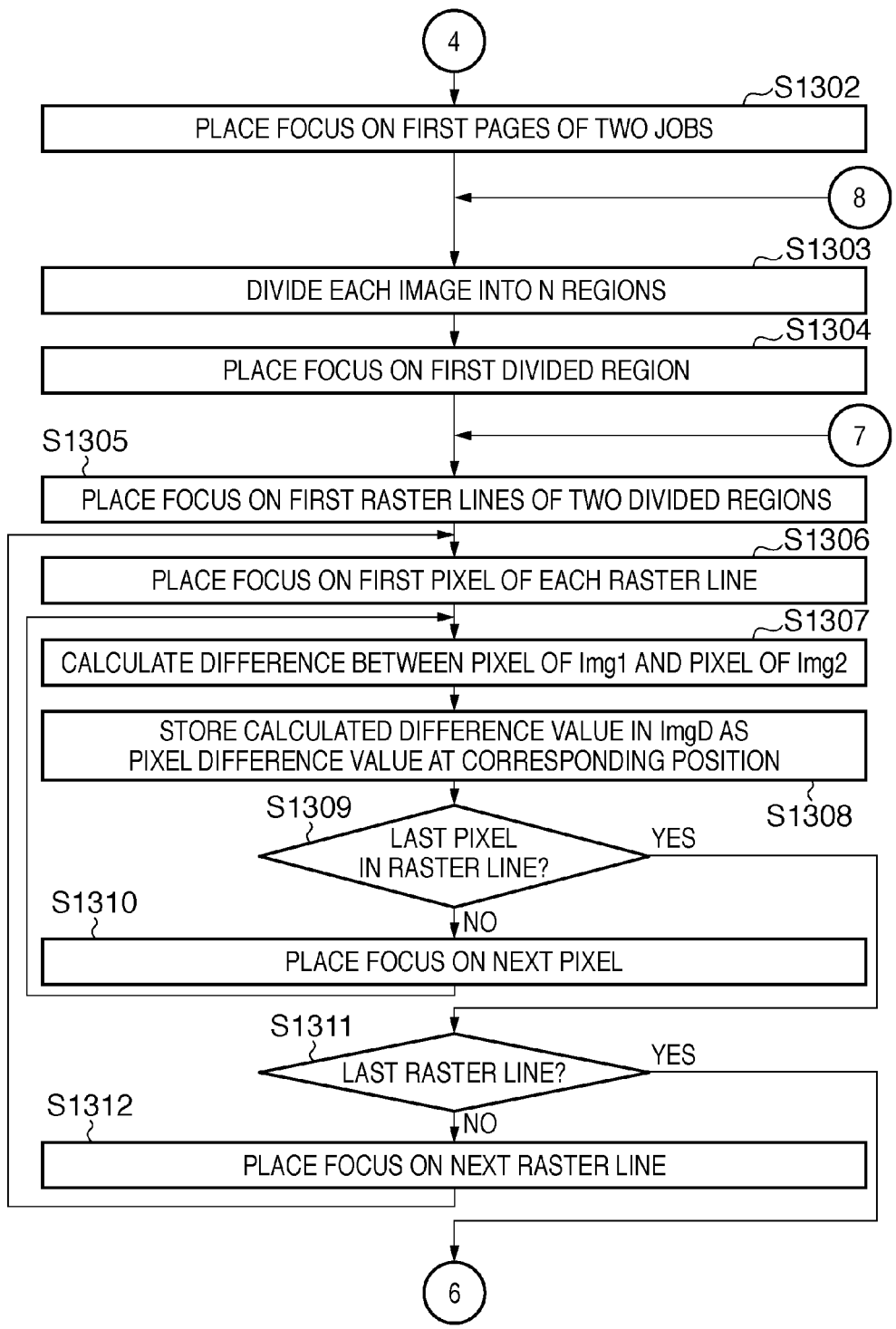

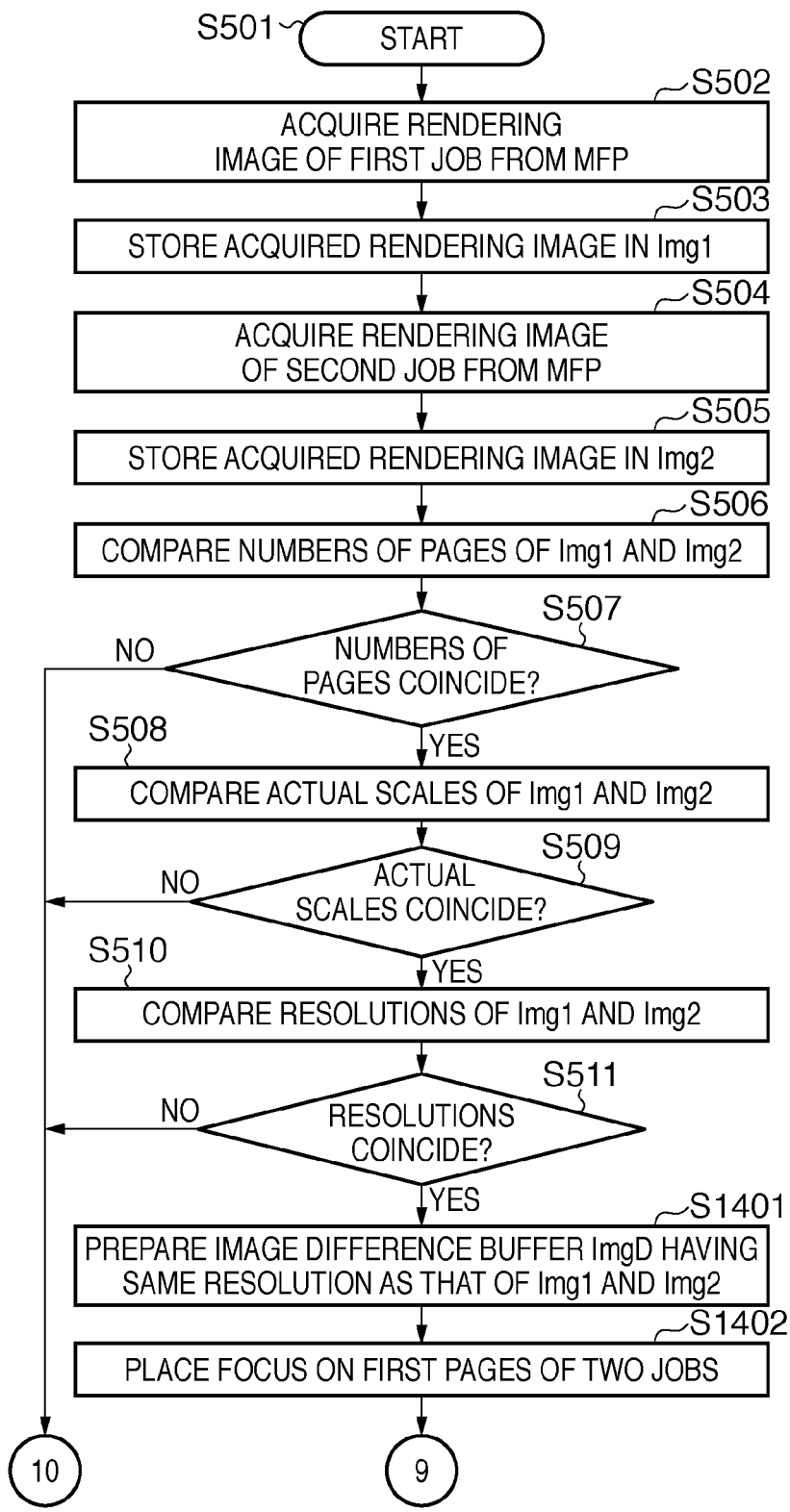

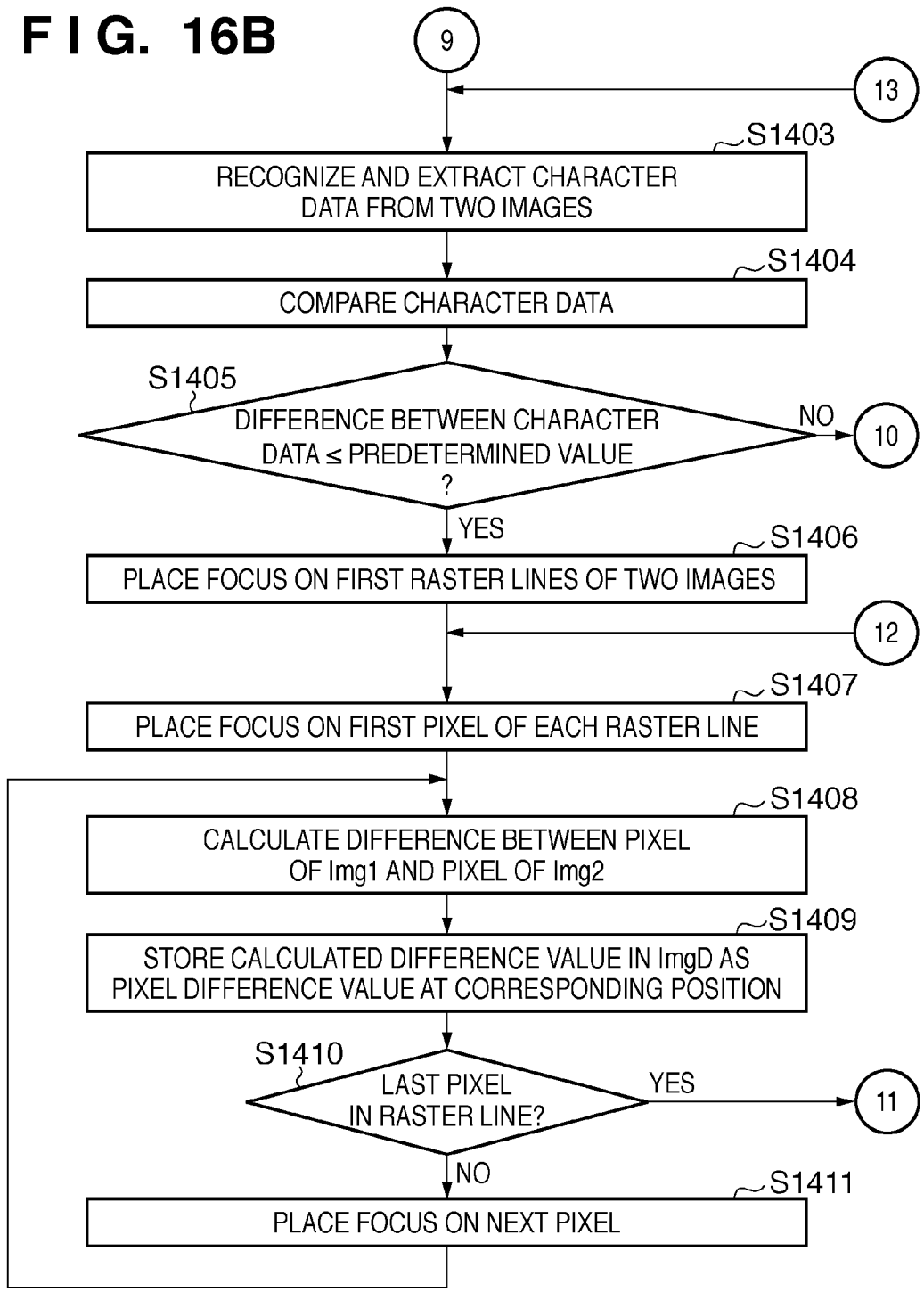

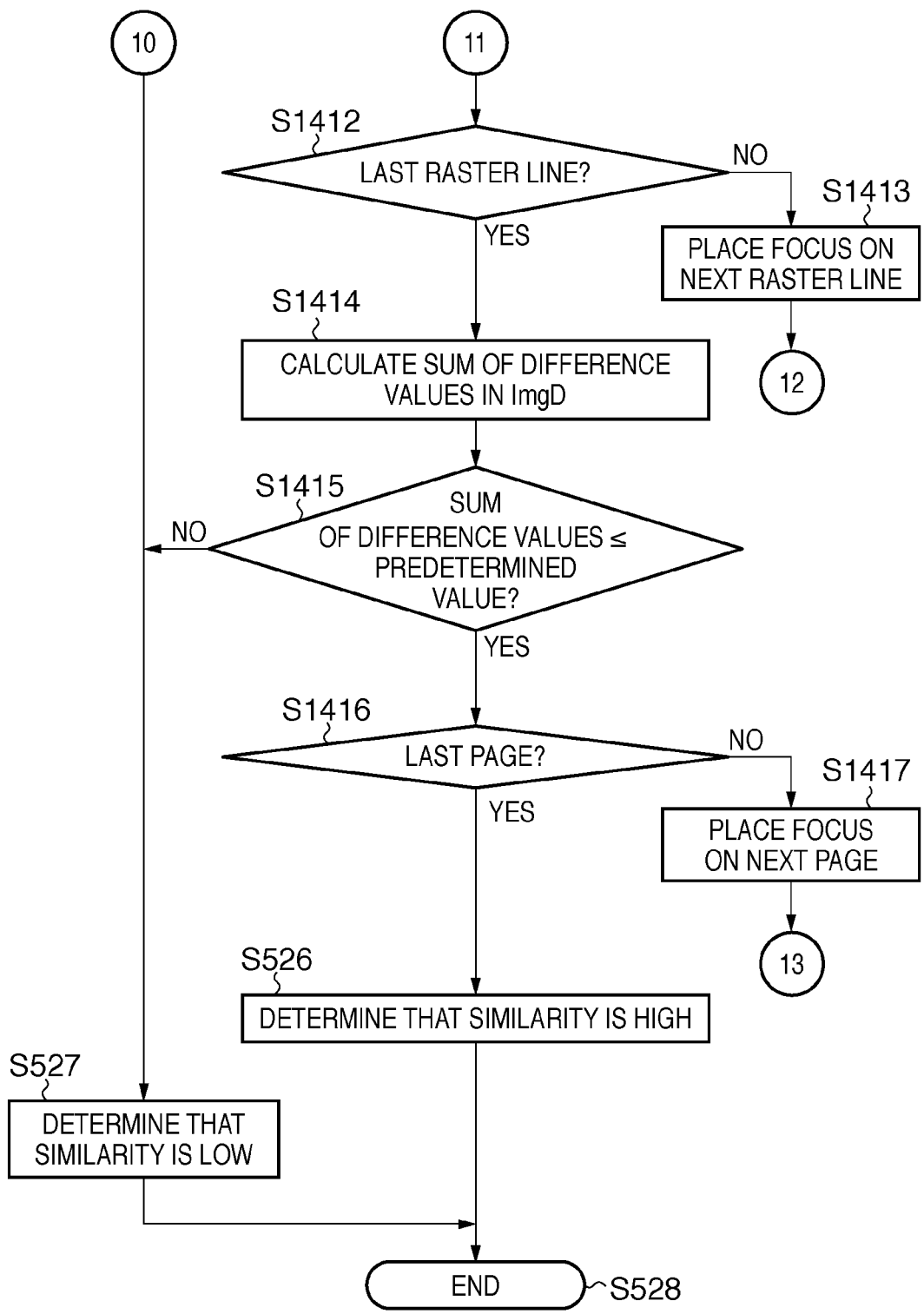

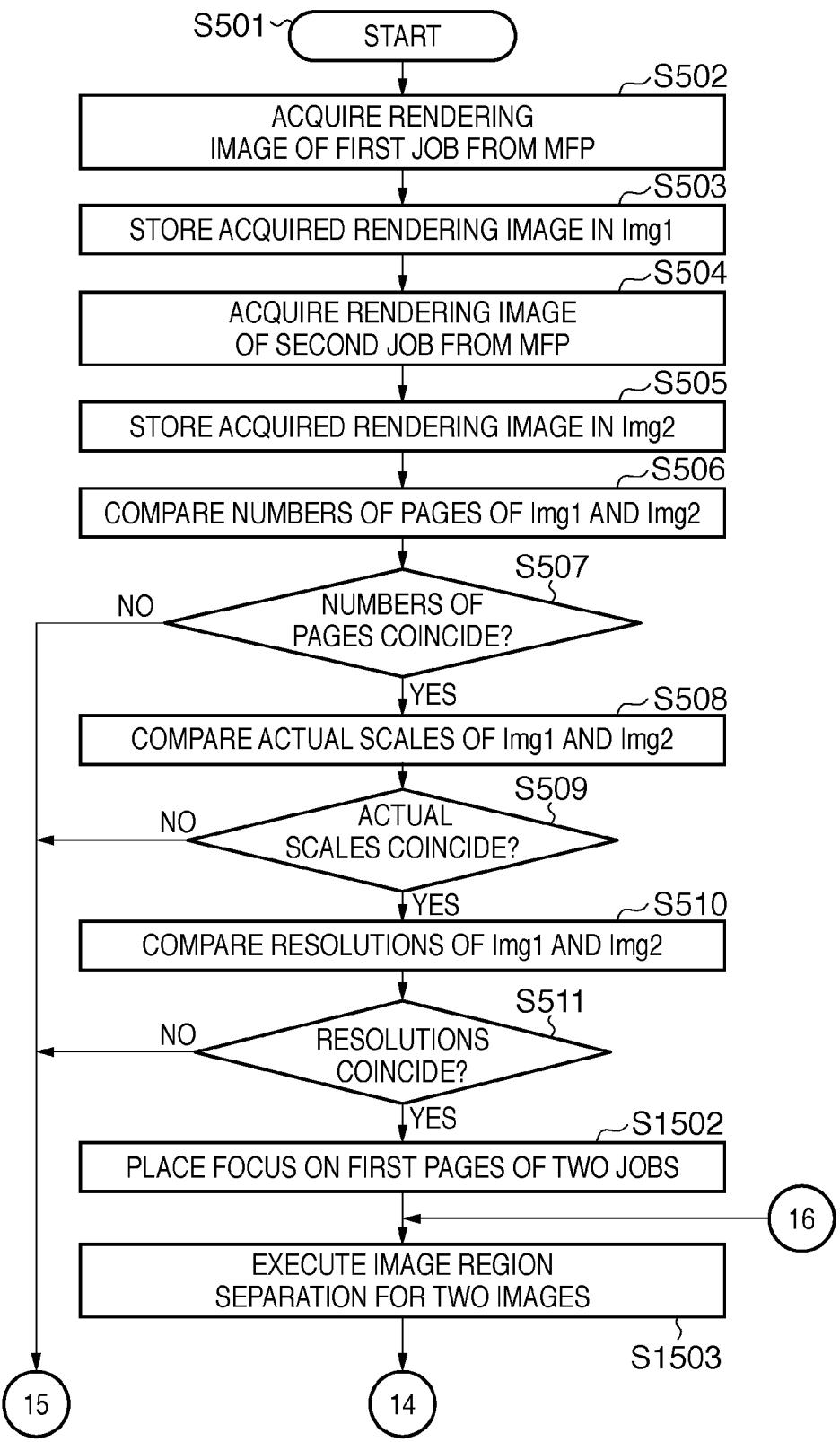

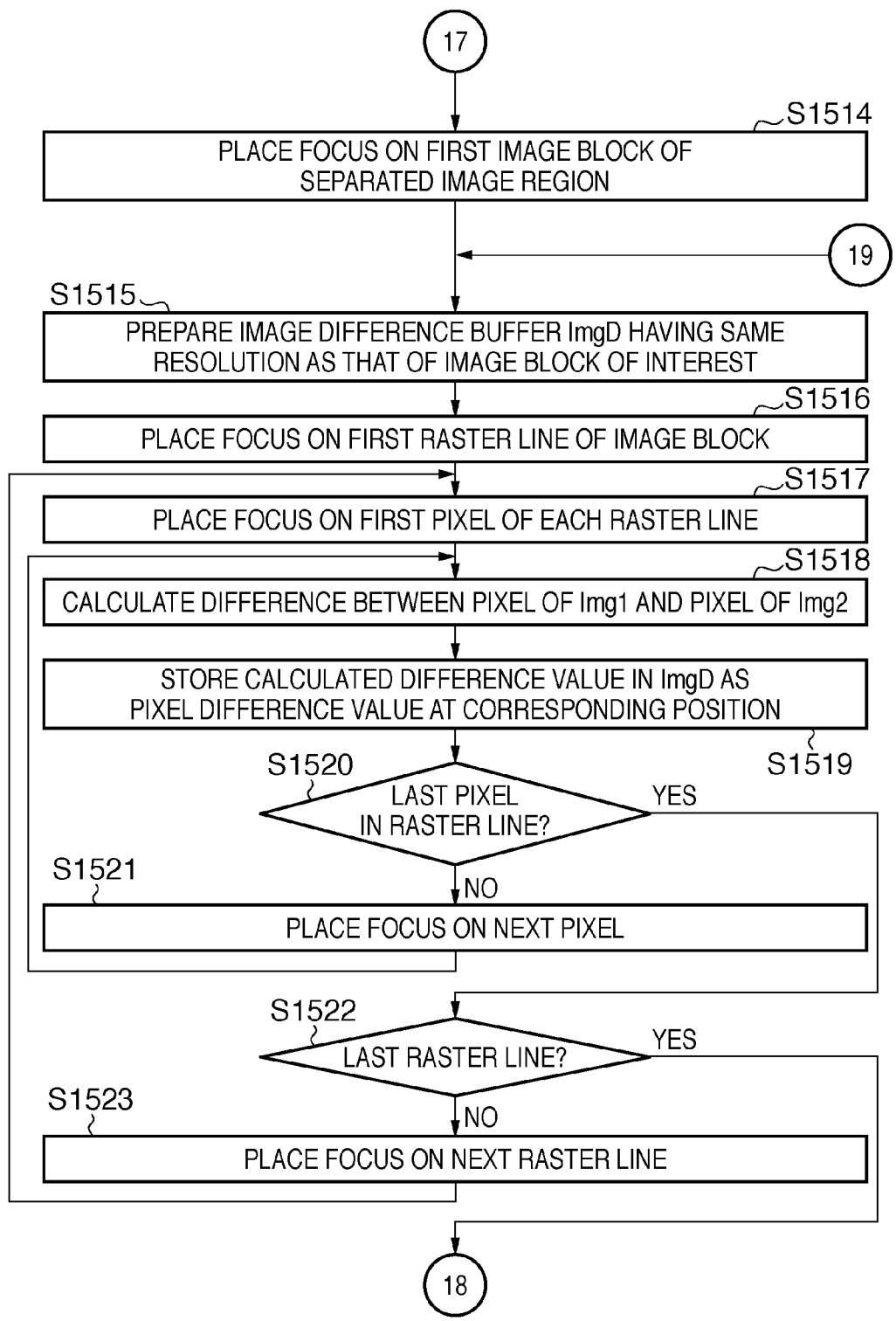

F I G. 18
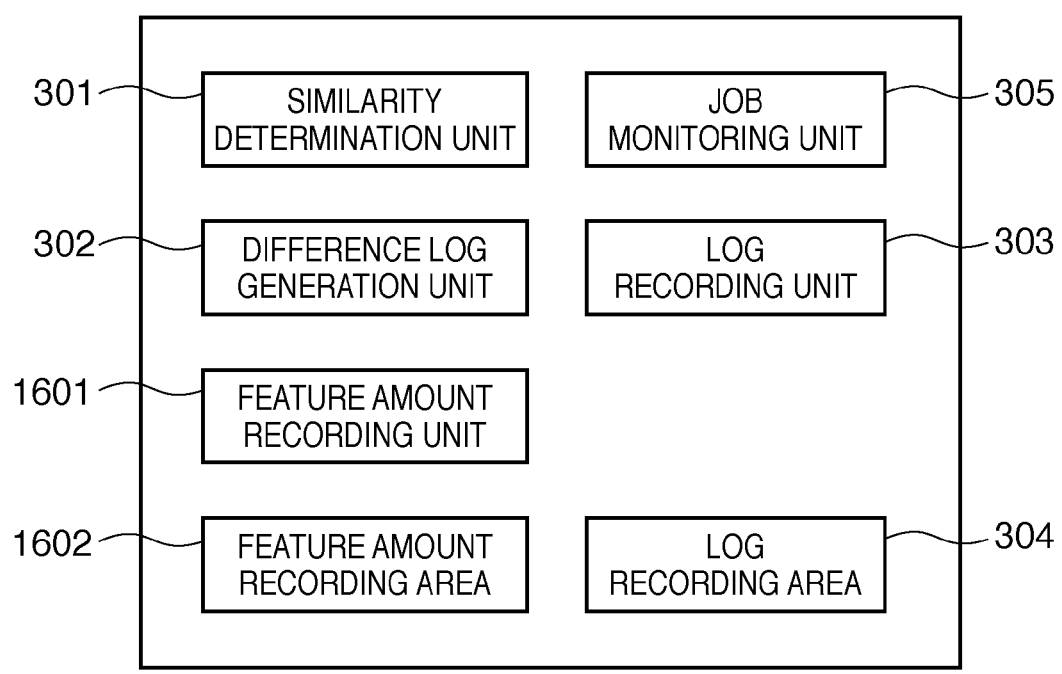

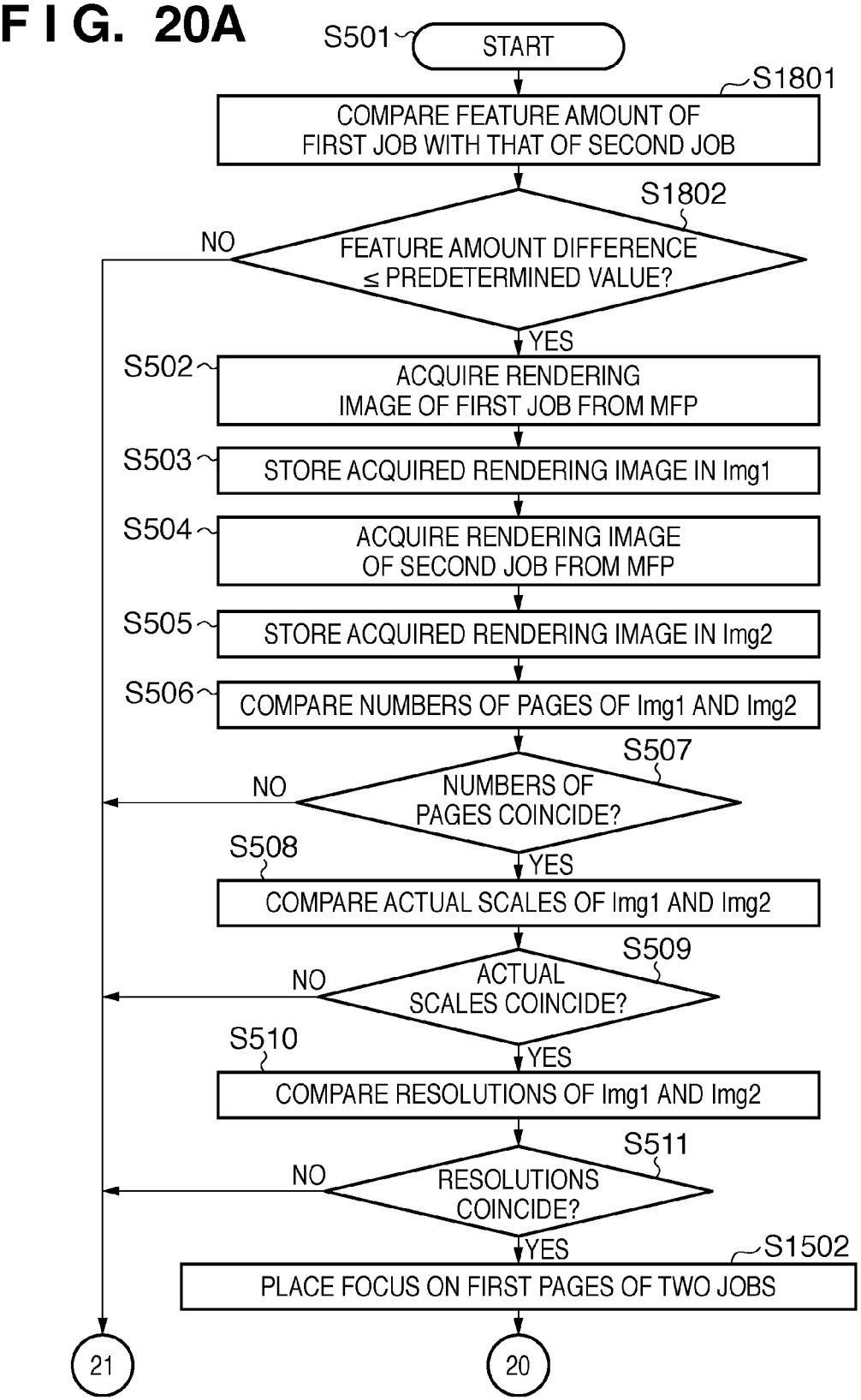

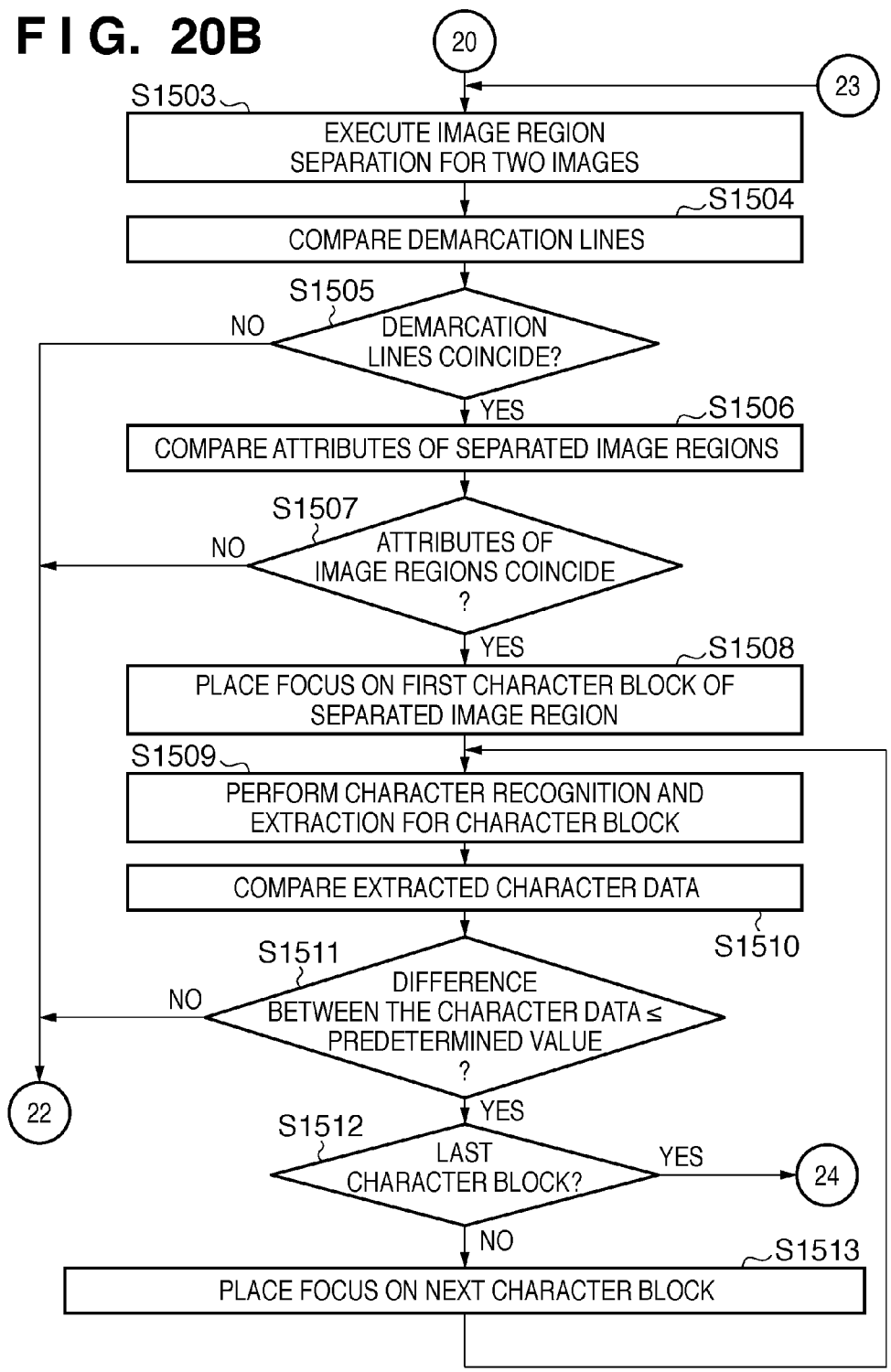

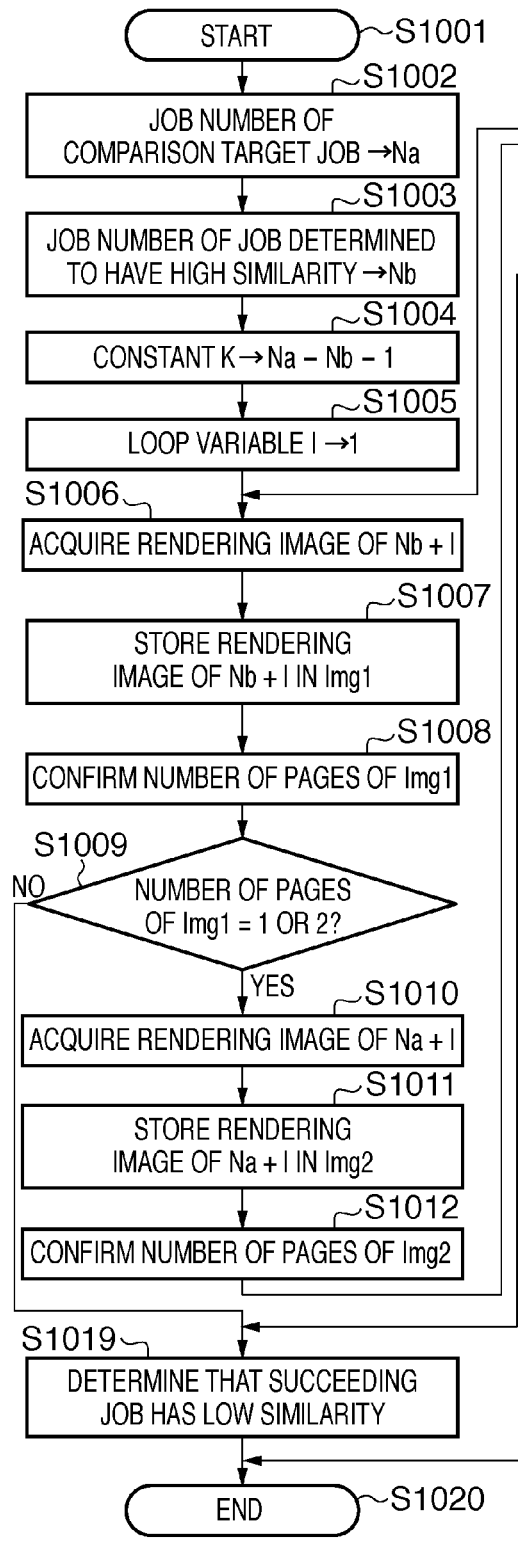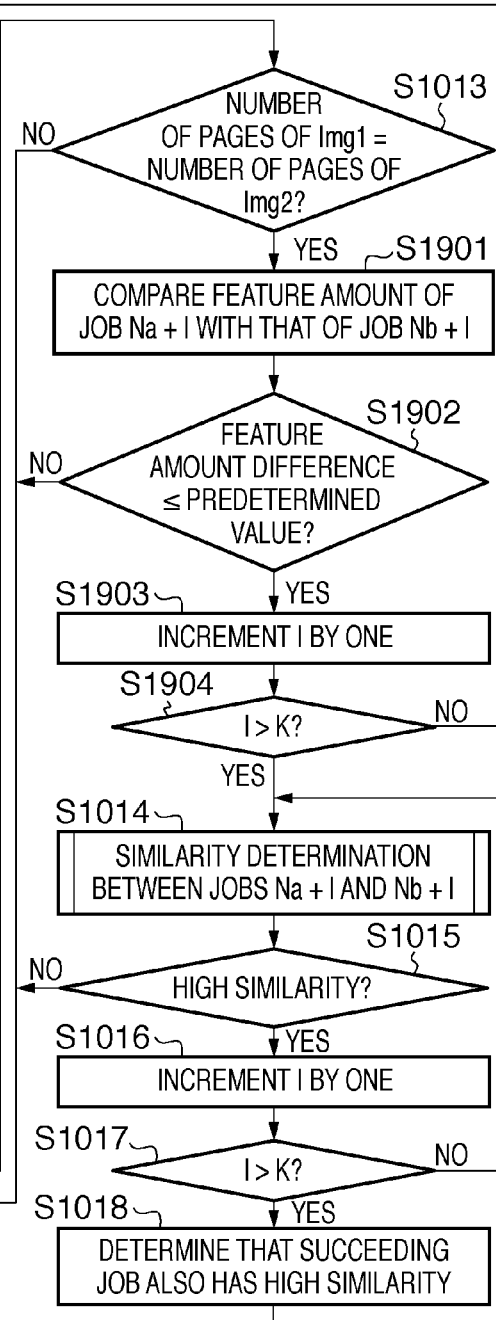
FIG. 21

F I G. 24B
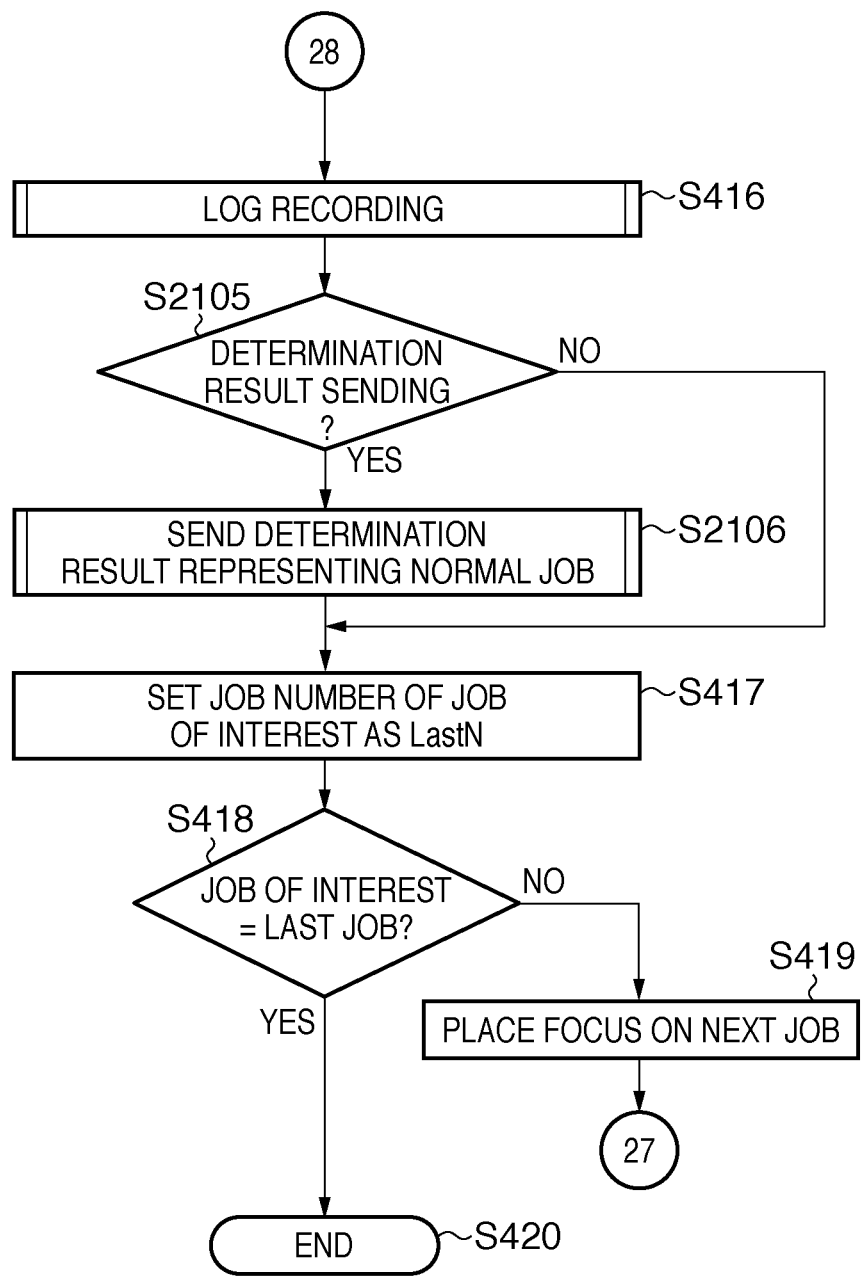

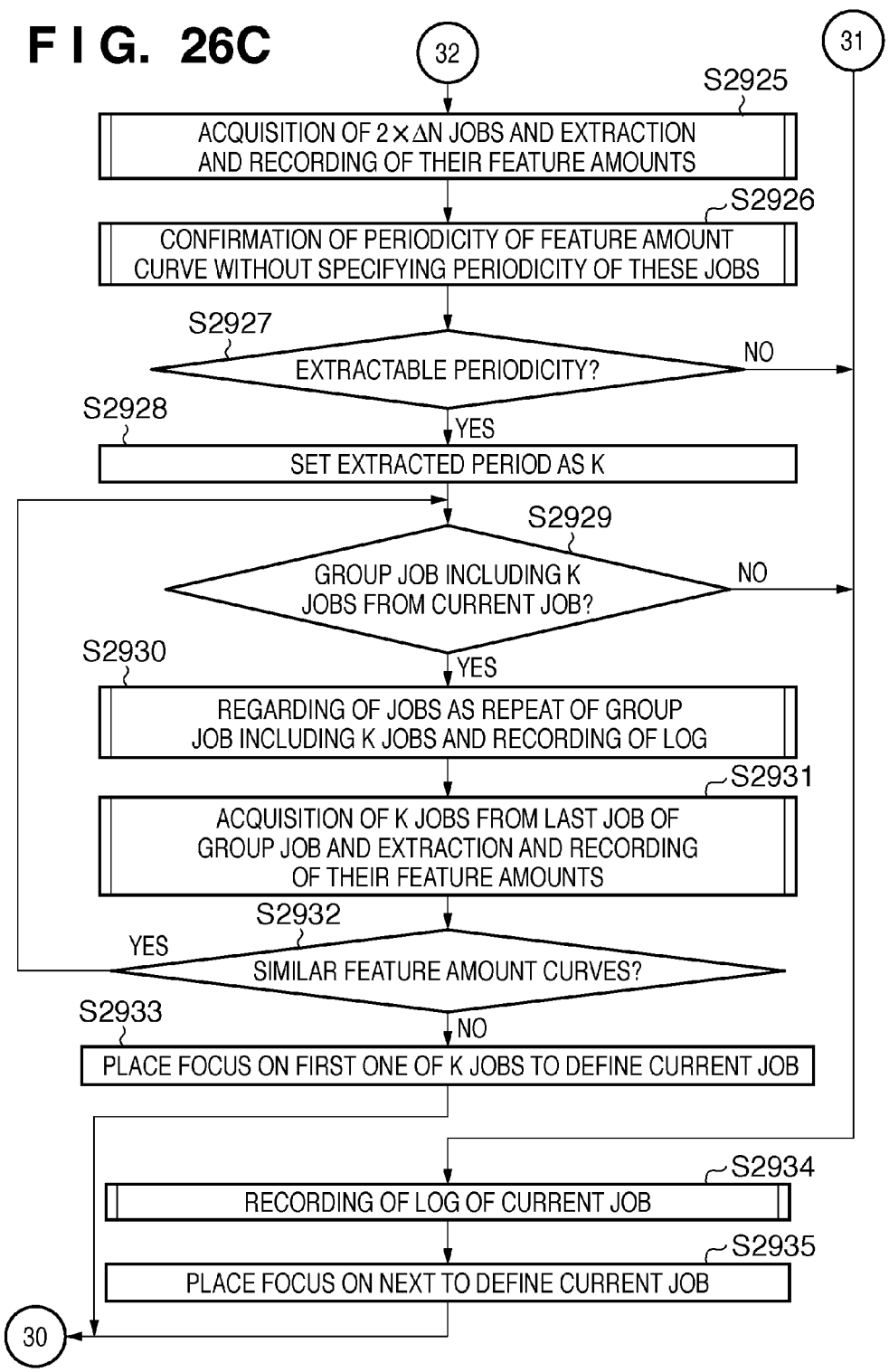

MANAGEMENT APPARATUS, METHOD, AND STORAGE MEDIUM FOR MANAGING JOB LOGS

BACKGROUND OF THE INVENTION

1. Field of the Invention

The present invention relates to a management apparatus, management method, and program, which acquire and manage a job log in a printing system for performing mass printing in a short time.

2. Description of the Related Art

There has conventionally been a management technique of recording the history of print jobs executed in a printing system including a multifunction printer (to be referred to as an MFP hereinafter) using electrophotography.

Data stored as a job log includes the job sender, the sending time, the number of pages, and the information of attribute items such as color/monochrome. A conventional MFP uses a scheme called a ring buffer to record such a job log. The ring buffer sequentially records logs. When the recording capacity has run out, an old log is erased to store a new log. In conventional job log management, considering the period of time until the ring buffer runs out based on predetermined estimation, a management apparatus periodically accesses the MFP to acquire the log information and manages it in another storage area. This aims at uninterrupted log management.

However, this scheme can suffer an unexpected case, as a matter of course. If the MFP has processed jobs beyond the limitation before access of the management apparatus, the ring buffer capacity runs out, and some logs are erased.

Recently growing needs for security are stimulating some systems to manage the actual image of a printed content as a content log. The above-described job log containing no image data will be referred to as an attribute information log here for the sake of discrimination from the content log using an image.

To record content logs, every time the MFP prints a print job, it generates image data for a log and periodically sends accumulated image data to a management apparatus or the like as content logs. The management apparatus that stores the content logs receives the data and achieves log management. The content logs also inevitably put a squeeze on the recording capacity when the MFP has processed jobs beyond the limitation.

Some prior-art techniques cope with such a situation by, for example, outputting a warning and stopping job execution when no recording capacity remains for a content log. These techniques also reduce the data amount of a content log when the remaining recording capacity has decreased (Japanese Patent Laid-Open No. 2006-293833).

Some other techniques define the accuracy of recorded data in accordance with a keyword contained in a document (Japanese Patent Laid-Open No. 2007-079901).

The recent development of the electrophotographic technology allows implementing a printing system that causes an MFP to perform mass printing in a short time. Such a printing system is also used for light commercial printing called print on demand (to be referred to as POD hereinafter).

One of application purposes of POD is variable data print (to be referred to as VDP hereinafter) which prints an enormous number of copies of a printed product, that is, a document including a fixed portion and a variable portion contents of which change for each copy. When an MFP prints a VDP job, a print job may be generated for each copy.

In addition, a printing method called a page mode is used in the POD. When executing printing in the page mode, a job is divided into print jobs each corresponding to one page of a printed product or one paper sheet having two, obverse and reverse pages, and then submitted to the MFP.

If the above-described two techniques are simultaneously applied, jobs as much as (number of pages of target printed product)×(total number of copies) are consequently submitted to the MFP at once. For example, when printing 1,000 copies of a booklet having 100 pages, the number of jobs submitted at once is 50,000 or 100,000. That is, in the VDP or page mode, print jobs more than before are submitted to the MFP in a short time. As a result, the management apparatus handles an enormous number of job logs by force of necessity in such print modes unique to POD.

In POD, printing of a printed product generally starts upon receiving compensation based on an order from a client. In the VDP or page mode, it is difficult to determine, in an enormous number of logs, the range of printing based on a series of print requests. However, there is a strong demand for managing a log associated with a series of print requests.

In the VDP or page mode, the MFP accumulates job logs more than the previous expectation during a short period of time. Needless to say, this raises the possibility that the management apparatus misses logs because of a delay in acquisition.

Printing in the field of POD or the like is particularly productivity-oriented, and it is important to carry out requested printing as efficiently as possible. Hence, the resolution of Japanese Patent Laid-Open No. 2006-293833 which stops printing even if printing is possible cannot be employed because it reduces the production efficiency. In printing of POD, the contents of the printed product change depending on the client. It is therefore difficult for the administrator or the like to set a unified keyword to be used to identify, for example, the importance of a document, and the technique of Japanese Patent Laid-Open No. 2007-079901 cannot solve the above-described problem.

That is, the above-described conventional techniques cannot achieve flexible log management adaptive to printing in the field of POD or the like. A strong demand has arisen for enabling the management apparatus to acquire every log information before the storage area of a ring buffer or the like runs out even under such printing environments. As for content logs based on an enormous number of jobs, each log has a large size, and the recording capacity becomes short.

SUMMARY OF THE INVENTION

Therefore, the present invention provides a technique of enabling appropriate and efficient log recording/management in job log management for unique printing such as POD where an enormous number of jobs are generated in a short period of time.

According to one aspect of the present invention, there is provided a management apparatus including a log management unit which manages log information of jobs processed by an image forming apparatus, comprising: a determination unit which determines, from a plurality of logs included in the log information, a plurality of similar logs based on information included in the logs; and a difference log generation unit which generates, from the information included in each log, a difference log having information in a smaller amount than in an original log for the plurality of logs determined to be similar by the determination unit, wherein the log management unit manages, as logs based on one print request together, the plurality of logs determined to be similar by the determination unit, and manages, as the difference log generated by the difference log generation unit, some of the plurality of logs determined to be similar by the determination unit.

With the above-described arrangement, the present invention can provide a technique of enabling appropriate and efficient log recording/management in log management when an enormous number of jobs are more conspicuously generated in a short period of time.

Further features of the present invention will become apparent from the following description of exemplary embodiments (with reference to the attached drawings).

BRIEF DESCRIPTION OF THE DRAWINGS

FIGS. 5A and 5B are flowcharts illustrating the processing procedure of similarity determination according to the first embodiment;

FIG. 6 is a view showing an example of a distance function according to the present invention;

FIG. 12 is a flowchart illustrating the processing procedure of group job log recording according to the first embodiment;

FIGS. 15A, 15B, and 15C are flowcharts illustrating the processing procedure of similarity determination according to the second embodiment;

FIGS. 16A, 16B, and 16C are flowcharts illustrating the processing procedure of similarity determination according to the third embodiment;

FIGS. 17A, 17B, 17C, and 17D are flowcharts illustrating the processing procedure of similarity determination according to the fourth embodiment;

FIG. 18 is a block diagram showing an example of the internal arrangement of a management apparatus according to the fifth and seventh embodiments;

FIGS. 20A, 20B, 20C, and 20D are flowcharts illustrating the processing procedure of similarity determination according to the fifth embodiment;

FIG. 21 is a flowchart illustrating the processing procedure of determination associated with a group job according to the fifth embodiment;

FIGS. 24A and 24B are flowcharts illustrating the processing procedure of the first management apparatus according to the sixth embodiment;

FIGS. 26A, 26B, and 26C are flowcharts illustrating the processing procedure of a management apparatus according to the seventh embodiment;

DESCRIPTION OF THE EMBODIMENTS

The embodiments of the present invention will now be described with reference to the accompanying drawings.

<First Embodiment>

Figure 1:
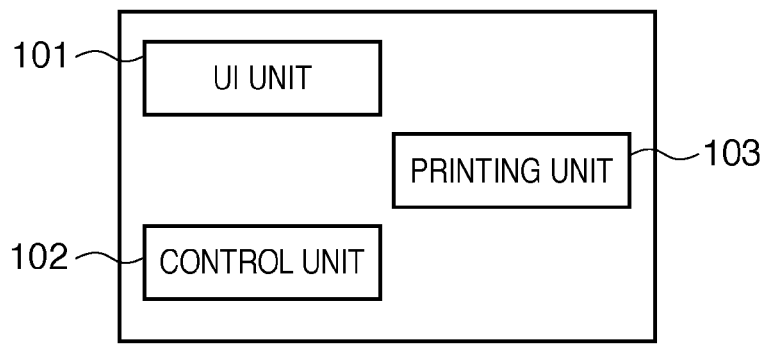
FIG. 1 is a block diagram showing an example of the arrangement of an image forming apparatus (MFP) according to the present invention.

FIG. 1 is a block diagram schematically showing the arrangement of an MFP 202 serving as an image forming apparatus according to this embodiment. The MFP includes a UI unit 101, control unit 102, and printing unit 103. Note that the functions provided by the MFP may include a scan function and a data sending/receiving function using a network.

Figure 2:
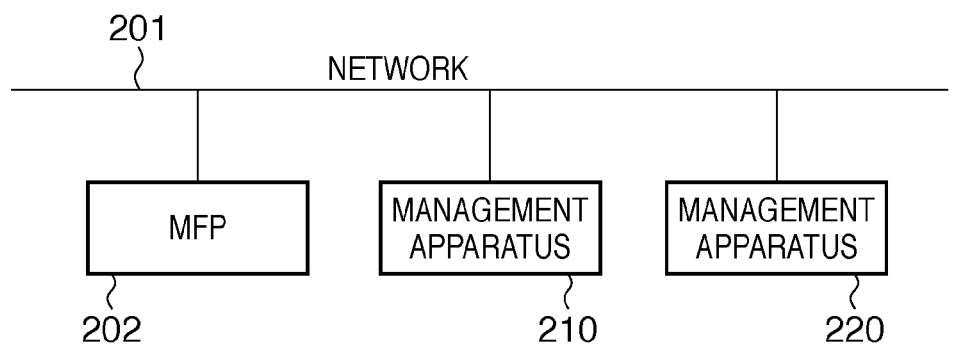
FIG. 2 is a block diagram showing an example of the arrangement of a printing system according to the present invention.

FIG. 2 is a block diagram schematically showing the arrangement of a printing system according to this embodiment. A network 201 connects apparatuses. The MFP 202 is the MFP shown in FIG. 1. Reference numerals 210 and 220 denote management apparatuses.

Figure 3:
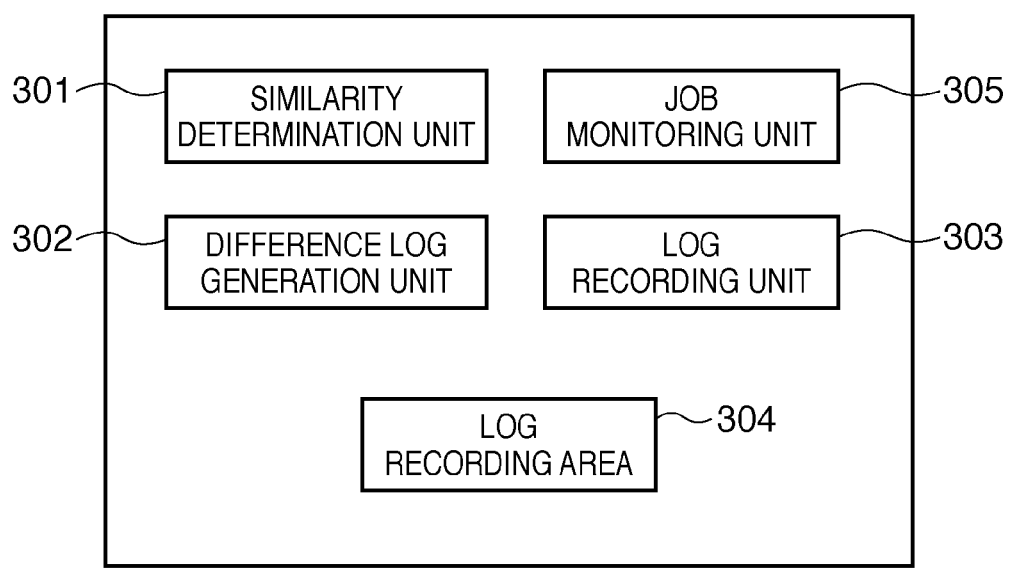
FIG. 3 is a block diagram showing an example of the internal arrangement of a management apparatus according to the present invention.

FIG. 3 is a block diagram schematically showing the internal arrangement and functions of the management apparatus 210 according to this embodiment. The functional modules to be described below exemplify the entities of processes (to be described later) which are performed by causing a CPU to execute programs. The present invention can also be implemented by a program that generates the functional modules as the process entities in each process step of the flowcharts to be described later.

A similarity determination unit 301 compares job contents based on logs, thereby, for example, determining similarity. A difference log generation unit 302 generates a difference log based on the difference information between the logs of similar jobs. A log recording unit 303 records a log in a log recording area 304. A job monitoring unit 305 manages a temporary job of interest and the like when performing processing concerning log management in a monitoring apparatus.

In the embodiment of the present invention, jobs can be evaluated to be similar when the number of items having coincident values in the jobs (job logs) exceeds a predetermined threshold. The items include print settings such as color setting and paper setting, and a feature amount obtained from an image to be printed. Alternatively, the evaluation can be done by comparing the similarities between image data.

<Processing Procedure of Management Apparatus of First Embodiment>

An outline of the internal operation of the management apparatus 210 according to this embodiment will be explained next with reference to FIG. 4. Processing starts in step S401. The processing progresses as the job monitoring unit 305 places focus on one of management target jobs as a reference of similarity determination or the like by another module.

In step S402, the job monitoring unit 305 determines whether the current job of interest is the first job. If YES in step S402, the process advances to step S416. Otherwise, the process advances to step S403.

In step S403, the similarity determination unit 301 compares the contents of the current job of interest with those of the immediately preceding job. In step S404, the similarity determination unit 301 calculates the similarity between them. Upon determining in step S405 that the jobs are similar, the process advances to step S413. Otherwise, the process advances to step S406.

In step S406, the similarity determination unit 301 determines the similarity to each of a plurality of jobs which are selected from continuous jobs including the next preceding job to the (LastN+1)th job by designated a predetermined interval. If it is determined in step S407 that the similarity to one of the jobs is high, the process advances to step S408. If it is determined that none of the jobs has high similarity, the process advances to step S416. LastN is a variable handled in the processing.

In step S408, the similarity determination unit 301 determines the similarity between jobs that follow the jobs determined to have high similarity. Upon determining in step S409 that the succeeding jobs used for the determination have high similarity, the process advances to step S410. Otherwise, the process advances to step S416.

In step S410, the difference log generation unit 302 generates, for the plurality of jobs determined to be similar, a log using information of the extracted difference portion between the similar jobs. The log recording unit 303 records the generated difference log in the log recording area 304 in correspondence with the group job.

It can be determined based on the similarity determination in steps S406 and S408 described above that similar jobs appear at a predetermined interval. For example, if the predetermined interval is 3, it can be determined that following three continuous jobs, three jobs similar to them appear. In this embodiment, the continuous (in this example, three) jobs will be referred to as a group job. For example, when processes of respective pages are divided into jobs by a print request that designates a plurality of copies, a plurality of jobs appear in such a pattern. One group job can be regarded as jobs concerning processing of one copy.

In step S411, the similarity determination unit 301 determines whether another succeeding job indicates the repetition of the same group job. The job on which the job monitoring unit 305 places focus is the succeeding job. Upon determining in step S412 that the succeeding job indicates the repetition of the group job, the process returns to step S410 to generate a difference log. If it is determined that the succeeding job does not indicate the repetition of the group job, the process advances to step S416.

In step S413, since the job of interest and the immediately preceding job are continuous similar jobs, the log recording unit 303 records the log of the continuous similar jobs. Continuous similar jobs can be generated when based on a print request for, for example, printing a plurality of printed products with different addresses, the printed products with different addresses are divided into jobs. The printed product is supposed to be a letter of one page.

In step S414, the similarity determination unit 301 determines whether still another succeeding job is a similar job. The job on which the job monitoring unit 305 places focus is the succeeding job. Upon determining in step S415 that it is a similar job, the process returns to step S413 to perform the same processing. Otherwise, the process advances to step S416.

In step S416, the log recording unit 303 records the current job of interest in the log recording area 304. In step S417, the job number of the job of interest is set in the variable LastN.

In step S418, the job monitoring unit 305 determines whether the current job of interest is the last job. If the job is not the last job, the process advances to step S419. Otherwise, the process advances to step S420. In step S419, the job monitoring unit 305 places focus on the succeeding job. The process then returns to step S402 to control to continue the processing. In step S420, the processing of the management apparatus 210 ends.

<Job Content Comparison and Similarity Determination>

FIGS. 5A and 5B illustrate the internal operation of the similarity determination unit 301 of the management apparatus 210 according to this embodiment in more detail. This processing is executed in similarity determination of steps S403, S404, S406, and S408 in FIG. 4. Note that the image similarity between image data is determined here based on jobs. The similarity determination unit 301 manages image buffers serving as predetermined storage areas for similarity determination. In this embodiment, as a comparison method for a general log, image data is acquired from the MFP. Determination using an acquired content log can be performed in the following way based on image data contained in the log.

Processing starts in step S501. In step S502, rendered image data of a first job is acquired from the MFP 202. In step S503, the acquired image data is stored in an image buffer Img1. In step S504, rendered image data of a second job is acquired from the MFP 202. In step S505, the image data acquired in step S505 is stored in an image buffer Img2.

In step S506, the total number of pages of the first job is compared with that of the second job. In step S507, if the numbers of pages coincide with each other, the process advances to step S508. Otherwise, the process advances to step S527. In step S508, the actual scale of Img1 is compared with that of Img2. In step S509, if the data sizes coincide with each other, the process advances to step S510. Otherwise, the process advances to step S527. In step S510, the resolution of Img1 is compared with that of Img2. In step S511, if the resolutions coincide with each other, the process advances to step S512. Otherwise, the process advances to step S527. In step S512, an image buffer ImgD having the same resolution as that of Img1 and Img2 is prepared. The actual scale indicates the image size at the time of printing. In this embodiment, when both the actual scales and the resolutions coincide with each other, the image data are determined to have a similar format.

In step S513, focus is placed on the first pages of the two jobs. In step S514, focus is placed on the first raster lines of the two image data. In step S515, focus is placed on the first pixel of each raster line of interest. In step S516, the difference between the value of the pixel of interest of Img1 and the value of the pixel of interest of Img2 is calculated. In step S517, the calculated difference value is stored in ImgD in correspondence with the pixel position of interest.

In step S518, it is determined whether the current pixel of interest is the last pixel of the raster line of interest. If it is the last pixel, the process advances to step S520. Otherwise, the process advances to step S519 to move the point of interest to the next pixel of the raster line of interest. After the point of interest has been moved, the process returns to step S516. In step S520, it is determined whether the current raster lines of interest are the last raster lines of Img1 and Img2. If they are the last raster lines, the process advances to step S522. Otherwise, the process advances to step S521 to place focus on the raster line next to the raster line of interest. Then, the process returns to step S515. In step S522, it is determined whether the current pages of interest are the last pages of Img1 and Img2. If the pages are the last pages, the process advances to step S524. Otherwise, the process advances to step S523 to place focus on the next page. Then, the process returns to step S514.

In step S524, the pixel difference values in the image buffer ImgD calculated so far are totalized to obtain the sum of difference values of the whole images. The value is simply referred to as a "sum" here. However, instead of simply adding the difference values while maintaining their signs, some distance function capable of expressing the distance between two images may be used.

In this embodiment, a numerical value obtained by dividing the sum of the absolute values of the difference values by the total number of pixels will be referred to as "the sum of difference values" for the descriptive convenience. FIG. 6 shows the formula of the sum of difference values. S is the sum of difference values to be obtained. In the equation, imax is the number of pages of each job, xmax and ymax are the maximum numbers of pixels in the x- and y-directions when two-dimensionally assigning numbers to the pixels based on the origin "0", dR(i,x,y) is the difference value of the red components of pixels, for the page number i, at coordinates (x,y) defined on the coordinate system based on the assigned numbers, and dG(i,x,y) and dB(i,x,y) are the difference values of the green and blue components. Instead of obtaining such an absolute value average as the sum of difference values, Euclidean distance function or any other suitable function may be used.

In step S525, it is determined whether the thus calculated sum of difference values between the image data is equal to or smaller than a predetermined value. If YES in step S525, the similarity is determined to be high in step S526. Then, the process advances to step S528 to end the processing. Otherwise, the process advances to step S527. In step S527, the similarity is determined to be low. Then, the process advances to step S528 to end the processing.

<Determination of Continuous Similar Job>

Figure 7:
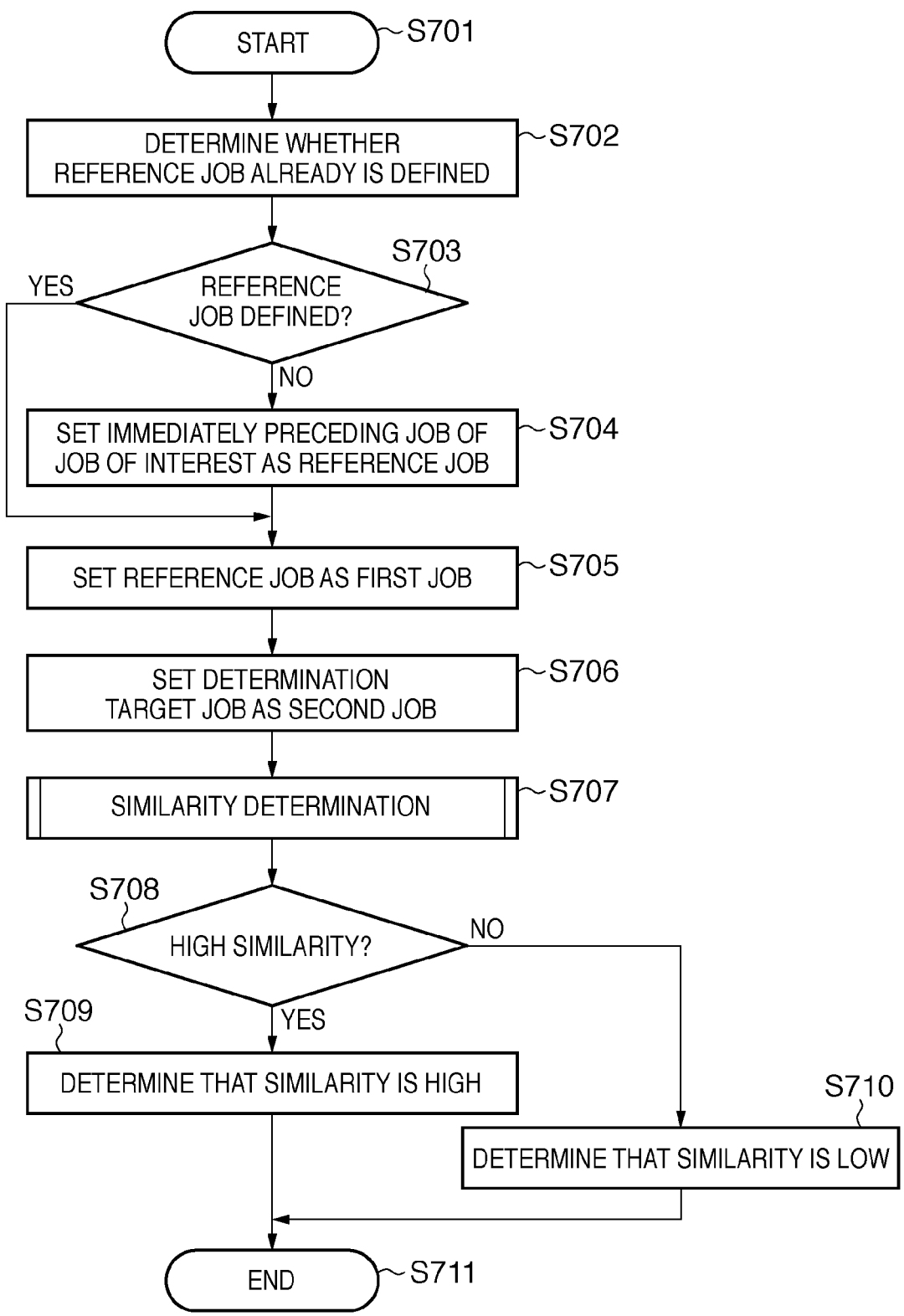
FIG. 7 is a flowchart illustrating the processing procedure of continuous similar job determination according to the first embodiment.

FIG. 7 illustrates the internal operation of the similarity determination unit 301 of the management apparatus 210 according to this embodiment in more detail. This processing is executed in determination of step S414 in FIG. 4. More specifically, the target job of this determination is one of the jobs following the current job of interest in step S414 described above.

Processing starts in step S701. In step S702, it is determined whether a reference job serving as a reference has already been defined. The reference job is used for similarity determination in which the determination target job is handled as a continuous similar job. The reference job indicates, for example, the first (top) one of continuous similar jobs. That is, when the process in step S414 is executed for the first time, no reference job is defined yet.

Upon determining in step S703 that no reference job has been defined, the process advances to step S704. If the reference job has already been defined, the process advances to step S705. In step S704, the immediately preceding job of the job of interest is defined as the reference job. When the reference job has thus been defined, the process advances to step S705.

In step S705, the reference job is set as the first job. In step S706, the determination target job is set as the second job. In step S707, the similarity determination unit 301 compares the first job with the second job in accordance with the procedure shown in FIGS. 5A and 5B, thereby determining the similarity. The determination result is referred to in step S708, and the similarity is determined to be high in step S709. Then, the process advances to step S711 to end the processing. Alternatively, the determination result is referred to in step S708, and the similarity is determined to be low in step S710. Then, the process advances to step S711 to end the processing.

<Log Recording of Continuous Similar Job>

Figure 8:
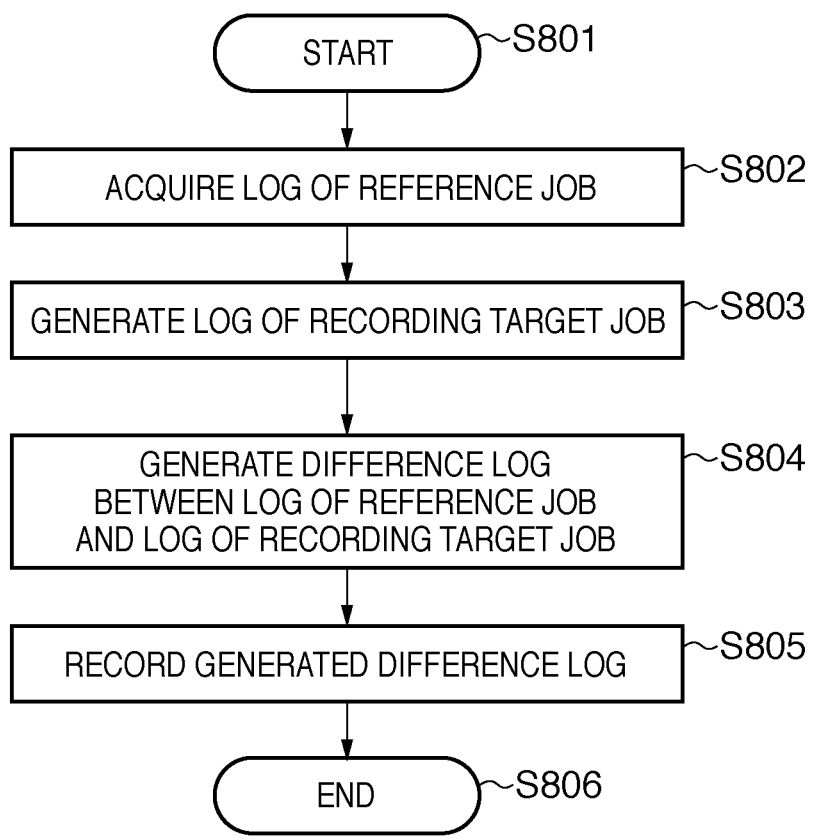
FIG. 8 is a flowchart illustrating the processing procedure of continuous similar job log recording according to the first embodiment.

FIG. 8 illustrates the internal operation of the log recording unit 303 of the management apparatus 210 according to this embodiment in more detail. This processing is executed in step S413 of FIG. 4.

Processing starts in step S801. In step S802, the history of the reference job is extracted from the log recording area 304. The reference job is the top one of continuous similar jobs, as described above. In step S803, the log of the recording target log of this processing is generated from the log recording area 304. The generated log includes the sender, the sending time, the number of pages, attribute information such as color/monochrome, and image data and image feature amount based on the job.

In step S804, the difference log generation unit 302 obtains the difference between the log of the recording target job and the log of the reference job to generate a difference log. The difference log includes the job number of the recording target job, the job number of the reference job, and information that associates the obtained difference value. The obtained difference contains values that are different concerning attribute items, the difference value between image data, and the like. For example, a set of difference values of pixels between the rendered image data may be obtained as the difference value. It is necessary to only reproduce the log of the recording target job using the log of the reference job and the obtained difference value.

In step S805, the log recording unit 303 records the generated difference log in the log recording area 304. Note that when recording the difference value, the information may be compressed as needed. After the recording has ended, the process advances to step S806 to end the processing.

<Similarity Determination of Jobs at Predetermined Interval>

Figure 9:
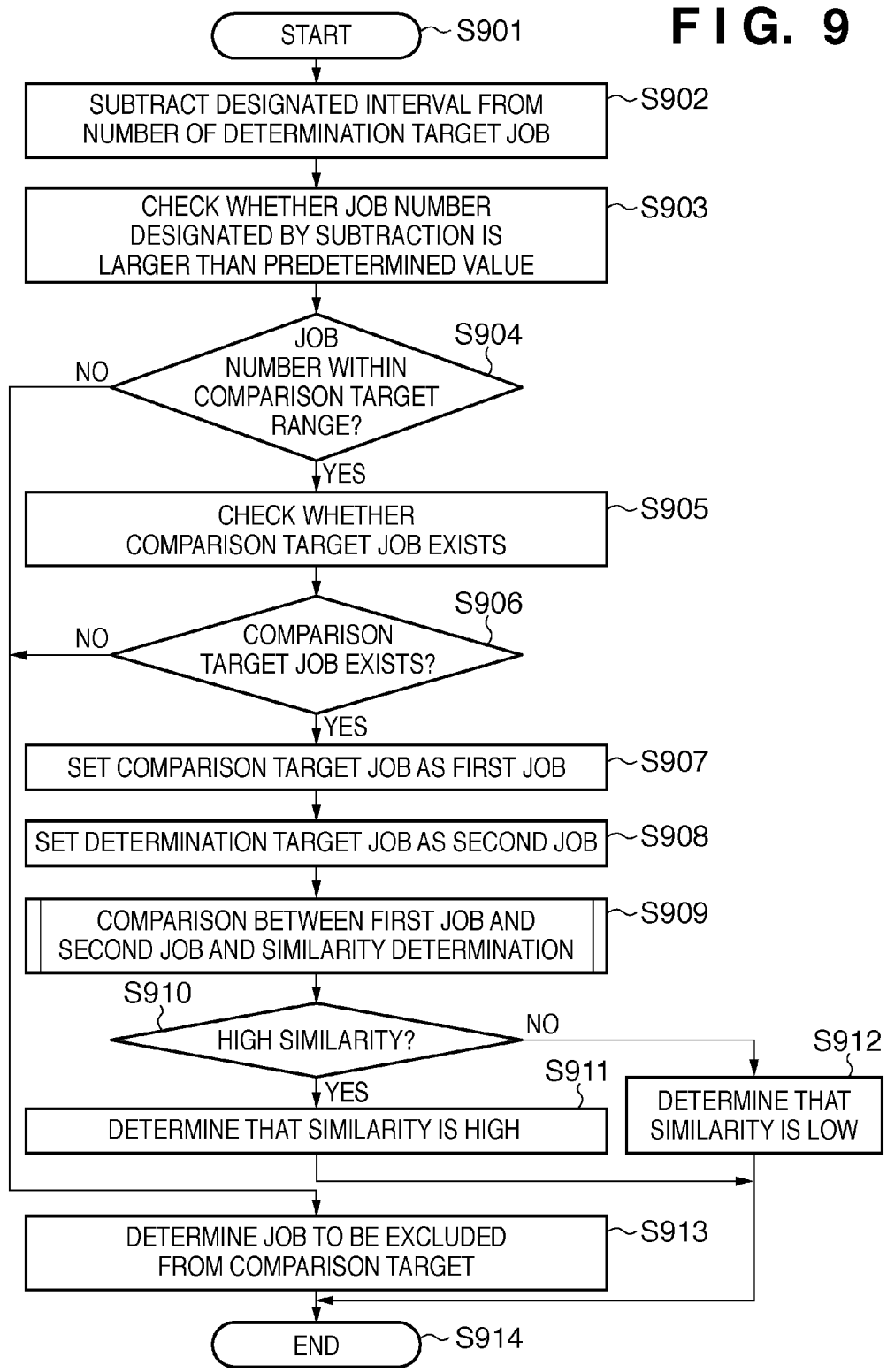
FIG. 9 is a flowchart illustrating a processing procedure of determining whether similar job logs exist at a predetermined interval according to the first embodiment.

FIG. 9 illustrates the internal operation of the similarity determination unit 301 of the management apparatus 210 according to this embodiment in more detail. This processing is executed in step S406 of FIG. 4.

Processing starts in step S901. In step S902, a predetermined number is subtracted from the job number of the determination target job. In step S903, it is checked whether the job number designated after the subtraction is larger than a predetermined value, that is, LastN. Jobs from the job number LastN are similar to preceding jobs in accordance with a specific pattern (continuously or at an equal interval). Hence, in this processing, jobs from the job number LastN are supposed to be similar to the determination target job at an extremely low probability and therefore excluded from the comparison determination target of this processing, thereby reducing the process load. Jobs outside the comparison determination target have job numbers smaller than LastN.

In step S904, if the job number obtained in step S902 is smaller than the job number LastN, the process advances to step S913. In this case, the job is determined to be excluded from the comparison determination target. The processing ends in step S914. In step S904, if the job number obtained in step S902 falls within the comparison target range, the process advances to step S905. In step S905, it is determined whether the job of the job number obtained in step S902 actually exists. Upon determining in step S906 that the job exists, the process advances to step S907. Upon determining that the job does not exist, the process advances to step S913.

In step S907, the job of the job number obtained in step S902 is set as the first job. In step S908, the determination target job is set as the second job. In step S909, the similarity determination unit 301 compares the contents of the first and second jobs in accordance with the procedure in FIGS. 5A and 5B, thereby determining the similarity. Upon determining in step S910 that the similarity is high, the process advances to step S911 to determine that the similarity to the preceding job at the interval corresponding to the number subtracted in step S902 is high, and the processing ends in step S914. Upon determining in step S910 that the similarity is low, the process advances to step S912 to determine that the similarity to the preceding job at the interval corresponding to the number subtracted in step S902 is low, and the processing ends in step S914.

<Determination of Group Job>

Figure 10:
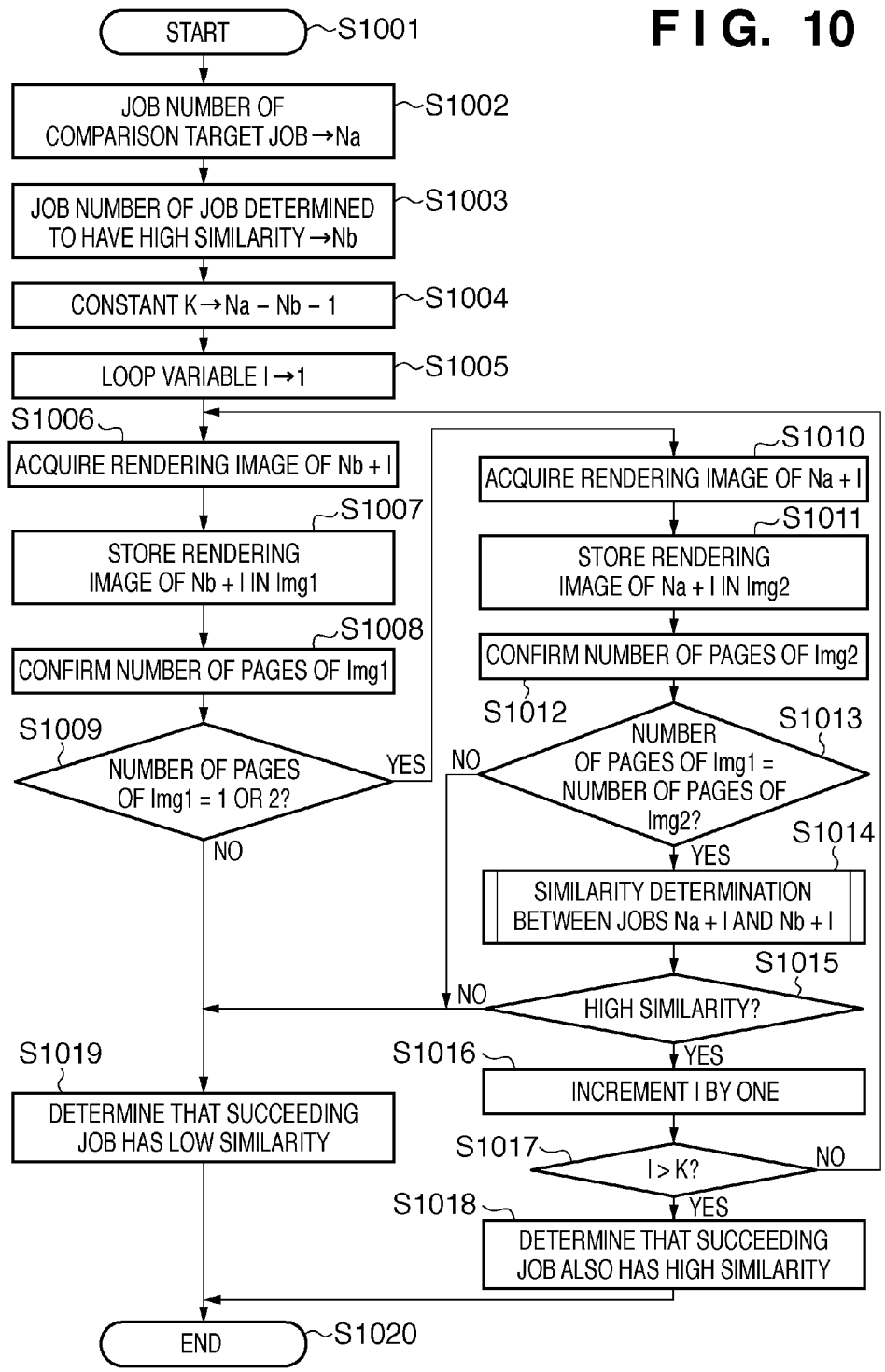
FIG. 10 is a flowchart illustrating the processing procedure of determination associated with a group job according to the first embodiment.

FIG. 10 illustrates the internal operation of the similarity determination unit 301 of the management apparatus 210 according to this embodiment in more detail. This processing is executed in step S408 of FIG. 4 when determining the similarity between jobs following the similar job found by the processing shown in FIG. 9.

Processing starts in step S1001. In step S1002, the job number of the job set as the second job in step S908 of FIG. 9 is set as Na. Na is the reference of the comparison target job of this processing. In step S1003, the job number of the job determined to have high similarity in FIG. 9 is set as Nb. In step S1004, a constant K is set as Na−Nb−1. In step S1005, a loop variable I is set to 1. In step S1006, the rendering image of the job of the job number Nb+I is acquired from the MFP 202. In step S1007, the acquired rendering image is stored in Img1. In step S1008, the number of pages of Img1 is checked. Upon determining in step S1009 that the number of pages of Img1 is 1 or 2, the process advances to step S1010. Otherwise, the process advances to step S1019 to determine that the similarity of the job following the job determined to have high similarity in FIG. 9 is low (the job does not satisfy the group job condition), and the processing ends in step S1020.

In step S1010, the rendering image of the job of the job number Na+I is acquired from the MFP 202. In step S1011, the acquired rendering image is stored in Img2. In step S1012, the number of pages of Img2 is checked. Upon determining in step S1013 that the number of pages of Img2 equals that of Img1, the process advances to step S1014. Otherwise, the process advances to step S1019 to determine that the similarity of the job following the job determined to have high similarity in FIG. 9 is low, and the processing ends in step S1020. In step S1014, the similarity between the job Nb+I and the job Na+I is determined. The similarity determination procedure is the same as that described with reference to FIGS. 5A and 5B. Upon determining in step S1015 that the similarity is high, the process advances to step S1016. Otherwise, the process advances to step S1019 to determine that the similarity of the job following the job determined to have high similarity in FIG. 9 is low, and the processing ends in step S1020. In step S1016, I is incremented by one. If it is determined in step S1017 that I is larger than K, the process advances to step S1018. Otherwise, the process returns to step S1006.

In step S1018, it is determined at the result of the above-described processes that each of the K jobs of the job numbers Nb to Nb+K−1 has high similarity to the K comparison target jobs of the job numbers Na to Na+K−1. This indicates that the jobs can be handled as the above-described similar group job. Finally, the process advances to step S1020 to end the processing.

<Procedure of Determining/Detecting Group Job of Same Type>

Figure 11:
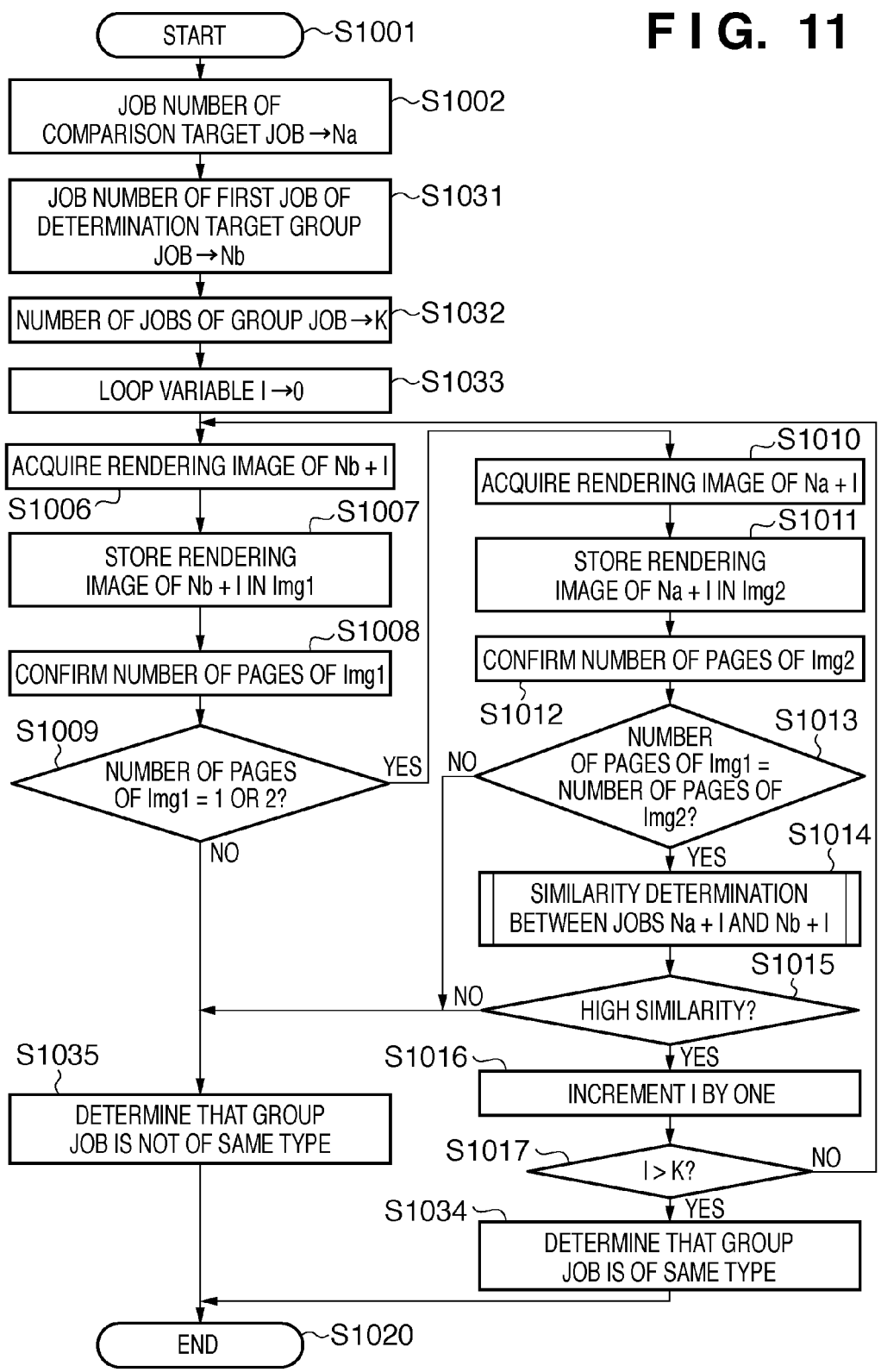
FIG. 11 is a flowchart illustrating a processing procedure of determining whether group jobs continue according to the first embodiment.

FIG. 11 illustrates the internal operation of the similarity determination unit 301 of the management apparatus 210 according to this embodiment in more detail. This processing is executed to determine whether a plurality of jobs following the two similar group jobs found by the processing shown in FIG. 10 form a group job of the same type. This processing is executed in step S411 of FIG. 4.

Note that in this processing, almost the same processing as in FIG. 10 is executed to determine the similarity between each job of the group job found in FIG. 10 and further succeeding determination target jobs equal in number to the jobs of the group job. Only the difference from the processing in FIG. 10 will be explained here. The premise of this processing is that jobs of two or more continuous groups are found to be similar to each other. A preceding one of the group jobs is the comparison target group job. A plurality of jobs equal in number to the jobs of a group job following the last one of those group jobs correspond to the determination target group job.

In step S1031, the job number of the first (top) job of the determination target group job is set as Nb. In step S1032, the number of jobs included in the group job is set as K. In step S1033, the loop variable I is set to 0. In this case, I is set to 0 because it is necessary to determine the similarities of all jobs included in the group job. In step S1034, it is determined that the group job is of the same type. In step S1035, it is determined that the group job is not of the same type. Then, the process advances to step S1020 to end the processing. Note that when the processing ends here, the job on which focus is placed in FIG. 4 is the job following the last job of the plurality of similar group jobs. After this processing, if NO in step S412 of FIG. 4, the log of the job of interest is recorded in step S416.

<Procedure of Recording Difference Log of Group Jobs>

FIG. 12 illustrates the internal operation of the log recording unit 303 of the management apparatus 210 according to this embodiment in more detail. This processing is executed in step S410 of FIG. 4.

Processing starts in step S1101. The premise of this processing is that a group job to be recorded and the number of jobs of that group job are found by the processes in FIGS. 10 and 11. In step S1102, the job number of the first job of the comparison target group job is set as Na. In step S1103, the job number of the first job of the determination target group job to be subjected to difference recording is set as Nb. In step S1104, the number of jobs included in the group job is set as K. In step S1105, it is determined whether logs have already been recorded for the comparison target group job, that is, the K jobs of the job numbers Na to Na+K−1. If YES in step S1105, the process advances to step S1116. Otherwise, the process advances to step S1106.

In step S1106, a log A for the group job is newly generated. In step S1107, the loop variable I is set to 0. In step S1108, the log of the job of the job number Na+I is registered in the job history A. In step S1109, I is incremented by one. In step S1110, it is determined whether I=K. If YES in step S1110, the process advances to step S1111. Otherwise, the process returns to step S1108. In this loop, the logs of the jobs included in the comparison target group job are registered together as the information of the log A. In step S1111, the log recording unit 303 records the log A generated so far as the log of the job Na. In this case, the log A replaces the log of the job Na.

In step S1112, the loop variable I is set to 1. In step S1113, the log of the job of the Na+I is erased. In step S1114, I is incremented by one. In step S1115, it is determined whether I=K. If YES in step S1115, the process advances to step S1117. Otherwise, the process returns to step S1113 to continue the processing. Since the logs are recorded together as the log of the group job in step S1111, the log of each job included in an unnecessary group job is erased to decrease the recording amount.

Figure 13:
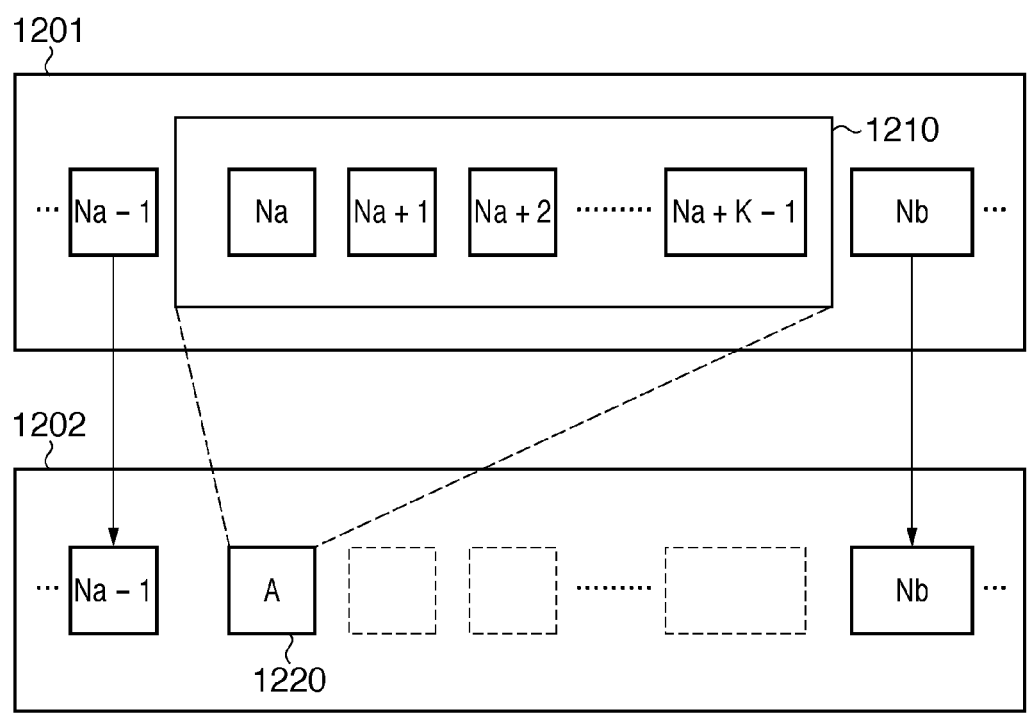
FIG. 13 is a view showing managed and recorded log information according to the first embodiment.

FIG. 13 schematically shows a log change when the processes in steps S1106 to S1115 are executed. Log information 1201 includes the logs of all jobs before processing. Log information 1202 is log information after processing. Log information 1210 indicates the logs of the jobs of the job numbers Na to Na+K−1 included in the group job. Log information 1220 is the above-described log A corresponding to the group job that aggregates the logs of the jobs of the job numbers Na to Na+K−1. In the log information 1202, the logs of the jobs of the job numbers Na+1 to Na+K−1 are erased, and blanks are formed at their positions.

Referring back to FIG. 12, the process from step S1116 will be described. In step S1116, the log (above-described log A) of the comparison target group job, which is already recorded, is acquired. In step S1117, a log B for the determination target group job is generated. In step S1118, the loop variable I is set to 0. In step S1119, the log of the job of the job number Na+I is extracted from the log A. In step S1120, the difference log generation unit 302 generates the difference log between the log of the job of the job number Nb+I and the log of the job of the job number Na+I. In step S1121, the generated difference log is additionally recorded in the log B. In step S1122, I is incremented by one. In step S1123, it is determined whether I=K. If YES in step S1123, the process advances to step S1124. Otherwise, the process returns to step S1119. In step S1124, the log recording unit 303 records the log B generated so far as the log of the job of the job number Nb. The difference logs between the group jobs are thus recorded together as one log. In step S1125, the loop variable I is set to 1. In step S1126, the log of the job of the Nb+I is erased. The process advances to step S1127 to increment I by one. In step S1128, it is determined whether I=K. If YES in step S1128, the process advances to step S1129 to end the processing. Otherwise, the process returns to step S1126.

Figure 14:
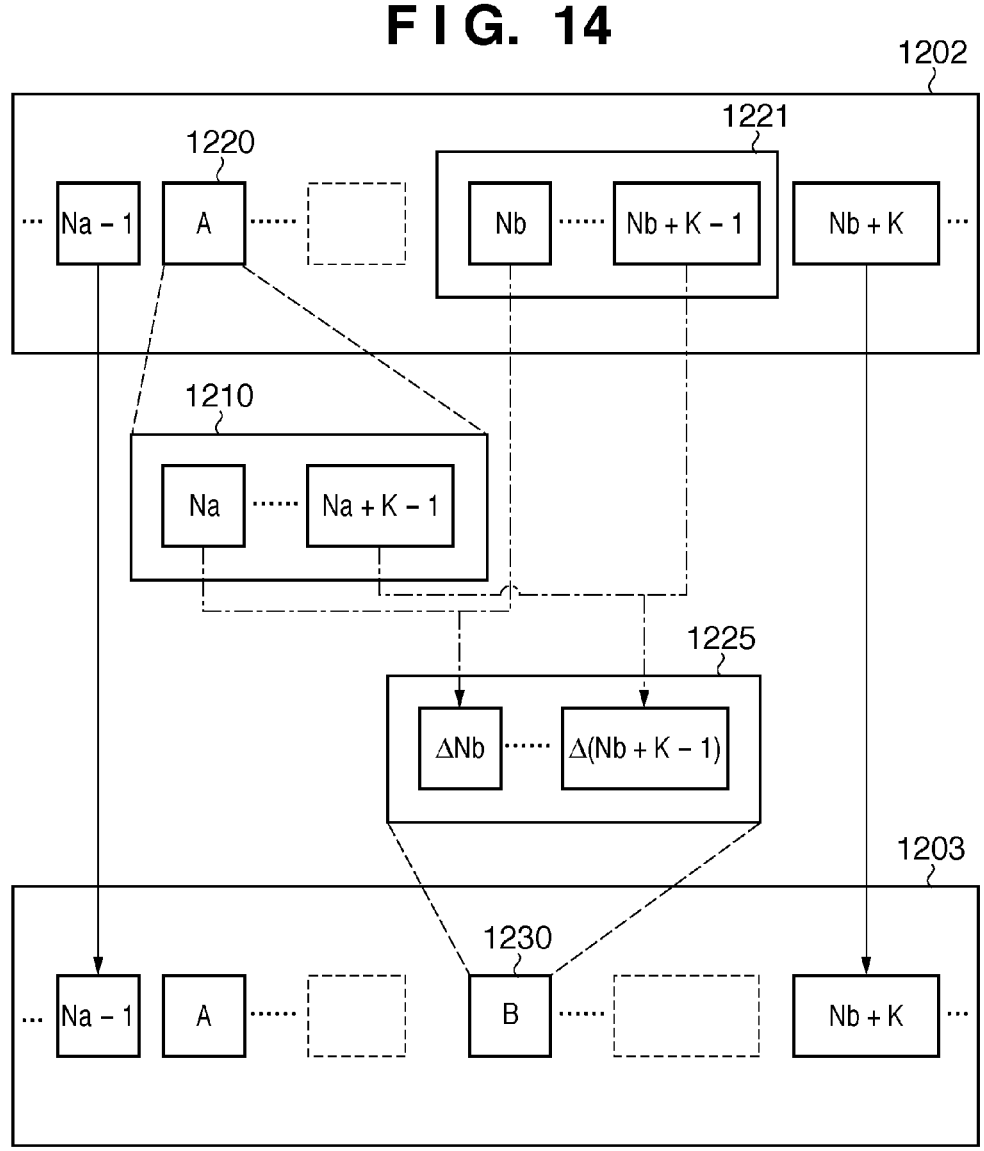
FIG. 14 is a view showing managed and recorded log information according to the first embodiment.

FIG. 14 schematically shows a log change when the processes in steps S1116 to S1128 are executed. More specifically, FIG. 14 shows recording of a difference log (log B 1230) corresponding to the log of the determination target group job included in the log information 1202. Log information 1203 is log information after processing.

Log information 1221 represents the states of the logs of jobs of the job numbers Nb to Nb+K−1 included in the group job. Log information 1220 is the above-described log A corresponding to the group job that aggregates the logs of the jobs of the job numbers Na to Na+K−1.

Log information 1225 represents the difference logs between the logs of jobs included in the comparison target group job indicated by the log information 1210 and the logs of jobs included in the determination target group job that are similar to the above jobs and indicated by the log information 1221. The difference log generated from the logs Na and Nb is expressed as ΔNb.

The difference log (log B 1230) generated by the processing based on the determination target group job is recorded as indicated by the log information 1203. In the log information 1203, the logs of the jobs of the job numbers Nb+1 to Nb+K−1 are erased, and blanks are formed at their positions.

<Effects of First Embodiment>

As described above, the management apparatus 210 of this embodiment can determine whether the logs of jobs that continuously arrive are continuous similar jobs or continuous similar group jobs. This enables to manage a plurality of logs as a group supposed to correspond to a series of print requests. In addition, to suppress the storage capacity of job logs and more efficiently manage the logs, only difference logs of several logs can be recorded using the determination result.

Hence, even if an enormous number of continuous jobs have arrived in the page mode or VDP of POD, appropriate and efficient log recording and management can be implemented.

<Second Embodiment>

This embodiment is common to the above-described embodiment except the processing described with reference to FIGS. 5A and 5B. In this embodiment, processing concerning FIGS. 15A, 15B, and 15C to be described later is executed for portions such as step S707 in FIG. 7 and step S909 in FIG. 9 which have been explained by quoting the processing in FIGS. 5A and 5B.

<Job Content Comparison and Similarity Determination According to Second Embodiment>

Figure 15A:
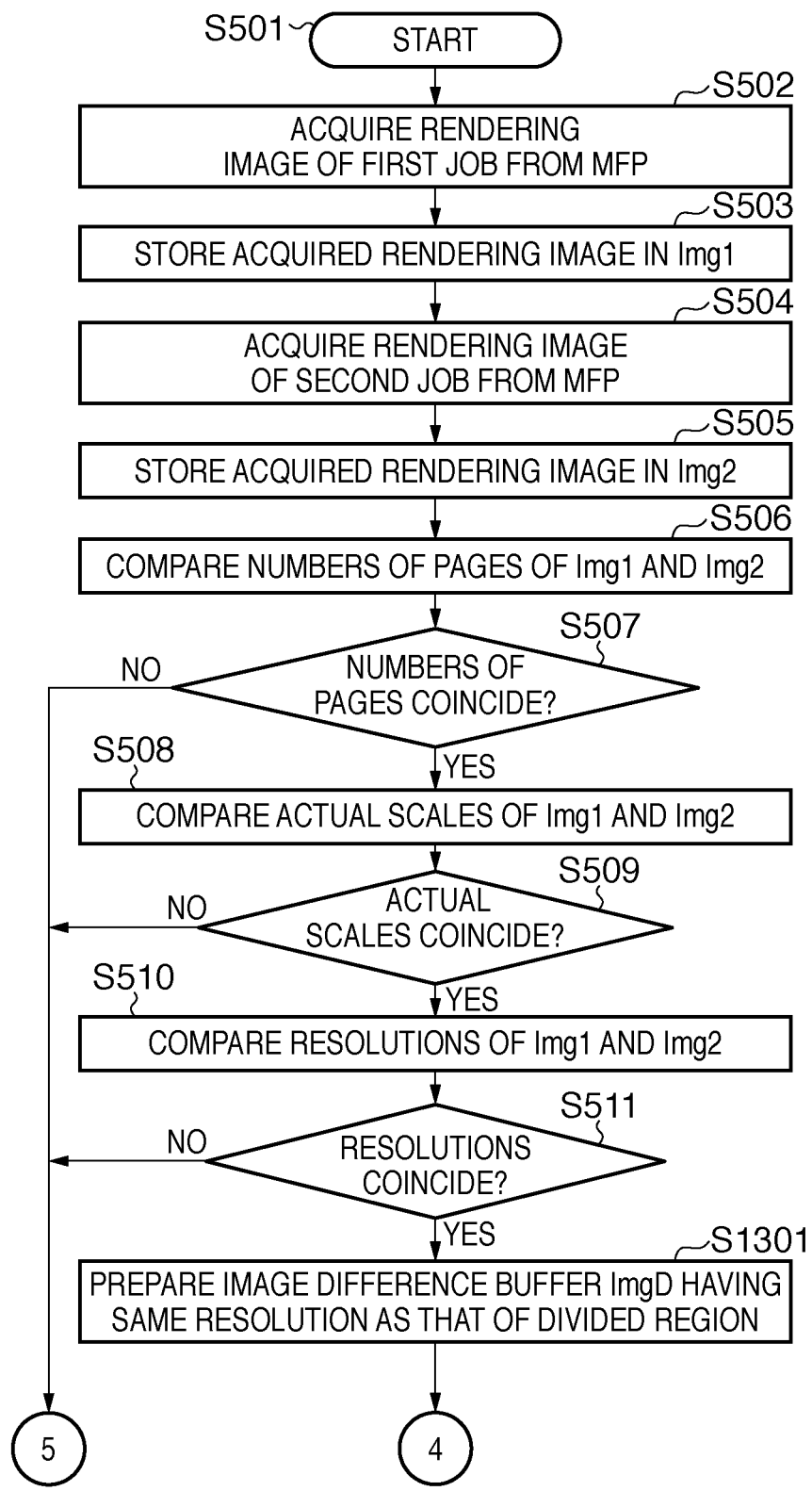
Figure 15C:
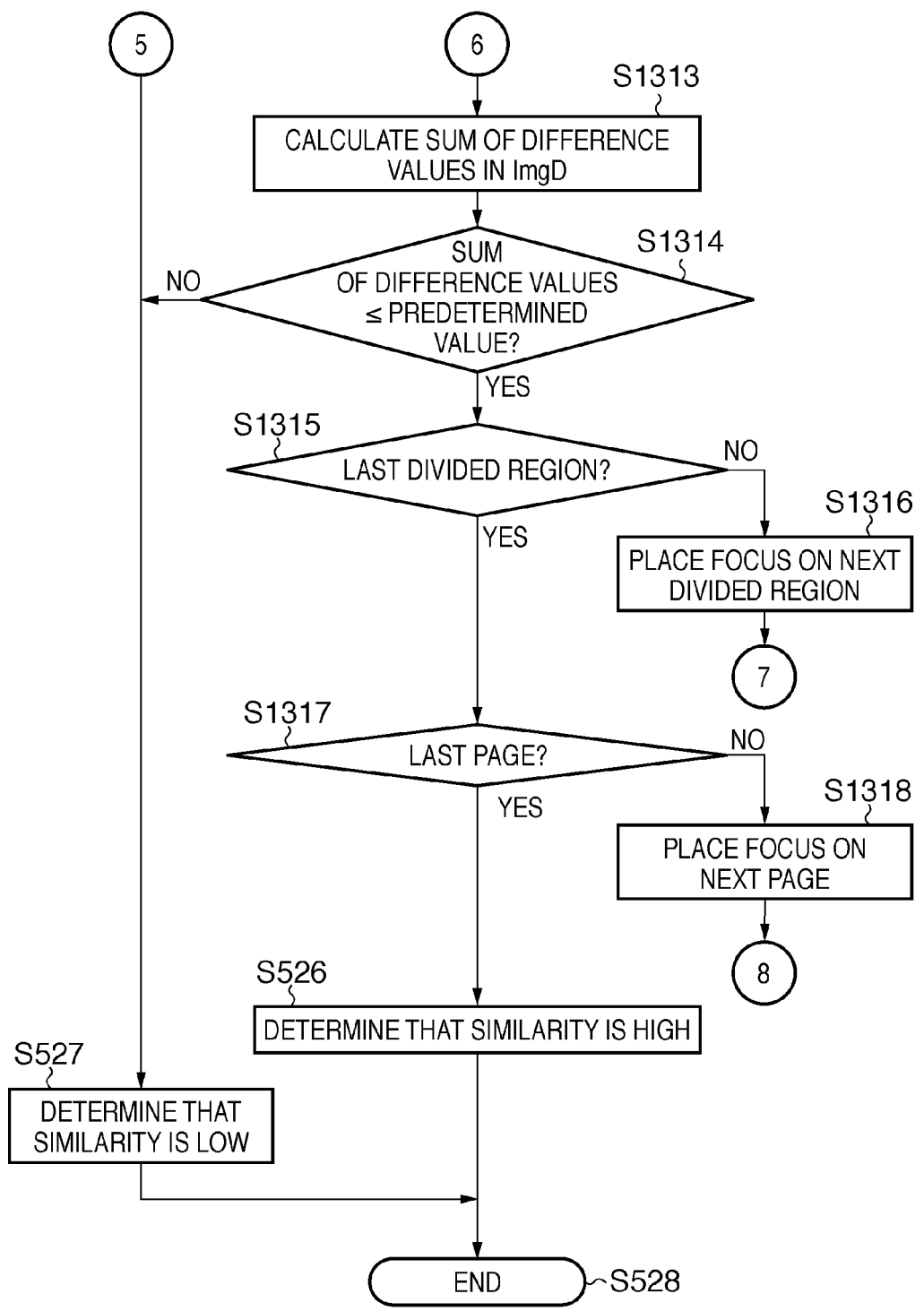
Figure 17B:
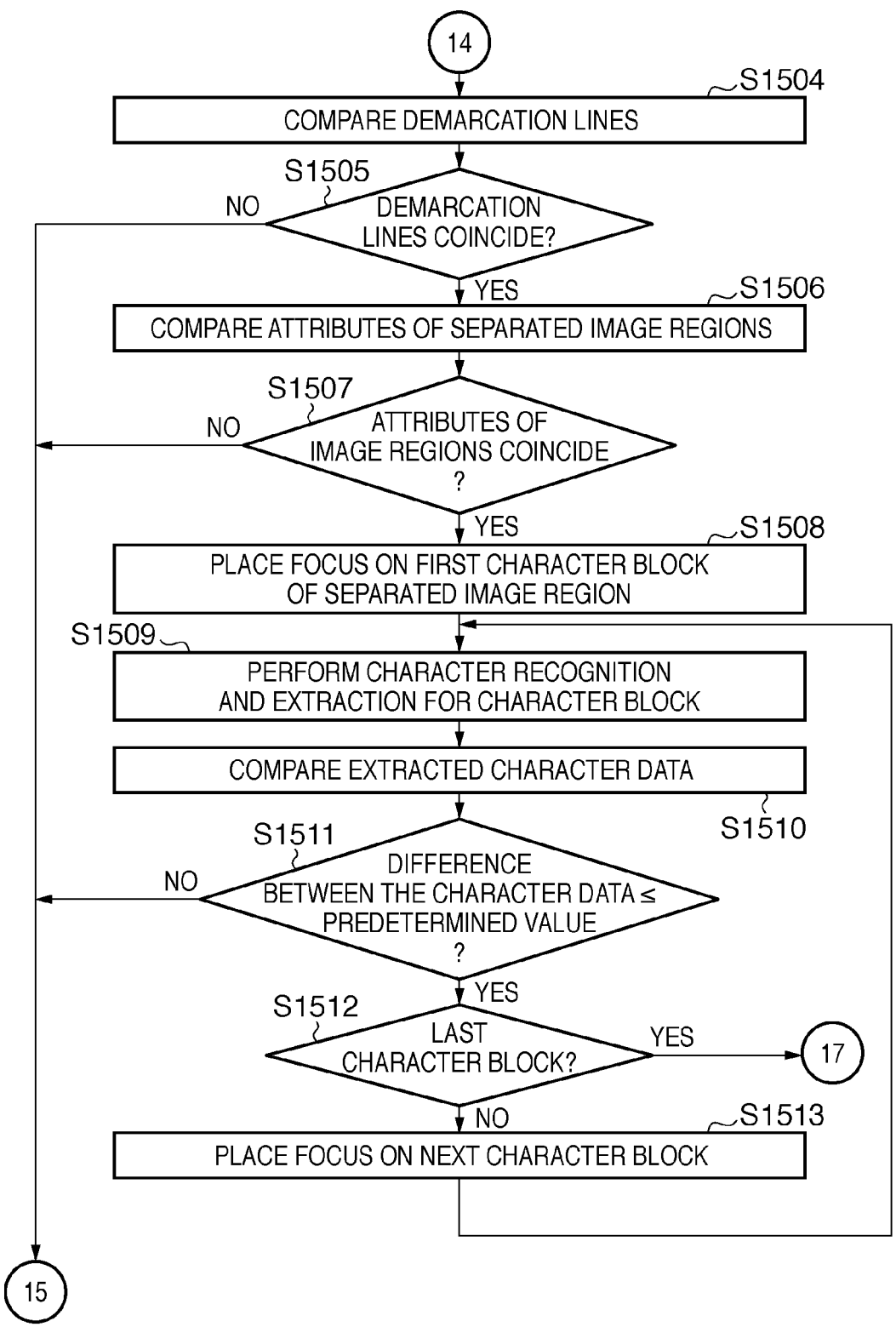
Figure 17D:
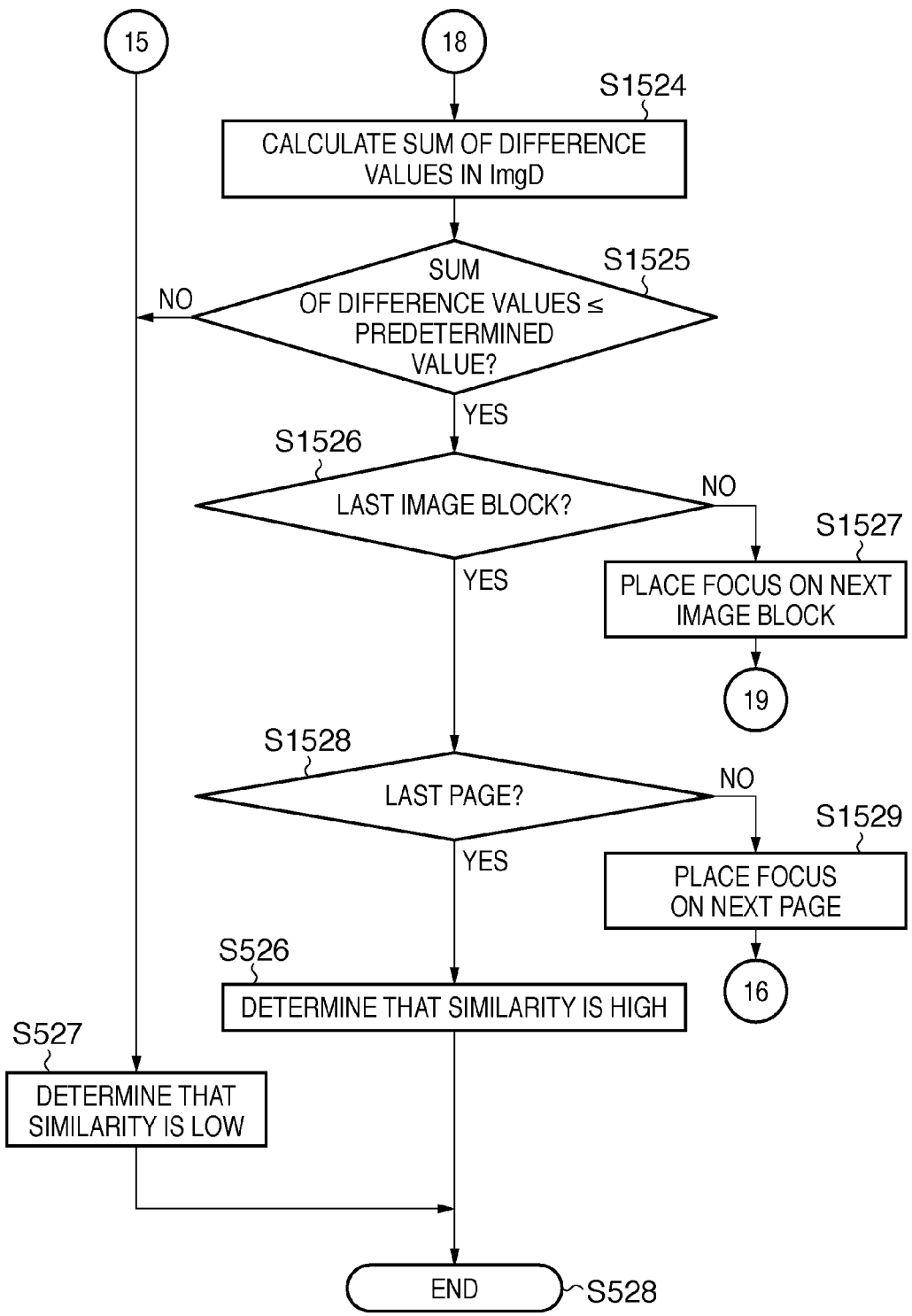

FIGS. 15A, 15B, and 15C illustrate the internal operation of a similarity determination unit 301 of a management apparatus 210 according to this embodiment in more detail. This processing is partially common to the processing described above with reference to FIGS. 5A and 5B. The contents will be explained below, but a description of the portions common to FIGS. 5A and 5B will not be repeated.

Processing starts in step S501. Processes up to step S511 are common to FIGS. 5A and 5B. This also applies to processes in steps S526 to S528. Upon determining in step S511 that the resolutions coincide with each other, the process advances to step S1301. In step S1301, an image difference buffer ImgD is prepared, which has the same resolution as that of a divided region obtained by simply dividing Img1 and Img2 by a predetermined division number N. In step S1302, focus is placed on the first pages of the two jobs. In step S1303, the two images are simply divided by the division number N. In step S1304, focus is placed on the first one of the divided regions. In step S1305, focus is placed on the first raster line of each divided region of interest. In step S1306, focus is placed on the first pixel of the raster line of interest.

In step S1307, the difference between the value of the pixel of interest of Img1 and the value of the pixel of interest of Img2 is calculated. In step S1308, the calculated difference value is stored in ImgD as the pixel difference value of the position. In step S1309, it is determined whether the current pixel of interest is the last pixel of the raster line of interest. If it is the last pixel, the process advances to step S1311. Otherwise, the process advances to step S1310 to place focus on the next pixel of the raster line of interest. Then, the process returns to step S1307. In step S1311, it is determined whether the current raster lines of interest are the last raster lines of Img1 and Img2. If they are the last raster lines, the process advances to step S1313. Otherwise, the process advances to step S1312 to place focus on the next raster line. Then, the process returns to step S1306.

In step S1313, the pixel difference values in the image difference buffer ImgD calculated so far are totalized to obtain the sum of difference values of the whole images. The concept of the sum is the same as that described in the first embodiment. In the second embodiment as well, the formula described with reference to FIG. 6 is used to calculate the sum of difference values. In step S1314, it is determined whether the thus calculated sum is equal to or smaller than a predetermined value. If YES in step S1314, the process advances to step S1315. Otherwise, the process advances to step S527. In step S1315, it is determined whether the current divided region of interest is the last divided region of the current page of interest. If it is the last divided region, the process advances to step S1317. Otherwise, the process advances to step S1316 to place focus on the next divided region, and the process then returns to step S1305. In step S1317, it is determined whether the current pages of interest are the last pages of Img1 and Img2. If YES in step S1317, the process advances to step S526. Otherwise, the process advances to step S1318 to place focus on the next page, and the process then returns to step S1303.

<Effects of Second Embodiment>

As described above, the management apparatus 210 of this embodiment is characterized by, when determining the similarity between jobs, dividing an image by the division number N and executing similarity determination for each divided region, unlike the first embodiment.

According to this characteristic feature, when the similarity between jobs is low, the low similarity can be detected by a smaller number of times of comparison in the determination. More specifically, the number of times of comparison between pixels necessary for similarity determination of a divided region is supposed to decrease in inverse proportion to the division number N. For example, if it is possible to detect in the first divided region that the similarity is low, the number of times of comparison can be reduced to 1/N.

Use of this method also enables to decrease the size of the image buffer ImgD necessary for similarity comparison to 1/N. That is, use of the second embodiment makes it possible to further increase the speed of similarity determination and further raise the efficiency of log recording as compared to the first embodiment.

<Third Embodiment>

This embodiment is almost common to the above-described embodiments except the processing described with reference to FIGS. 5A, 5B, 15A, 15B and 15C. Note that in the third embodiment, a management apparatus 210 in FIG. 3 described above includes, as its internal arrangement and function, a character recognition unit (not shown) configured to recognize and extract a character included in an image. In this embodiment, a similarity determination unit 301 uses the function of the character recognition unit for similarity determination.

<Job Content Comparison and Similarity Determination According to Third Embodiment>

FIGS. 16A, 16B, and 16C illustrate the internal operation of the similarity determination unit 301 of the management apparatus 210 according to this embodiment in more detail. This processing is partially common to the processing described above with reference to FIGS. 5A and 5B. The contents will be explained below, but a description of the portions common to FIGS. 5A and 5B will not be repeated.

Processing starts in step S501. Processes up to step S511 are common to FIGS. 5A and 5B. This also applies to processes in steps S526 to S528. Upon determining in step S511 that the resolutions coincide with each other, the process advances to step S1401. In step S1401, an image difference buffer ImgD having the same resolution as that of Img1 and Img2 is prepared. In step S1402, focus is placed on the first pages of the two jobs. In step S1403, character data are recognized and extracted from the two images using the character recognition unit. In step S1404, the two extracted character data are compared. Upon determining in step S1405 that the difference between the character data is equal to or smaller than a predetermined value, the process advances to step S1406. Otherwise, the process advances to step S527.

In step S1406, focus is placed on the first raster lines of the two images. In step S1407, focus is placed on the first pixel of each raster line of interest. In step S1408, the difference between the value of the pixel of Img1 and the value of the pixel of Img2 is calculated. In step S1409, the calculated difference value is stored in ImgD as the pixel difference value of the position.

In step S1410, it is determined whether the current pixel of interest is the last pixel of the raster line of interest. If it is the last pixel, the process advances to step S1412. Otherwise, the process advances to step S1411 to place focus on the next pixel of the raster line of interest. Then, the process returns to step S1408. In step S1412, it is determined whether the current raster lines of interest are the last raster lines of Img1 and Img2. If they are the last raster lines, the process advances to step S1414. Otherwise, the process advances to step S1413 to place focus on the next raster line. Then, the process returns to step S1407.

In step S1414, the pixel difference values in the image difference buffer ImgD calculated so far are totalized to obtain the sum of difference values of the whole images. The concept of the sum is the same as that described in the first embodiment. In the third embodiment as well, the formula described with reference to FIG. 6 is used to calculate the sum of difference values. In step S1415, it is determined whether the thus calculated sum is equal to or smaller than a predetermined value. If YES in step S1415, the process advances to step S1416. Otherwise, the process advances to step S527. In step S1416, it is determined whether the current pages of interest are the last pages of Img1 and Img2. If they are the last pages, the process advances to step S526. Otherwise, the process advances to step S1417 to place focus on the next page, and the process then returns to step S1403.

<Effects of Third Embodiment>

As described above, the management apparatus 210 of this embodiment is characterized by, when determining the similarity between jobs, causing the character recognition unit to extract character data from the two images and compare them, unlike the above-described embodiments.

According to this characteristic feature, when the similarity between jobs is low, the low similarity can be detected by processing with a smaller calculation amount, that is, character data comparison. The character recognition here is applicable without limitation to a specific method. Hence, when the similarity between jobs is low, the similarity determination can end with a smaller calculation amount (in a shorter time).

<Fourth Embodiment>

This embodiment is almost common to the above-described embodiments except the processing described with reference to FIGS. 5A, 5B, 15A, 15B, 15C, 16A, 16B and 16C. Note that in the fourth embodiment, a management apparatus 210 in FIG. 3 described above further includes, as its internal arrangement and functions, a character recognition unit and an image region separation unit (not shown). In this embodiment, a similarity determination unit 301 uses the functions of the character recognition unit and the image region separation unit for similarity determination.

<Job Content Comparison and Similarity Determination According to Fourth Embodiment>

FIGS. 17A, 17B, 17C, and 17D illustrate the internal operation of the similarity determination unit 301 of the management apparatus 210 according to this embodiment in more detail. This processing is partially common to the processing described above with reference to FIGS. 5A and 5B. The contents will be explained below, but a description of the portions common to FIGS. 5A and 5B will not be repeated.

Processing starts in step S501. Processes up to step S511 are common to FIGS. 5A and 5B. This also applies to processes in steps S526 to S528. If the resolutions coincide with each other in step S511, the process advances to step S1502. In step S1502, focus is placed on the first pages of the two jobs. In step S1503, image region separation processing is executed for each of the two images using the image region separation unit. In step S1504, the image region demarcation lines are compared. Upon determining in step S1505 that the demarcation lines coincide with each other, the process advances to step S1506. Otherwise, the process advances to step S527.

Coincidence of the demarcation lines indicates that the images have pages formed from character blocks and image blocks having the same shapes. Hence, the demarcation lines normally coincide between identical documents or documents having only partial data difference for VDP. Subsequent comparison processing is executed only for images with the coincident demarcation lines.

In step S1506, the attributes of the separated image regions are compared. The attribute represents the distinction of the image region between a character block and an image block. Image region separation processing mainly determines whether a predetermined region is a character block or an image block and decides the boundary line between the blocks. At the point of time the image region separation processing has ended, attribute information representing whether each image region is a character block or an image block has already been known. Since the image region demarcation lines already coincide, it is known that the two images are divided into image regions having the same shape. It is therefore possible to check whether the attributes of corresponding image regions coincide with each other. As the result of this check, if the attributes of the image regions coincide with each other in step S1507, the process advances to step S1508. If image regions whose attributes do not coincide exist, the process advances to step S527.

In step S1508, focus is placed on the first character block of the thus divided image regions. In step S1509, character recognition/extraction is executed for the character block using the function of the character recognition unit. In step S1510, the extracted character data are compared. Upon determining in step S1511 that the difference between the character data is equal to or smaller than a predetermined value, the process advances to step S1512. Otherwise, the process advances to step S527. In step S1512, it is determined whether the current character block of interest is the last character block. If it is the last character block, the process advances to step S1514. Otherwise, the process advances to step S1513 to place focus on the next image region. The process then returns to step S1509.

In step S1514, focus is placed on the first image block of the separated image regions. In step S1515, an image difference buffer ImgD having the same resolution as that of the image block of interest is prepared. In step S1516, focus is placed on the first raster line of the image block. In step S1517, focus is placed on the first pixel of the raster line. In step S1518, the difference between the value of the pixel of Img1 and the value of the pixel of Img2 is calculated. In step S1519, the calculated difference value is stored in ImgD as the pixel difference value of the position. In step S1520, it is determined whether the current pixel of interest is the last pixel of the raster line. If it is the last pixel, the process advances to step S1522. Otherwise, the process advances to step S1521 to place focus on the next pixel of the current raster line of interest. Then, the process returns to step S1518. In step S1522, it is determined whether the current raster line of interest is the last raster line. If it is the last raster line, the process advances to step S1524. Otherwise, the process advances to step S1523 to place focus on the next raster line. Then, the process returns to step S1517.

In step S1524, the pixel difference values in the image difference buffer ImgD calculated so far are totalized to obtain the sum of difference values of the whole images. The concept of the sum is the same as that described in the first embodiment. In the fourth embodiment as well, the formula described with reference to FIG. 6 is used to calculate the sum of difference values. In step S1525, it is determined whether the thus calculated sum is equal to or smaller than a predetermined value. If YES in step S1525, the process advances to step S1526. Otherwise, the process advances to step S527. In step S1526, it is determined whether the current image block of interest is the last image block. If it is the last image block, the process advances to step S1528. Otherwise, the process advances to step S1527 to place focus on the next image block, and the process then returns to step S1515. In step S1528, it is determined whether it is the last page. If YES in step S1528, the process advances to step S526. Otherwise, the process advances to step S1529 to place focus on the next page, and the process then returns to step S1503.

<Effects of Fourth Embodiment>

As described above, the management apparatus 210 of this embodiment is characterized by, when determining the similarity between jobs, causing the image region separation unit to perform image region separation processing, unlike the above-described embodiments. More specifically, the apparatus is characterized by, after the image region separation processing, sequentially using demarcation line coincidence calculation, attribute comparison between divided blocks, character data comparison between character blocks, and pixel comparison between image blocks for similarity determination.

According to this characteristic feature, low similarity between jobs can be detected by processing with a relatively small calculation amount, that is, demarcation line coincidence calculation after image region separation processing. If low similarity cannot be detected by demarcation line coincidence calculation, attribute comparison between separated blocks is also applicable as processing with a small calculation amount. After that, character data comparison processing and difference calculation for each pixel of an image region separated as an image block are performed to enable determination processing while suppressing the calculation amount as much as possible.

That is, according to this embodiment, it is possible to provide a method capable of ending similarity determination with the same or smaller calculation amount (in a shorter time) as compared to the above-described embodiments.

<Fifth Embodiment>

This embodiment is almost common to the above-described embodiments, and only functions, processing, and the like unique to the fifth embodiment will be described here.

<Internal Arrangement of Management Apparatus of Fifth Embodiment>

FIG. 18 schematically shows the internal arrangement of a management apparatus 210 according to this embodiment. In this embodiment, the management apparatus 210 in FIG. 3 described above further includes, as its internal arrangement and functions, a feature amount recording unit 1601 and a feature amount recording area 1602. The feature amount recording unit 1601 of the management apparatus 210 of this embodiment calculates (extracts) a scalar value from a job as a feature amount and records it in the feature amount recording area 1602. The feature amount extraction can be done by applying various methods. More specifically, the total coverage, the consumption amount of each color ink, or the like is used as the feature amount.

<Outline of Internal Operation of Management Apparatus of Fifth Embodiment>

Figure 19:
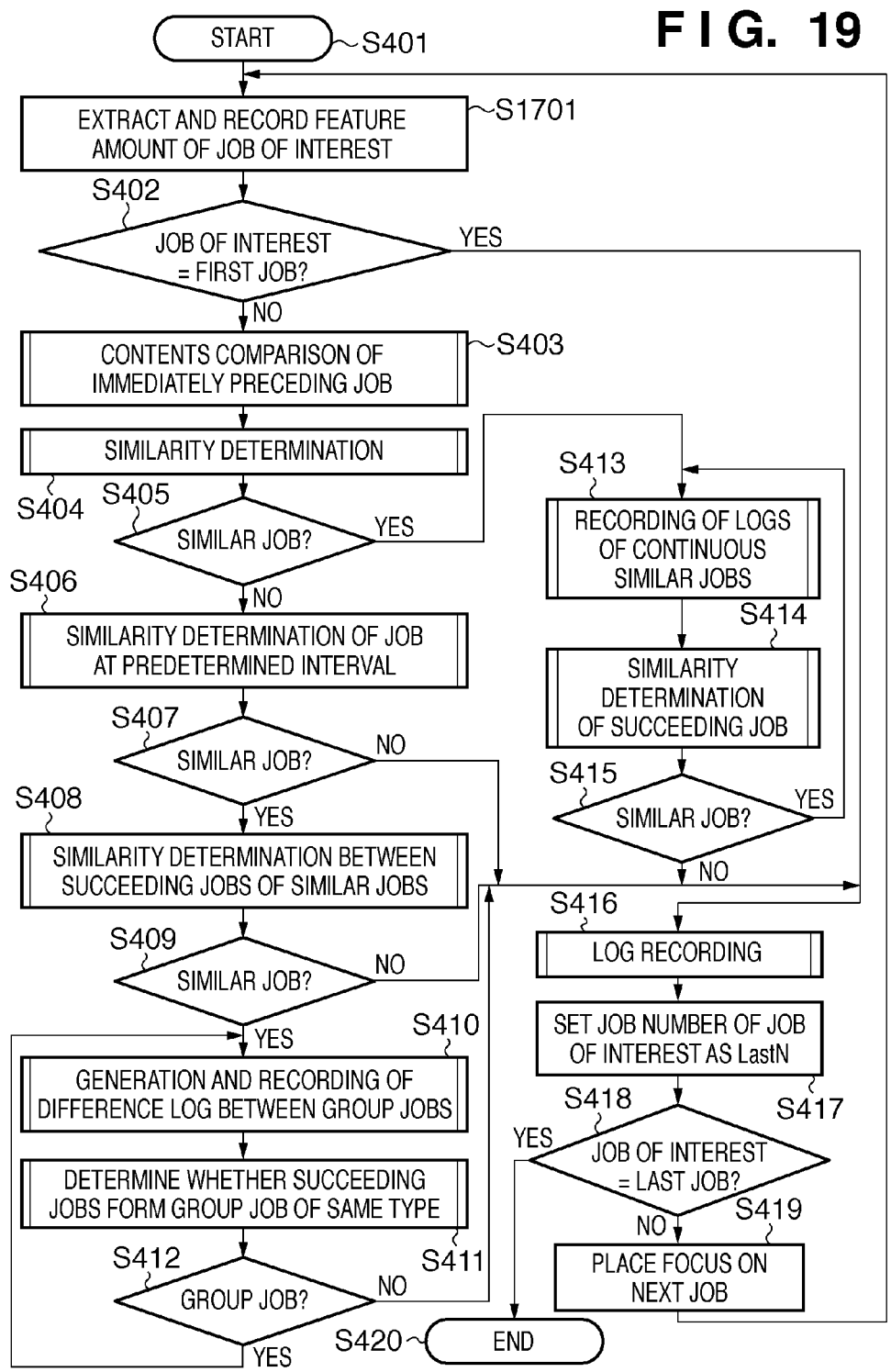
FIG. 19 is a flowchart illustrating the processing procedure of the management apparatus according to the fifth embodiment.
Figure 20C:
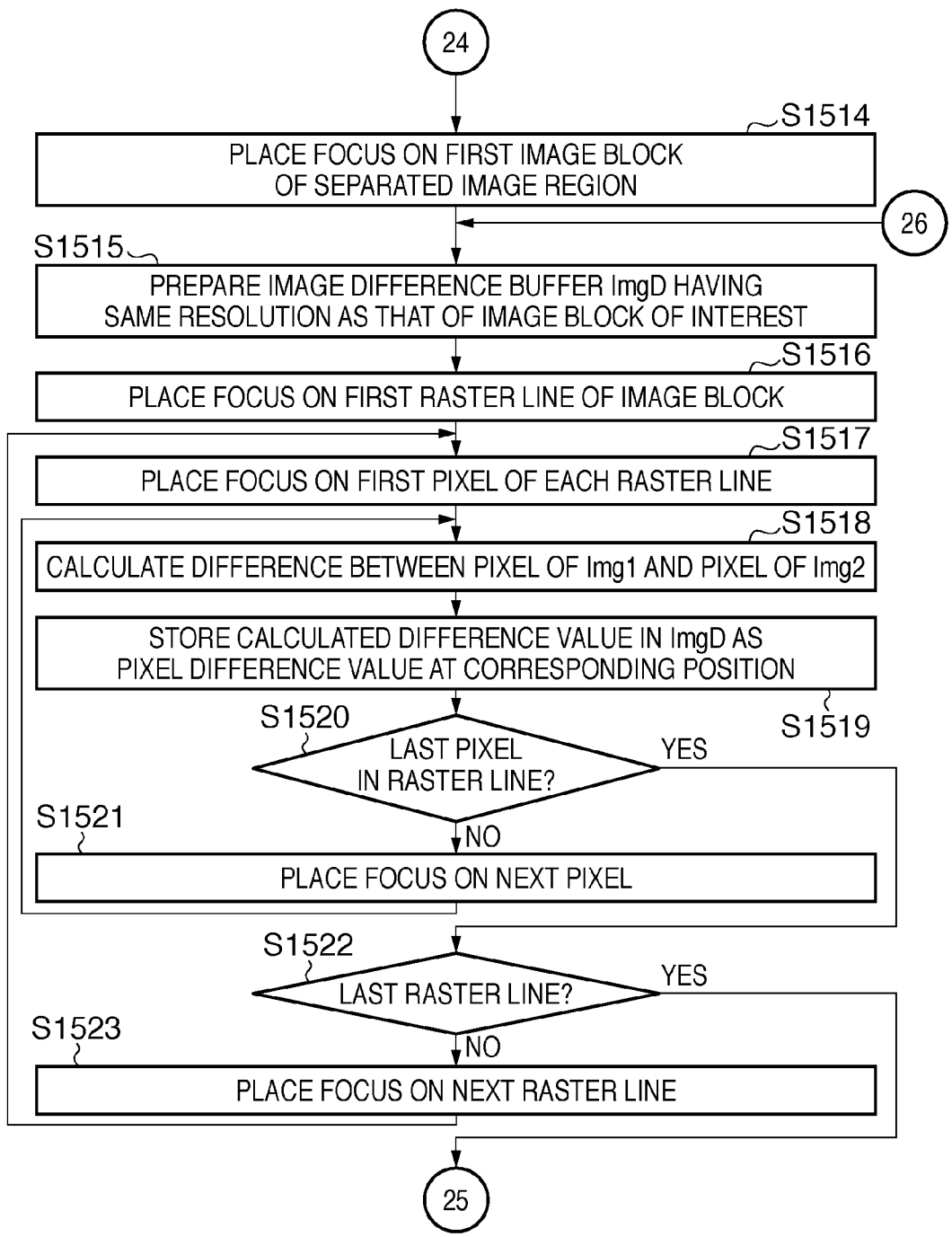
Figure 20D:
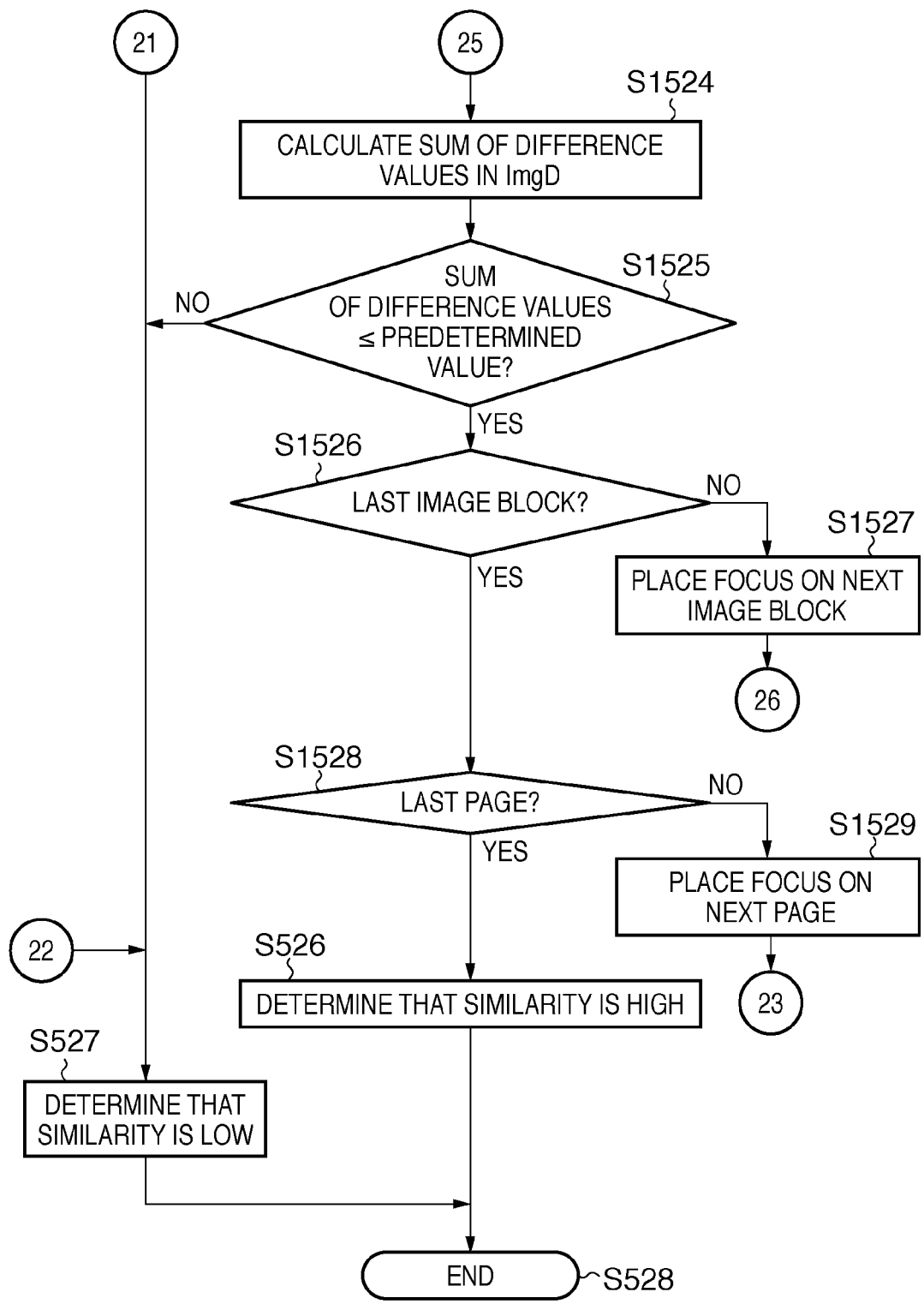

An outline of the internal operation of the management apparatus 210 according to this embodiment will be explained with reference to FIG. 19. This processing is partially common to the processing described above with reference to FIG. 4. The contents will be explained below, but a description of the portions common to FIG. 4 will not be repeated.

Processing starts in step S401. In step S1701, the feature amount recording unit 1601 extracts the feature amount of the job of interest and records it in the feature amount recording area 1602. Steps S402 to S420 are common to FIG. 4.

<Job Content Comparison and Similarity Determination According to Fifth Embodiment>

FIGS. 20A, 20B, 20C, and 20D illustrate the internal operation of a similarity determination unit 301 of the management apparatus 210 according to this embodiment in more detail. This processing is partially common to the processing described above with reference to FIGS. 17A, 17B, 17C, and 17D. The contents will be explained below, but a description of the portions common to FIGS. 17A, 17B, 17C, and 17D will not be repeated.

Processing starts in step S501. In step S1801, the difference values of first and second jobs are acquired from the feature amount recording area 1602 and compared. In step S1802, if the difference between the feature amounts is equal to or smaller than a predetermined value, the process advances to step S502. Otherwise, the process advances to step S527.

<Group Job Determination>

FIG. 21 illustrates the internal operation of the similarity determination unit 301 of the management apparatus 210 according to this embodiment in more detail. This processing is partially common to the processing described above with reference to FIG. 10. The contents will be explained below, but a description of the portions common to FIG. 10 will not be repeated. In this embodiment, a feature amount such as a coverage or color component constituent ratio calculated for the image data of a job is recorded and used for determination processing.

If YES in step S1013, the process advances to step S1901. In step S1901, the feature amount of a job Na+I and that of a job Nb+I are acquired from the feature amount recording area 1602 and compared. Upon determining in step S1902 that the difference between the two feature amounts is equal to or smaller than a predetermined value, the process advances to step S1903. Otherwise, the process advances to step S1019. In step S1903, I is incremented by one. If it is determined in step S1904 that I is larger than K, the process advances to step S1014. Otherwise, the process returns to step S1006.

<Effects of Fifth Embodiment>

As described above, the management apparatus 210 of this embodiment is characterized by calculating the feature amount of each job in advance and using the feature amount first for determination, unlike the above-described embodiments.

That is, according to this embodiment, it is possible to provide a method capable of ending similarity determination with the same or smaller calculation amount (in a shorter time) as compared to the above-described embodiments.

<Sixth Embodiment>

This embodiment is almost common to the above-described embodiments, and only functions, processing, and the like unique to the sixth embodiment will be described here. This embodiment assumes that a plurality of management apparatuses manage different kinds of log information. For example, a management apparatus 210 manages user information and image data as a content log so as to enable to track a user who has printed by an image forming apparatus and the printed image data. A management apparatus 220 manages, as an attribute information log, information such as the number of actually printed and discharged paper sheets and the output format (e.g., color attribute and double-sided attribute), and uses the information to calculate charging or the operating ratio of the image forming apparatus. Printed image data information is not particularly necessary for the log managed by the management apparatus 220 and is therefore excluded from the management target.

In the present invention, logs are analyzed in consideration of image data, and the similarity is calculated finally, thereby, for example, grouping the logs. Hence, the management apparatus 210 executes the processing described in the other embodiments. The sixth embodiment provides a method of raising the memory efficiency and causing a plurality of management apparatuses to uniformly manage log information by making the management apparatus 220 manage group jobs based on information analyzed by the management apparatus 210.

<Internal Arrangement of Management Apparatus of Sixth Embodiment>

Figure 22:
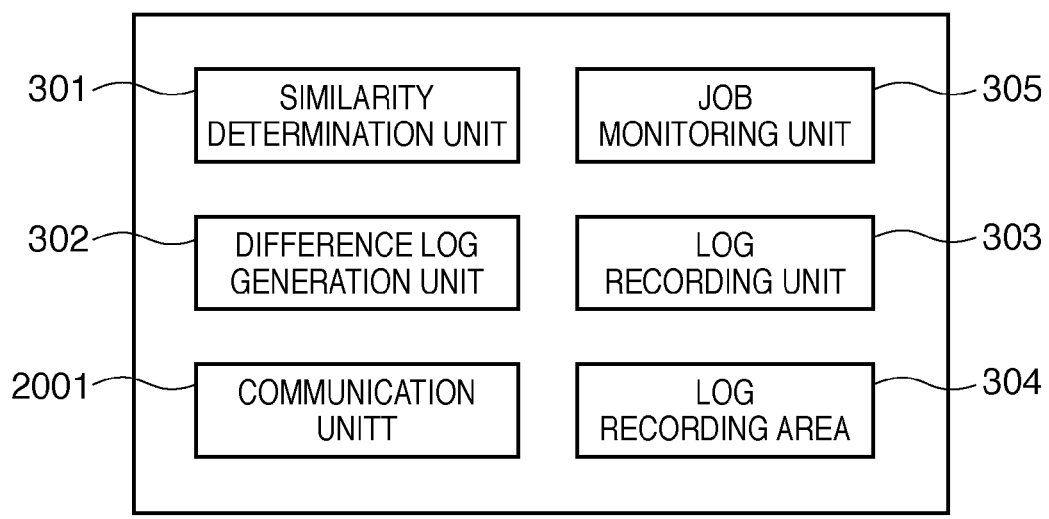
FIG. 22 is a block diagram showing an example of the internal arrangement of a first management apparatus according to the sixth embodiment.
Figure 23:
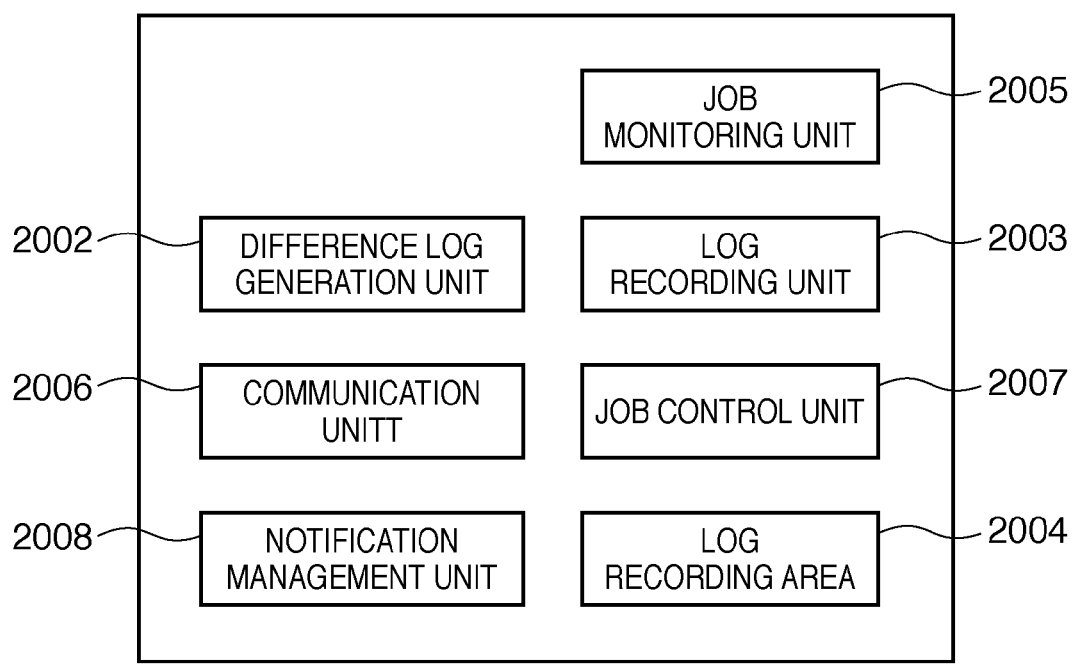
FIG. 23 is a block diagram showing an example of the internal arrangement of a second management apparatus according to the sixth embodiment.

FIGS. 22 and 23 schematically show the internal arrangements of the management apparatuses 210 and 220 according to this embodiment.

In FIG. 22, the management apparatus 210 in FIG. 3 described above further includes, as its internal arrangement and function, a communication unit 2001. The communication unit 2001 is configured to send/receive information to/from another management apparatus or various kinds of external devices via a predetermined communication line.

As shown in FIG. 23, the management apparatus 220 includes, as its internal arrangement and functions, a job monitoring unit 2005, difference log generation unit 2002, log recording unit 2003, log recording area 2004, and communication unit 2006. They have the same arrangements and functions as those of the management apparatus 210 shown in FIG. 22. The management apparatus 220 also includes a job control unit 2007 and a notification management unit 2008. The functions and the like of the job control unit 2007 and the notification management unit 2008 will be described later.

<Processing Procedure of First Management Apparatus of Sixth Embodiment>

Figure 24A:
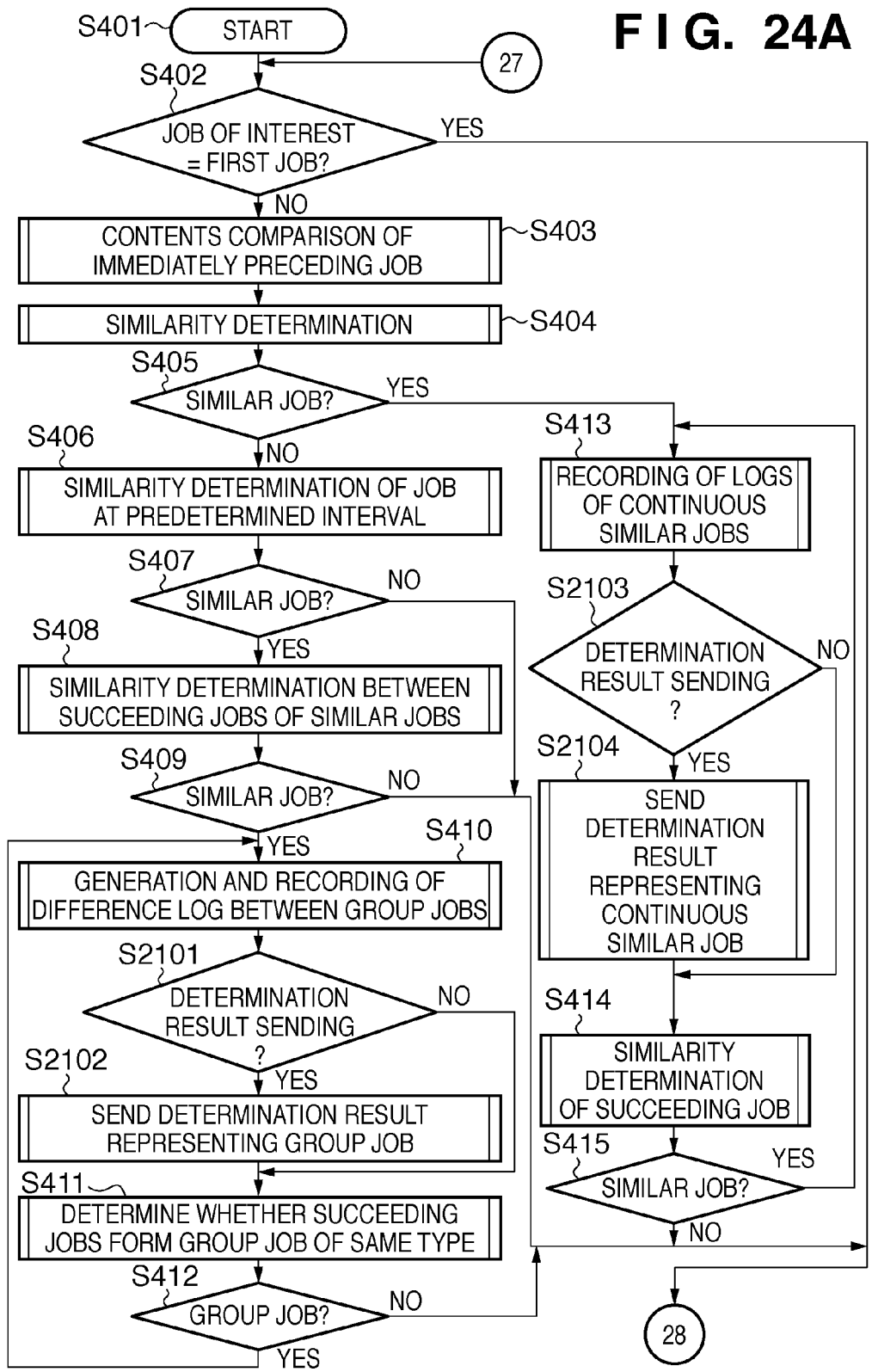

FIGS. 24A and 24B explain an outline of the internal operation of the management apparatus 210 according to this embodiment. This processing is partially common to the processing described above with reference to FIG. 4. The contents will be explained below, but a description of the portions common to FIG. 4 will not be repeated.

Processing starts in step S401. Processing almost common to FIG. 4 is performed up to step S420. After determining a group job and recording its log (S410), it is determined in step S2101 whether to notify an external management apparatus of the determination result. Upon determining to notify, the process advances to step S2102 to send a notification representing that a group job has been determined to the external management apparatus via the communication unit 2001. If it is determined in step S2101 that notification is unnecessary, the process advances to step S411. Note that the notification to be sent here includes not only the determination result but also information associated with the job such as a job ID to be used to uniquely identify the determination target job.

The determination result notification processing is also performed in steps S2103 and S2104 after log recording for a continuous similar job (S413) and in steps S2105 and S2106 after log recording for a normal job (S416).

<Processing Procedure of Second Management Apparatus of Sixth Embodiment>

Figure 25:
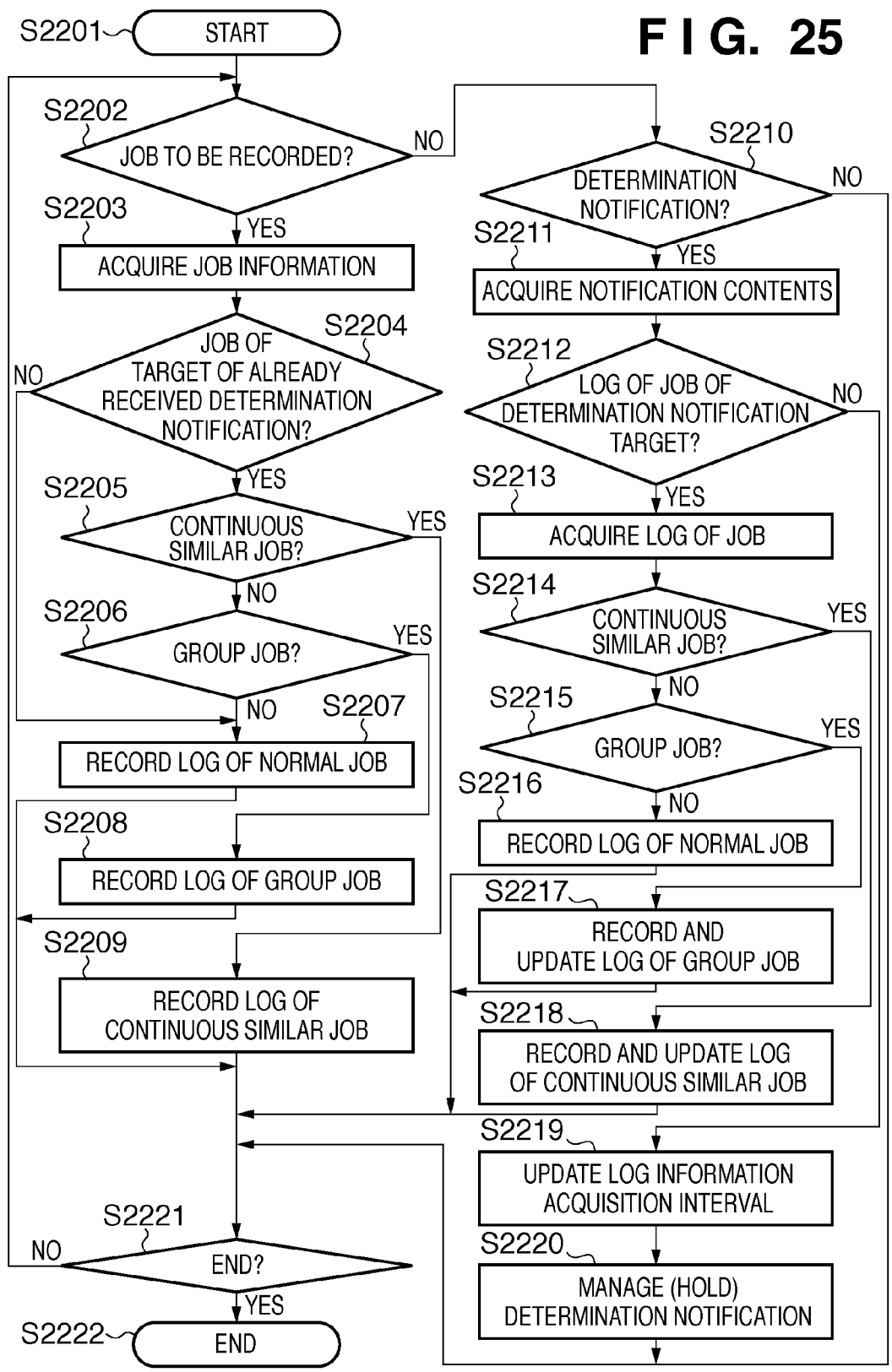
FIG. 25 is a flowchart illustrating the processing procedure of the second management apparatus according to the sixth embodiment.

FIG. 25 explains an outline of the internal operation of the second management apparatus 220 according to this embodiment.

Processing starts in step S2201.

In step S2202, the job monitoring unit 2005 determines whether a job to be recorded exists. If YES in step S2202, the process advances to step S2203. Otherwise, the process advances to step S2210. In step S2203, the job monitoring unit 2005 acquires the information of the job to be recorded. In step S2204, the job monitoring unit 2005 determines whether the acquired job is a determination notification target job already managed by the notification management unit 2008. This determination can be done by, for example, using a job ID to uniquely identify the job. If YES in step S2204, the process advances to step S2205. Otherwise, the process advances to step S2207.

In step S2205, the job monitoring unit 2005 determines whether the determination notification includes a determination result representing a continuous similar job. If YES in step S2205, the process advances to step S2209. Otherwise, the process advances to step S2206. In step S2206, the job monitoring unit 2005 determines whether the determination notification includes a determination result representing a group job. If YES in step S2206, the process advances to step S2208. Otherwise, the process advances to step S2207.

In step S2207, the log recording unit 2003 records the log of the job in the log recording area 2004 as the log of a normal job. Then, the process advances to step S2221. In step S2208, the log recording unit 2003 records the log of the group job in the log recording area 2004. Then, the process advances to step S2221. Note that the log recorded in step S2208 is the difference log generated by the difference log generation unit 2002. In step S2209, the log recording unit 2003 records the log of the continuous similar job in the log recording area 2004. Then, the process advances to step S2221. Note that the log recorded in step S2209 is the difference log generated by the difference log generation unit 2002.

In step S2210, the job monitoring unit 2005 determines whether notifications received via the communication unit 2006 include a notification representing a determination result as the target of the processing. If a target notification exists, the process advances to step S2211. Otherwise, the process advances to step S2221. In step S2211, the job monitoring unit 2005 acquires the notification contents. In step S2212, referring to the notification contents, it is determined based on the job ID or the like whether the log of the job as the target of this notification has already been received. If the job log has already been received, the process advances to step S2213. Otherwise, the process advances to step S2219.

In step S2213, the job monitoring unit 2005 acquires the job log from the log recording area 2004. In step S2214, it is determined based on the notification contents acquired by the job monitoring unit 2005 whether the determination notification is the notification of a determination result representing a continuous similar job. If YES in step S2214, the process advances to step S2218. Otherwise, the process advances to step S2215. In step S2215, it is determined based on the notification contents acquired by the job monitoring unit 2005 whether the determination notification is the notification of a determination result representing a group job. If YES in step S2215, the process advances to step S2217. Otherwise, the process advances to step S2216.

In step S2216, the log recording unit 2003 records the log of the job in the log recording area 2004 as the log of a normal job. Then, the process advances to step S2221. In step S2217, the log recording unit 2003 records and updates the log in the log recording area 2004 as the log of a group job including the job. Then, the process advances to step S2221. In step S2218, the log recording unit 2003 records and updates the log in the log recording area 2004 as the log of a continuous similar job including the job. Then, the process advances to step S2221.

In step S2219, the job control unit 2007 changes the job log acquisition interval. For example, if the management apparatus itself performs polling to an MFP 202 at a predetermined interval to acquire log information, the acquisition internal may be shortened. Note that if the management apparatus receives log information sent from the MFP 202 based on a predetermined schedule, the management apparatus may send, to the MFP 202, an instruction to update the schedule. In step S2219, any method is applicable if it shortens the job log information reception interval. In step S2220, the determination notification received by the notification management unit 2008 is managed, and the process then advances to step S2221. In step S2221, it is determined whether the processing of the management apparatus has ended. Upon determining that the processing has ended, the process advances to step S2222 to end the processing. Otherwise, the process returns to step S2202.

<Effects of Sixth Embodiment>

As described above, in this embodiment, two management apparatuses exist in a single system. This assumes a case in which the management apparatus 210 records logs and simultaneously analyzes them and records the contents, whereas the management apparatus 220 performs totalization based on the logs.

As described in this embodiment, when a plurality of management apparatuses are separately arranged on a single system, one of the management apparatuses determines a job and notifies another management apparatus of the determination result. This makes it possible to easily share information for efficient log information management without repetitive processing concerning log analysis such as similarity determination. In the management apparatus 220 which performs totalization based on the logs, when charging or the like is taken into consideration, it is especially important to recognize a series of logs corresponding to a print request. Hence, application of the present invention yields a conspicuous effect.

Additionally, in this embodiment, the management apparatus 220 is configured to change the job log information reception interval in accordance with the determination notification received from the management apparatus 210. This prevents the management apparatus 220 from missing job logs to be collected even when an enormous number of jobs have arrived at the image forming apparatus in a short time, and the management apparatus acquires log information from the image forming apparatus having a small recording capacity. Note that in this embodiment, an arrangement including two management apparatuses has been examined. However, the embodiment is also applicable to an arrangement including three management apparatuses or four or more management apparatuses. That is, it is possible to share information in the whole system without repetitive processing and efficiently make each management apparatus execute processing corresponding to its role.

<Seventh Embodiment>

This embodiment is almost common to the fifth embodiment described above, and only functions, processing, and the like unique to the seventh embodiment will be described here.

<Processing Procedure of Management Apparatus of Seventh Embodiment>

Figure 26A:
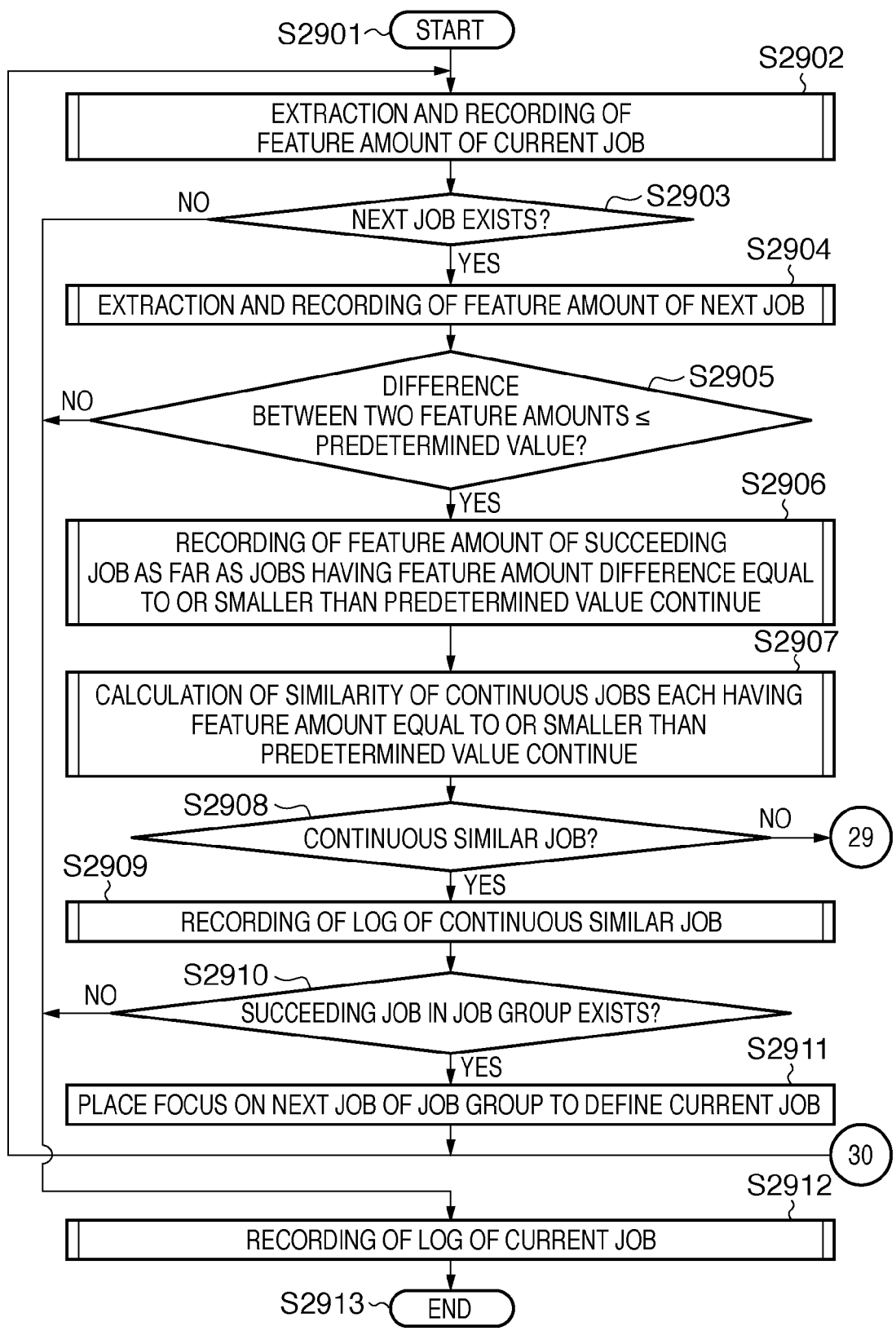
Figure 26B:
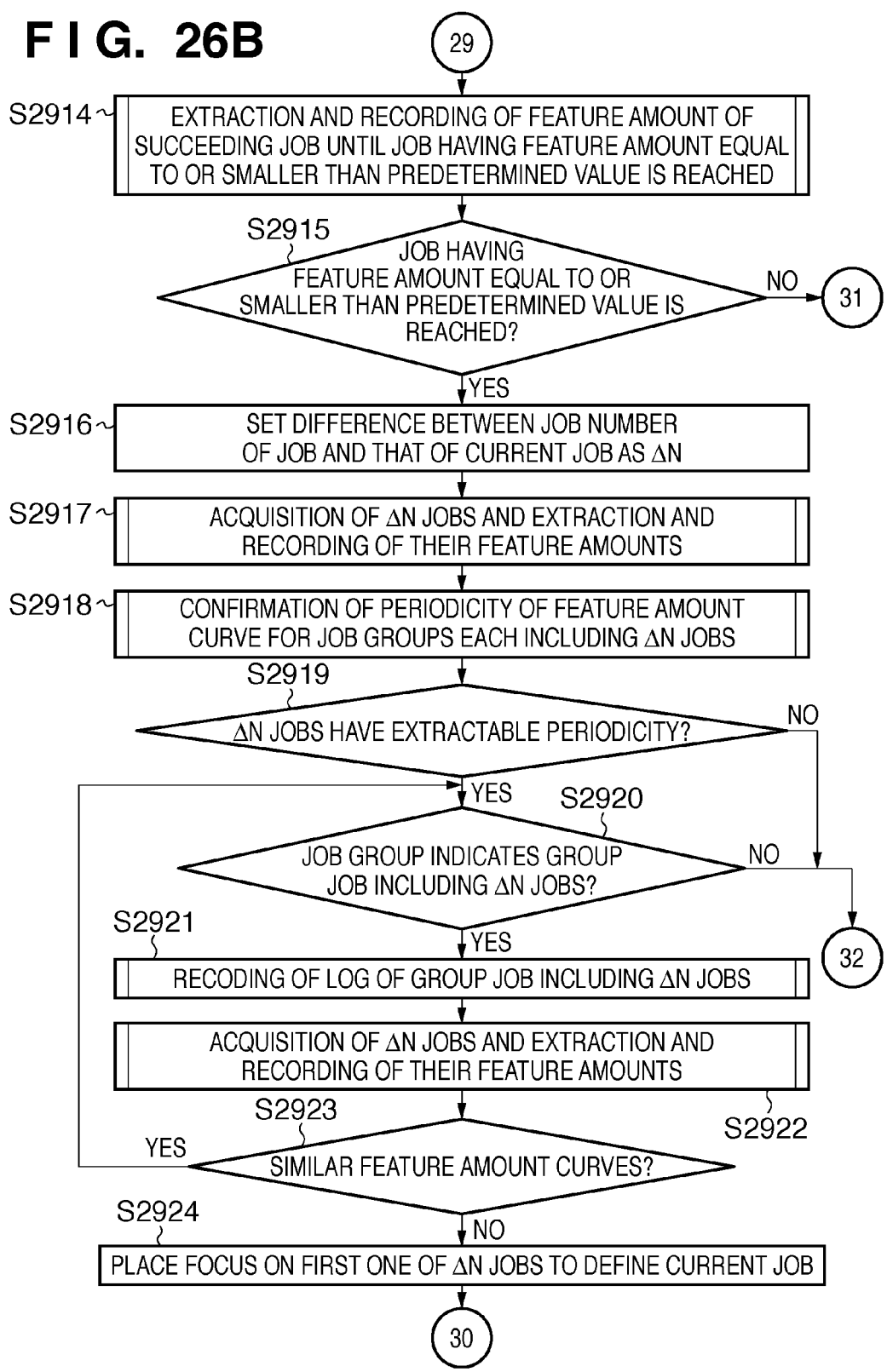

An outline of the internal operation of a management apparatus 210 according to this embodiment will be explained next with reference to FIGS. 26A, 26B, and 26C.

Processing starts in step S2901. In step S2902, a feature amount recording unit 1601 extracts a feature amount associated with the current job of interest of a job monitoring unit 305 based on a corresponding log, and records it in a feature amount recording area 1602. In step S2903, the job monitoring unit 305 checks whether a succeeding job exists. If no job exists, the process advances to step S2912. If a job exists, the process advances to step S2904 to cause the feature amount recording unit 1601 to extract the feature amount based on the log of the succeeding job and record it in the feature amount recording area 1602. In step S2905, a similarity determination unit 301 compares the two recorded feature amounts and determines whether the difference is equal to or smaller than a predetermined value. If the difference is equal to or smaller than the predetermined value, the process advances to step S2906. If the difference is larger than the predetermined value, the process advances to step S2914.

In step S2906, the feature amount recording unit 1601 extracts the feature amount of another succeeding job and records it in the feature amount recording area 1602. This processing is continuously performed as far as jobs with a feature amount difference equal to or smaller than the predetermined value continue. If a job whose feature amount difference exceeds the predetermined value has appeared, the process advances to step S2907. In step S2907, the similarity determination unit 301 sequentially calculates similarity of the continuous jobs recorded in step S2906. In step S2908, it is determined based on the similarity calculated in step S2907 whether the jobs are continuous similar jobs. If YES in step S2908, the process advances to step S2909. Otherwise, the process advances to step S2914.

In step S2909, a log recording unit 303 records, for the job group determined as continuous similar jobs, the log of the continuous similar jobs. More specifically, the log of the current job of interest is recorded, and a difference log generated by the difference log generation unit 302 is recorded for the remaining succeeding logs.

In step S2910, it is determined whether a job following the continuous similar jobs exists. If a job exists, the process advances to step S2911. Otherwise, the process advances to step S2912. In step S2911, the job monitoring unit 305 places focus on the succeeding job and defines it as a current job of interest. Then, the process returns to step S2902. In step S2912, the log of the current job of interest is recorded. The process then advances to step S2913 to end the processing.

In step S2914, the feature amount recording unit 1601 extracts the feature amount of a job following the current job of interest and records it in the feature amount recording area 1602. This processing is continuously performed until reaching a job whose feature amount difference to the current job of interest is equal to or smaller than the predetermined value. If the job whose feature amount difference is equal to or smaller than the predetermined value has been reached, or the processing has reached the last job, the process advances to step S2915. In step S2915, it is determined whether the job whose feature amount difference is equal to or smaller than the predetermined value has been reached. If YES in step S2915, the process advances to step S2916. Otherwise, the process advances to step S2934. In step S2916, the difference between the job number of the job reached in step S2914 and that of the current job of interest is calculated and stored in ΔN. In step S2917, the feature amount recording unit 1601 extracts and records the feature amounts of ΔN jobs from the job reached in step S2914.

In step S2918, the similarity determination unit 301 overlays the graph of the feature amounts of the group of ΔN jobs from the current job of interest and the graph of the feature amounts of the group of ΔN other succeeding jobs, and confirms the periodicity of the graphs. In this case, the feature amount values of the job groups are plotted in the order of jobs, and the periodicity is determined using the curves of the drawn graphs.

In step S2919, it is determined whether the graphs of the two job groups are similar within the range of the error of a predetermined value, and the periodicity is extractable. If the periodicity is extractable, the process advances to step S2920. Otherwise, the process advances to step S2925. In step S2920, it is determined whether each group of ΔN jobs whose feature amounts have periodicity is a group job. This determination is done by causing the similarity determination unit 301 to perform, for each job group, the processing explained with reference to FIG. 21 or the like. If they are group jobs, the process advances to step S2921. Otherwise, the process advances to step S2925.

In step S2921, the log recording unit 303 records the log of the group job including ΔN jobs in a log recording area 304. For the second and subsequent group jobs, difference logs generated by the difference log generation unit 302 are recorded. In step S2922, the feature amount recording unit 1601 extracts and records the feature amounts of ΔN other succeeding jobs. In step S2923, it is determined whether the curve of a graph based on the feature amounts of the job group is similar to the curve of the graph based on the feature amounts of the group job determined just before within a sufficient error range. If the curve is similar, it indicates a job group appearing at the same period as described above. Hence, the process returns to step S2920 to perform determination processing. If the curve is not similar, the process advances to step S2924. In step S2924, the job monitoring unit 305 places focus on the first one of the ΔN jobs finally acquired and defines it as the current job of interest. The process then returns to step S2902.

In step S2925, the feature amount recording unit 1601 further extracts and records the feature amounts of ΔN×2 jobs. In step S2926, using a mathematical method like Fourier transform, the presence/absence of clear periodicity is confirmed from the curve of a graph based on the job feature amounts acquired so far from the current job of interest. If periodicity is confirmed, groups are formed at the main period, that is, for every predetermined number of jobs, and graph curves based on the feature amounts of the respective groups exhibit similar shapes. The predetermined number (period) is mathematically extracted as the number of jobs included in a group job. Upon determining in step S2927 that periodicity is extractable, the process advances to step S2928. Otherwise, the process advances to step S2934.

In step S2928, the period is set as K. In step S2929, the similarity determination unit 301 determines whether each job group formed by separating the acquired jobs into groups each including K jobs is a group job. If they are group jobs, the process advances to step S2930. Otherwise, the process advances to step S2934. In step S2930, the log recording unit 303 records, in the log recording area 304, the log of each job group determined as a group job including K jobs.

In step S2931, the feature amount recording unit 1601 extracts and records the feature amounts of jobs which include a job next to the job located last in the job group determined as a group job including K jobs to the Kth job. In step S2932, it is determined whether the curve of a graph based on the feature amounts of the K jobs is similar to the feature amount curve of the precedingly obtained group job within a sufficient error range. If the curve is similar, the process returns to step S2929. Otherwise, the process advances to step S2933. In step S2933, the job monitoring unit 305 places focus on the first one of the K jobs finally acquired and defines it as the current job of interest. The process then returns to step S2902.

In step S2934, the log recording unit 303 records, in the log recording area 304, the log of the current job of interest as the log of a normal job. In step S2935, the job monitoring unit 305 places focus on the job next to the recorded job and defines it as the current job of interest. The process then returns to step S2902.

<Effects of Seventh Embodiment>

As described above, in this embodiment, it is first confirmed based on the feature amount whether a job belongs to continuous similar jobs or a group job.

As a large characteristic feature of this embodiment, to detect the possibility of a group job, the presence/absence of periodicity is determined using graphs based on the feature amounts of job groups. This is efficient processing that requires a small calculation amount and considers the properties of group jobs repeatedly sent based on almost the same contents and period. It is therefore possible to suppress the calculation amount necessary for group job detection and estimation of the number of jobs included in the group job as compared to, for example, the fifth embodiment.

<Eighth Embodiment>

In this embodiment, the same description as in the above-described embodiments will be omitted, and only characteristic arrangements and processing will be explained. An MFP handles print jobs as a queue to sequentially process them, and has a predetermined function of monitoring the processing.

<Arrangement of Image Forming Apparatus of Eighth Embodiment>

Figure 27:
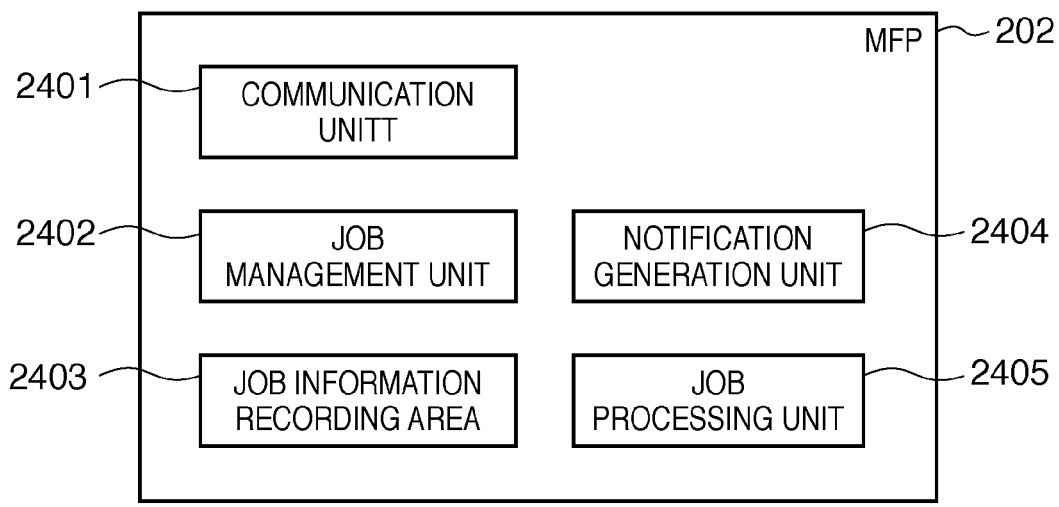
FIG. 27 is a block diagram showing an example of the internal arrangement of an MFP according to the eighth embodiment.

FIG. 27 schematically shows the internal arrangement and functions of an MFP 202 according to this embodiment which are controlled by a control unit 102. A communication unit 2401 sends/receives information to/from an external information device and receives a print job or the like from, for example, an externally connected host PC. A job management unit 2402 executes job information analysis and predetermined determination processing for the received job. A job information recording area 2403 records information about the received job. A notification generation unit 2404 generates a predetermined notification to a management apparatus. Based on the received job, a job processing unit 2405 processes the job using the functions of the MFP. More specifically, the job processing unit 2405 is a module that performs, based on the received print job, various kinds of image processing such as rendering processing of print data and submits the processed data to a printing unit 103 to perform print processing.

<Arrangement of Management Apparatus of Eighth Embodiment>

Figure 28:
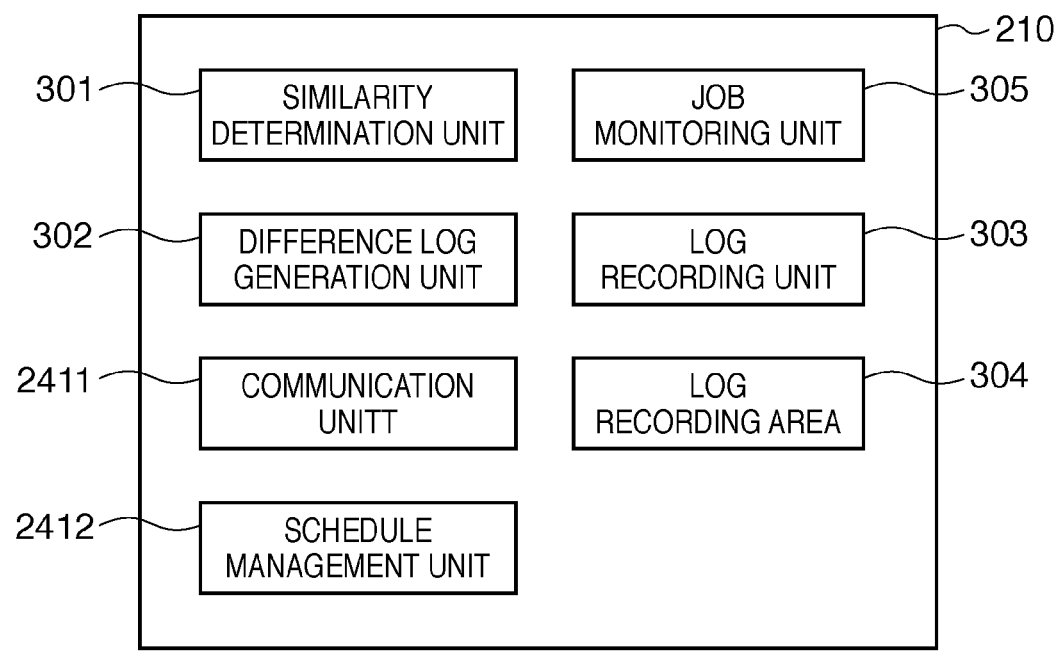
FIG. 28 is a block diagram showing an example of the internal arrangement of a management apparatus according to the eighth embodiment.

FIG. 28 schematically shows the internal arrangement of a management apparatus 210 according to this embodiment. Note that the management apparatus 210 in FIG. 3 described above further includes, as its internal arrangement and functions, a communication unit 2411 and a schedule management unit 2412. The communication unit 2411 is configured to send/receive information to/from another management apparatus or various kinds of external devices via a predetermined communication line. The schedule management unit 2412 is configured to adjust the job information (log information) acquisition interval based on a notification received from the MFP 202.

<Processing Procedure of MFP of Eighth Embodiment>

Figure 29:
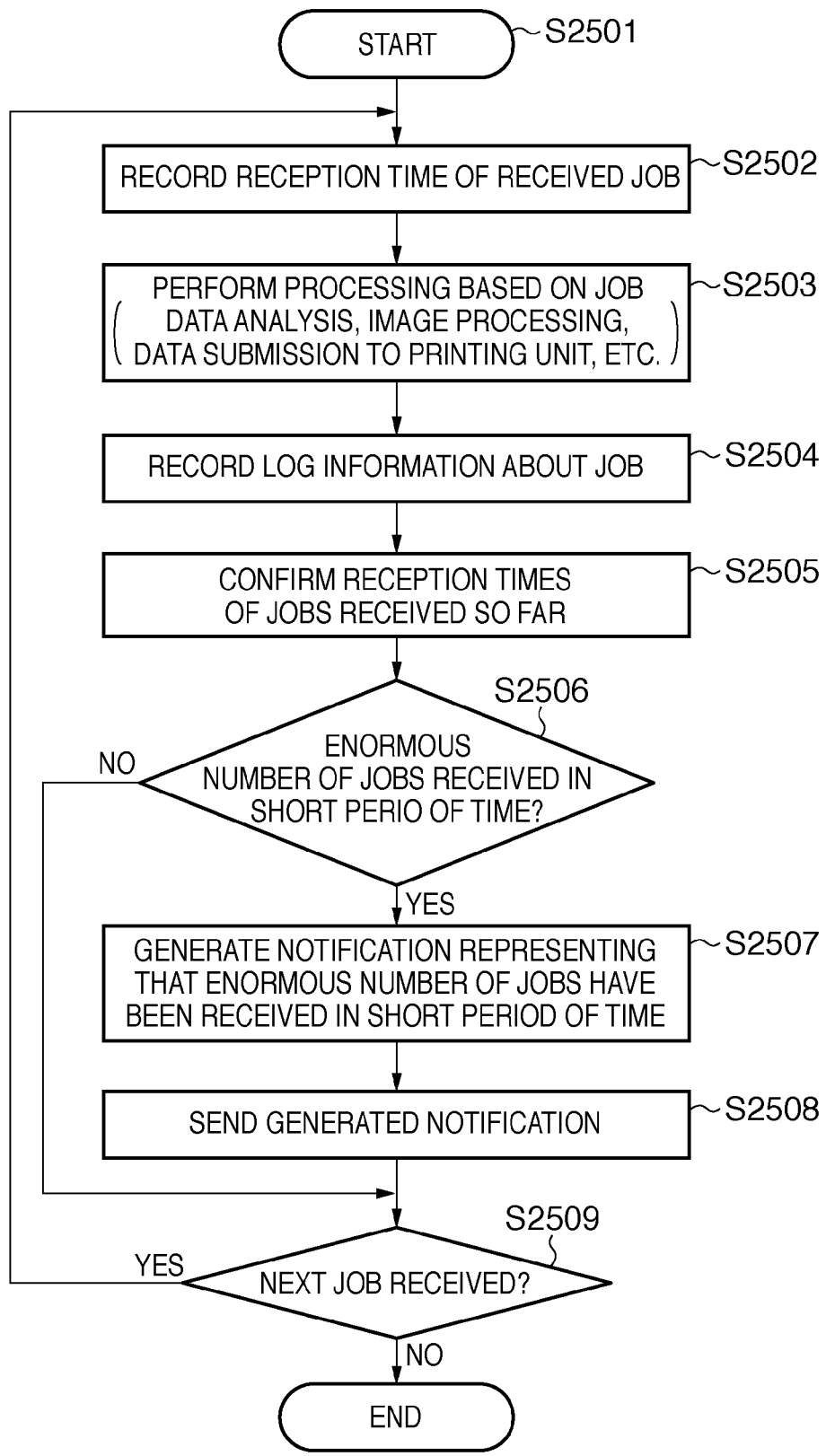
FIG. 29 is a flowchart illustrating the processing procedure of the MFP according to the eighth embodiment.

FIG. 29 is a flowchart for explaining processing of the control unit 102 of the MFP 202 upon externally receiving a job in this embodiment. This processing starts upon receiving a job from an external apparatus via the communication unit 2401.

Processing starts in step S2501. In step S2502, the job management unit 2402 records, in the job information recording area 2403, the reception time of a job received via the communication unit 2401. The reception time is managed in parallel to job queue generation in the MFP 202.

In step S2503, the job processing unit 2405 executes predetermined processing based on the job. If the job is a print job, the job processing unit 2405 analyzes setting information, performs predetermined image processing such as rendering of print data, and submits the processed data to the printing unit. In step S2504, the job management unit 2402 records, in the job information recording area 2403, a log including a job ID, attribute information such as setting of the job, and the status and the number of discharged paper sheets in print processing. The management apparatus 210 periodically performs polling to the recorded log information. Alternatively, the management apparatus 210 acquires the log information when the MFP 202 sends it at a predetermined timing.

In step S2505, the job management unit 2402 refers to the job information recording area 2403 and checks the records of the reception times of jobs received so far. In step S2506, the job management unit 2402 determines whether an enormous number of jobs have arrived in a predetermined short period of time. Upon determining that an enormous number of jobs have been received in a short period of time, the process advances to step S2507. Otherwise, the process advances to step S2509. The user can arbitrarily set the number of jobs to be used to determine the enormous number of jobs. More specifically, if 50 to 100 or more jobs arrive at the MFP in several minutes, the job processing unit 2405 may determine that the MFP has received an enormous number of jobs in a short period of time.

In step S2507, the notification generation unit 2404 generates a notification representing that the MFP has received an enormous number of jobs in a short period of time. In step S2508, the generated notification is sent to the management apparatus via the communication unit 2401. The notification generated here includes information (including the job ID and reception time) about the job included in the enormous number of jobs that are the factor of the determination. At the timing the job management unit 2402 has determined that an enormous number of jobs have arrived in a short period of time, the MFP 202 may voluntarily send unsent log information to the management apparatus to prevent it from missing logs. In step S2509, the job management unit 2402 determines whether a job to be processed next has been received. If YES in step S2509, the process returns to step S2502. Otherwise, the process ends the processing.

Note that the notification generation unit 2404 may generate a notification representing that the reception of the enormous number of jobs in the short period of time has ended, and send it to the management apparatus via the communication unit 2401.

<Processing Procedure of Management Apparatus of Eighth Embodiment>

Figure 30:
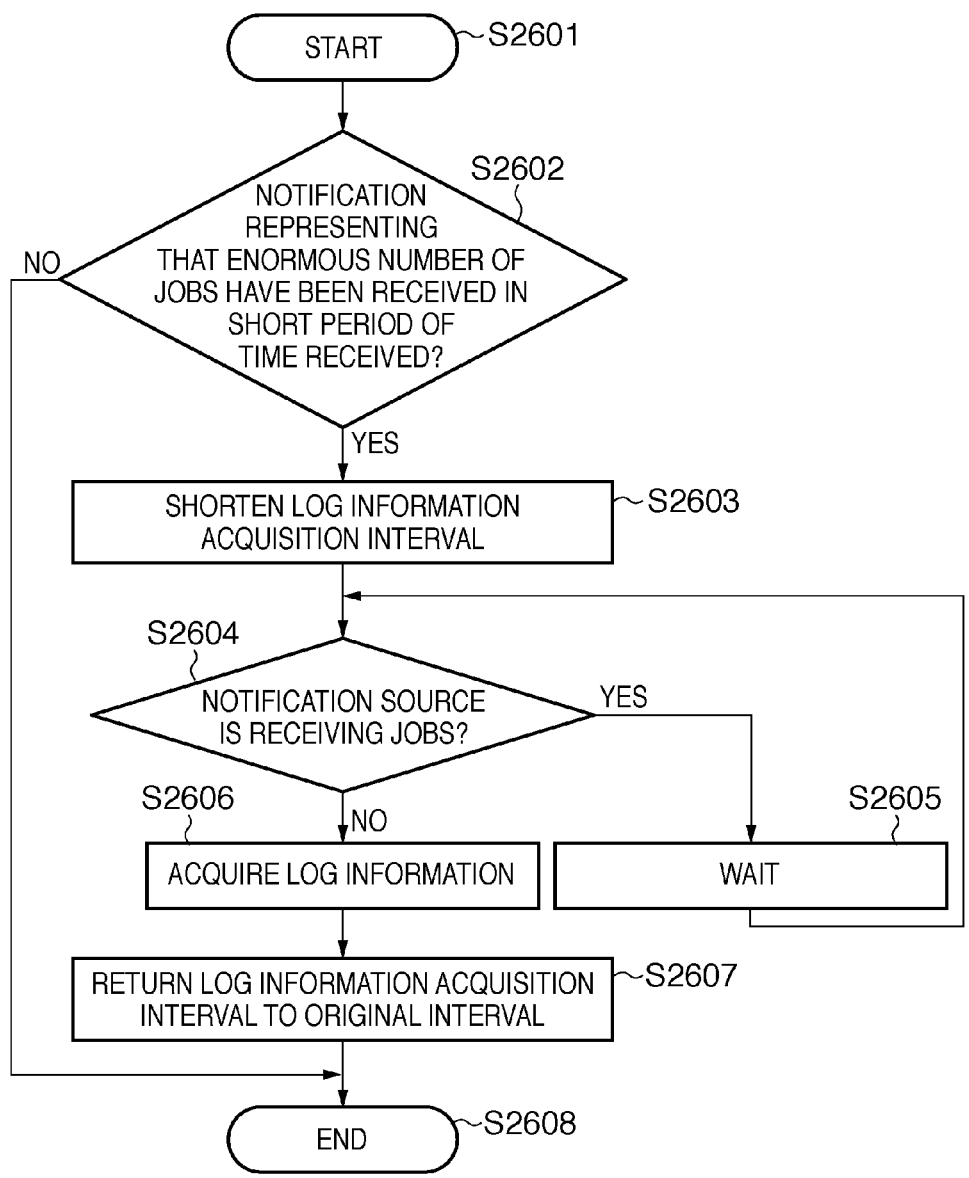
FIG. 30 is a flowchart illustrating the processing procedure of the management apparatus according to the eighth embodiment.

An outline of the internal operation of the management apparatus 210 according to this embodiment will be explained with reference to FIG. 30. This processing is associated with log information acquisition interval change processing by the schedule management unit 2412 based on a notification from the MFP 202. Log information acquired in this processing is analyzed and managed by the processing described with reference to FIG. 4 or the like.

Processing starts in step S2601. This processing starts when the management apparatus has received some information from an external apparatus via the communication unit 2411.

In step S2602, it is determined whether a notification representing reception of an enormous number of jobs in a short period of time has been received from the MFP 202. If the notification has been received, the process advances to step S2603. Otherwise, the received notification does not concern the processing. Hence, the process advances to step S2608 to end the processing.

In step S2603, the log information acquisition interval for the MFP 202 is changed to a shorter interval. If the MFP 202 periodically sends log information in accordance with a predetermined schedule, an instruction to change the interval is issued. In this case, any method is applicable if it shortens the interval of log information reception from the MFP 202. In step S2604, the management apparatus sends a query to the MFP 202 of the notification source to ask whether an enormous number of jobs are being received, and receives a response. Upon determining based on the response that reception is progressing, the process advances to step S2605 to wait for a predetermined time. The process then returns to step S2604. Otherwise, the process advances to step S2606. The management apparatus 210 may perform this determination based on a reception end notification from the MFP 202, instead of sending a query.

In step S2606, after the MFP 202 has ended the above-described reception of the enormous number of jobs, log information is acquired. One of purposes is to allocate a recording area for jobs to be received by the MFP 202 later. The main purpose of this process is to acquire a determination target log for log analysis in the management apparatus at a close timing. In particular, since the log information acquired here should be determined as a series of logs (continuous similar jobs or group job), adjusting the acquisition timing enables appropriate log management. In step S2607, the log information acquisition interval changed in step S2603 is returned to the original interval. After that, the process advances to step S2608 to end the processing.

<Effects of Eighth Embodiment>

As described above, in this embodiment, the MFP 202 checks the arrival frequency of jobs received by itself. The MFP 202 is characterized by notifying the management apparatus 210 that an enormous number of jobs are arriving in a short period of time or such tendency has ended. On the other hand, the management apparatus 210 is characterized by preventing logs from being missed by shortening, based on a notification from the MFP 202, the job acquisition interval only during the time the MFP 202 is receiving an enormous number of jobs in a short period.

Figure 4:
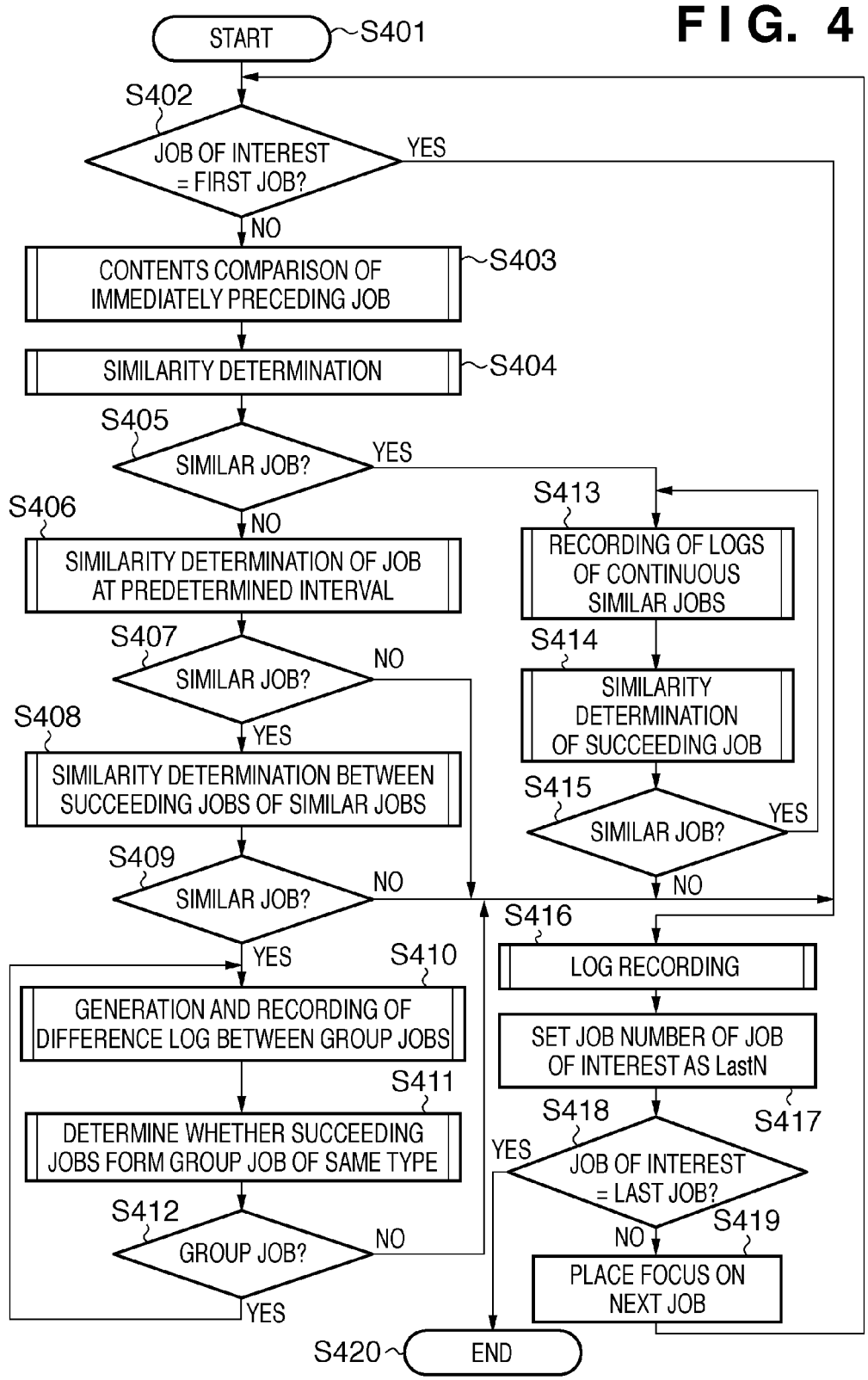
FIG. 4 is a flowchart illustrating the processing procedure of a management apparatus according to the first embodiment.

Upon receiving the notification from the MFP according to this embodiment, log analysis processing shown in, for example, FIG. 4 described above may be executed in synchronism. Since acquired log information can be managed immediately as a group job or continuous similar jobs together, efficient job log recording and management can be done. The log analysis processing may be executed only when the notification from the MFP has been received.

<Ninth Embodiment>

In this embodiment, the same description as in the above-described eighth embodiment will be omitted, and only characteristic arrangements and processing will be explained.

<Processing Procedure of MFP of Ninth Embodiment>

Figure 31:
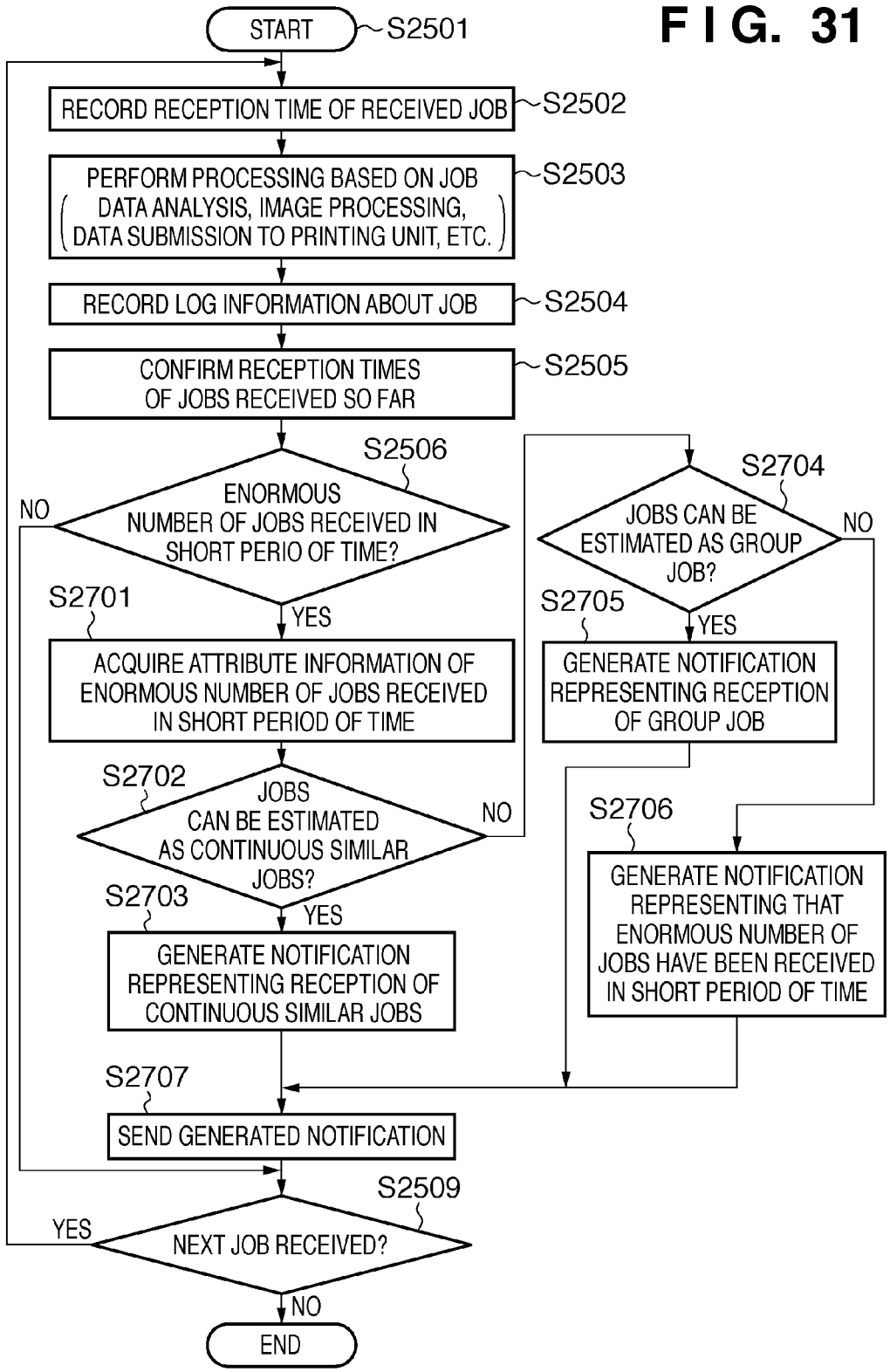
FIG. 31 is a flowchart illustrating the processing procedure of an MFP according to the ninth embodiment.

FIG. 31 schematically illustrates processing of causing a control unit 102 of an MFP 202 according to this embodiment to receive a job. Only portions different from the processing described with reference to FIG. 29 of the eighth embodiment will be described here.

Processing starts in step S2501, and the same processes as those described with reference to FIG. 29 are performed up to step S2506. If a job management unit 2402 has determined in step S2506 that the MFP has received an enormous number of jobs in a predetermined short period of time, the process advances to step S2701. Otherwise, the process advances to step S2509. In step S2701, the job management unit 2402 acquires, from a job information recording area 2403, attribute information of the enormous number of received jobs.

In step S2702, the job management unit 2402 compares the attribute information of the jobs, thereby determining whether they can be estimated as continuous similar jobs. First, it is confirmed whether the job names, the numbers of pages, the names of users who have generated the jobs, the application names, the data sizes, and the output formats out of the job attribute information coincide with each other. For continuous similar jobs, it is determined whether jobs whose pieces of attribute information are similar to each other continue. If the jobs can be estimated as continuous similar jobs in step S2702, the process advances to step S2703. Otherwise, the process advances to step S2704. In step S2703, a notification generation unit 2404 generates a notification representing that the MFP has received an enormous number of jobs in a short period of time, and the jobs are estimated as continuous similar jobs.

In step S2704, the job management unit 2402 compares the attribute information of the jobs, thereby determining whether they can be estimated as a group job. First, it is confirmed whether the job names, the numbers of pages, the names of users who have generated the jobs, the application names, the data sizes, and the output formats out of the job attribute information almost coincide with each other among a plurality of jobs. For a group job, it is determined whether similar jobs appear at a predetermined interval. If the jobs can be estimated as a group job in step S2704, the process advances to step S2705. Otherwise, the process advances to step S2706. In step S2705, the notification generation unit 2404 generates a notification representing that the MFP has received an enormous number of jobs in a short period of time, and the jobs are estimated as a group job. In step S2706, the notification generation unit 2404 generates a notification representing that the MFP has received an enormous number of jobs in a short period of time. In step S2707, the notification generated in step S2703, S2705, or S2706 is sent to the management apparatus via a communication unit 2401.

<Effects of Ninth Embodiment>

As described above, in this embodiment, when an enormous number of jobs have arrived in a short period of time, the MFP 202 determines whether they can be estimated as continuous similar jobs or a group job, in addition to the characteristic feature of the eighth embodiment. The MFP is characterized by notifying a management apparatus 210 of the result. Note that, for load distribution, the MFP executes only determination based on attribute information with a relatively small calculation amount.

Upon receiving the notification from the MFP according to this embodiment, the above-described log analysis processing may be executed in synchronism. Especially in this embodiment, since the MFP obtains an estimation result based on attribute information in advance, only analysis processing according to the result is necessary. That is, if jobs are estimated as a group job, continuous similar job determination and the like can be omitted from the processing described with reference to, for example, FIG. 4. Since acquired log information can be managed immediately as group jobs or continuous similar jobs together, more efficient job log recording and management can be done, as compared to the above-described embodiments.

<Other Embodiments>

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-055725, filed Mar. 9, 2009, which is hereby incorporated by reference herein in its entirety.

What is claimed is:

1. A management apparatus which manages log information of jobs processed by an image forming apparatus, comprising:
a processor coupled to a memory storing program units to be executed by the processor, the program units including:
a determination unit, which determines, from a first plurality of logs included in the log information, a second plurality of logs based on information included in the first plurality of logs, wherein the first plurality of logs contain image data corresponding to a first plurality of pages, respectively, and wherein the second plurality of logs contain image data corresponding to a second plurality of pages, respectively, that are collectively similar;
a specification unit, which specifies, based on a determination result determined by the determination unit: a third plurality of logs as a first group job, the third plurality of logs corresponding to a third plurality of pages, respectively, and
a fourth plurality of logs as a second group job, the fourth plurality of logs corresponding to a fourth plurality of pages, respectively,
wherein the fourth plurality of pages are similar to the third plurality of pages, respectively, wherein the second group job succeeds the first group job, and wherein the third plurality of logs and the fourth plurality of logs each include at least one log of the second plurality of logs;
a difference log generation unit, which generates, as difference logs between logs of corresponding pages, differences between (1) logs from a first page to a last page of the third plurality of pages and (2) logs from a first page to a last page of the fourth plurality of pages, page by page;
a receiving unit, which receives, from the image forming apparatus, a notification representing that more than a predetermined number of jobs have been received in a period of time defined in advance; and
a change unit, which changes, based on the notification received by said receiving unit, an interval of receiving the log information from the image forming apparatus of a notification source to a shorter interval,
wherein the image forming apparatus determines the second plurality of logs based on attribute information of the more than the predetermined number of jobs received in the period of time, and sends the notification including a result of the determining by said image forming apparatus to said management apparatus, and
wherein said difference log generation unit generates the difference logs from information included in the second plurality of logs based on the result included in the notification received by said receiving unit.

2. The apparatus according to claim 1, wherein when determining the second plurality of logs, said determination unit obtains similarity between image data corresponding to the first plurality of logs using values of pixels of the image data corresponding to the first plurality of logs, and determines the second plurality of logs based on the similarity.

3. The apparatus according to claim 1, wherein said determination unit determines the second plurality of logs using attribute information included in the first plurality of logs.

4. The apparatus according to claim 1, wherein, when the second plurality of logs continuously appear, said determination unit determines the second plurality of logs as corresponding to continuous similar jobs, and for the continuous similar jobs, said difference log generation unit generates a difference log between a top log and a non-top log included in the second plurality of logs.

5. The apparatus according to claim 1, wherein said apparatus can communicate with another management apparatus for managing the log information, and wherein the program units further include a sending unit, which sends, to the other management apparatus, a notification concerning the second plurality of logs determined by said determination unit, and the other management apparatus manages the second plurality of logs as logs based on one print request based on the notification sent by said sending unit.

6. A management method in a management apparatus which manages log information of jobs processed by an image forming apparatus, said method comprising:

a determination step of causing a determination unit of the management apparatus to determine, from a first plurality of logs included in the log information, a second plurality of logs based on information included in the plurality of logs, wherein the first plurality of logs contain image data corresponding to a first plurality of pages, respectively, and wherein the second plurality of logs contain image data corresponding to a second plurality of pages, respectively, that are collectively similar;

a specification step of causing a specification unit of the management apparatus to specify, based on a determination result of the determination step:

a third plurality of logs as a first group job, the third plurality of logs corresponding to a third plurality of pages, respectively, and a fourth plurality of logs as a second group job, the fourth plurality of logs corresponding to a fourth plurality of pages, respectively, wherein the fourth plurality of pages are similar to the third plurality of pages, respectively, wherein the second group job succeeds the first group job, and wherein the third plurality of logs and the fourth plurality of logs each include at least one log of the second plurality of logs;

a difference log generation step of causing a difference log generation unit of the management apparatus to generate, as difference logs between logs of corresponding pages, differences between (1) logs from a first page to a last page of the third plurality of pages and (2) logs from a first page to a last page of the fourth plurality of pages, page by page;

a receiving step of receiving, from the image forming apparatus, a notification representing that more than a predetermined number of jobs have been received in a period of time defined in advance; and a change step of changing, based on the notification received in said receiving step, an interval of receiving the log information from the image forming apparatus of a notification source to a shorter interval, wherein the image forming apparatus determines the second plurality of logs based on attribute information of the more than the predetermined number of jobs received in the period of time, and sends the notification including a result of the determining by said image forming apparatus to the management apparatus, and wherein said difference log generation step includes generating the difference logs from information included in the second plurality of logs based on the result included in the notification received in said receiving step.

7. The method according to claim 6, wherein said determination step includes, when determining the second plurality of logs, obtaining similarity between image data corresponding to the first plurality of logs using values of pixels of the image data corresponding to the first plurality of logs, and determining the second plurality of logs based on the similarity.

8. The method according to claim 6, wherein said determination step includes determining the second plurality of logs using attribute information included in the first plurality of logs.

9. The method according to claim 6, wherein said determination step includes, when the second plurality of logs continuously appear, determining the second plurality of logs as corresponding to continuous similar jobs, and said difference log generation step includes, for the continuous similar jobs, generating a difference log between a top log and a non-top log included in the second plurality of logs.

10. The method according to claim 6, wherein the management apparatus can communicate with another management apparatus for managing the log information, and said method further comprises a sending step of sending, to the other management apparatus, a notification concerning the second plurality of logs determined in said determination step, and the other management apparatus manages the second plurality of logs as logs based on one print request based on the notification sent in said sending step.

11. A non-transitory computer-readable storage medium storing an executable program for causing a computer to function as a management apparatus which manages log information of jobs processed by an image forming apparatus, said management apparatus comprising:

a determination unit, which determines, from a first plurality of logs included in the log information, a second plurality of logs based on information included in the plurality of logs, wherein the first plurality of logs contain image data corresponding to a first plurality of pages, respectively, and wherein the second plurality of logs contain image data corresponding to a second plurality of pages, respectively, that are collectively similar;

a specification unit, which specifies, based on a determination result determined by the determination unit:

a third plurality of logs as a first group job, the third plurality of logs corresponding to a third plurality of pages, respectively, and a fourth plurality of logs as a second group job, the fourth plurality of logs corresponding to a fourth plurality of pages, respectively, wherein the fourth plurality of pages are similar to the third plurality of pages, respectively, wherein the second group job succeeds the first group job, and wherein the third plurality of logs and the fourth plurality of logs each include at least one log of the second plurality of logs;

a difference log generation unit, which generates, as difference logs between logs of corresponding pages, differences between (1) logs from a first page to a last page of the third plurality of pages and (2) logs from a first page to a last page of the fourth plurality of pages, page by page;

a receiving unit, which receives, from the image forming apparatus, a notification representing that more than a predetermined number of jobs have been received in a period of time defined in advance; and a change unit, which changes, based on the notification received by said receiving unit, an interval of receiving the log information from the image forming apparatus of a notification source to a shorter interval, wherein the image forming apparatus determines the second plurality of logs based on attribute information of the more than the predetermined number of jobs received in the period of time, and sends the notification including a result of the determining by said image forming apparatus to said management apparatus, and wherein said difference log generation unit generates the difference logs from information included in the second plurality of logs based on the result included in the notification received by said receiving unit.

* * * * *